United States Patent
Hua et al.

(10) Patent No.: US 12,514,448 B2
(45) Date of Patent: Jan. 6, 2026

(54) EMBEDDED SYSTEMS IN MEDICAL MONITORING SYSTEMS

(71) Applicant: ABBOTT DIABETES CARE INC., Alameda, CA (US)

(72) Inventors: Xuandong Hua, Mountain View, CA (US); Theodore J. Kunich, Pleasanton, CA (US); Jean-Pierre J. Cole, Tracy, CA (US); Nelson Y. Zhang, Fremont, CA (US); JunLe Zhang, Concord, CA (US); Danny Chan, Daly City, CA (US); Kurt E. Leno, San Leandro, CA (US); Ping-Kuen Lam, Milpitas, CA (US); Victor Paishi Huang, Union City, CA (US); Yee-Huan Ng, Alameda, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 411 days.

(21) Appl. No.: 17/464,551

(22) Filed: Sep. 1, 2021

(65) Prior Publication Data

US 2022/0202290 A1  Jun. 30, 2022

Related U.S. Application Data

(63) Continuation of application No. PCT/US2021/048521, filed on Aug. 31, 2021.
(Continued)

(51) Int. Cl.
*A61B 5/00* (2006.01)
*A61B 5/01* (2006.01)
(Continued)

(52) U.S. Cl.
CPC ............... *A61B 5/002* (2013.01); *A61B 5/01* (2013.01); *A61B 5/024* (2013.01); *A61B 5/11* (2013.01);
(Continued)

(58) Field of Classification Search
CPC ........... A61B 5/002; A61B 5/01; A61B 5/024; A61B 5/11; A61B 5/14532; A61B 5/6846;
(Continued)

(56) References Cited

U.S. PATENT DOCUMENTS

| | | |
|---|---|---|
| 4,561,443 A | 12/1985 | Hogrefe et al. |
| 4,592,745 A | 6/1986 | Rex et al. |

(Continued)

FOREIGN PATENT DOCUMENTS

| | | |
|---|---|---|
| CA | 2 766 693 | 9/2011 |
| CA | 2 766 685 | 12/2011 |

(Continued)

OTHER PUBLICATIONS

U.S. Appl. No. 60/614,683, filed Sep. 30, 2004, Brister, et al.
(Continued)

*Primary Examiner* — Rufus C Point
(74) *Attorney, Agent, or Firm* — ONE LLP

(57) ABSTRACT

A medical sensor includes an application-specific integrated circuit (ASIC), medical hardware, and a communication module. The ASIC is communicatively coupled to the medical hardware and communication module. The ASIC is configured to receive measurement signals from the medical hardware and provide the measurement signals to the communication module. The communication module is configured to process the measurement signal into measurement results and transmit the measurement results to a remove device. The communication module includes an application (Continued)

layer for processing the measurement signals and a link layer for transmitting the measurement results. The ASIC is configured to detect that a voltage supplied to the ASIC is below a threshold level and determine an amount of time that the voltage has been below the threshold level. The ASIC is further configured to respond to the voltage supplied to the ASIC being below a threshold level based on the determined amount of time.

16 Claims, 39 Drawing Sheets

Related U.S. Application Data

(60) Provisional application No. 63/132,631, filed on Dec. 31, 2020.

(51) Int. Cl.
*A61B 5/024* (2006.01)
*A61B 5/11* (2006.01)
*A61B 5/145* (2006.01)

(52) U.S. Cl.
CPC ........ *A61B 5/14532* (2013.01); *A61B 5/6846* (2013.01); *A61B 5/742* (2013.01); *A61B 2562/08* (2013.01)

(58) Field of Classification Search
CPC ................ A61B 5/742; A61B 2562/08; A61B 2560/0276; A61B 5/14542; A61B 2560/028; A61B 2560/063; A61B 5/02055
See application file for complete search history.

(56) References Cited

U.S. PATENT DOCUMENTS

| | | | |
|---|---|---|---|
| 4,627,445 A | 12/1986 | Garcia et al. |
| 4,924,879 A | 5/1990 | O'Brien |
| 5,267,963 A | 12/1993 | Bachynsky |
| 5,318,583 A | 6/1994 | Rabenau et al. |
| 5,390,671 A | 2/1995 | Lord et al. |
| 5,391,250 A | 2/1995 | Cheney, II et al. |
| 5,407,431 A | 4/1995 | Botich et al. |
| 5,482,473 A | 1/1996 | Lord et al. |
| 5,584,813 A | 12/1996 | Livingston et al. |
| 5,626,566 A | 5/1997 | Petersen et al. |
| 5,660,163 A | 8/1997 | Schulman et al. |
| 5,690,119 A | 11/1997 | Rytky et al. |
| 5,786,439 A | 7/1998 | Van Antwerp et al. |
| 5,865,804 A | 2/1999 | Bachynsky |
| 5,899,855 A | 5/1999 | Brown |
| 5,954,643 A | 9/1999 | VanAntwerp et al. |
| 5,971,941 A | 10/1999 | Simons et al. |
| 6,093,172 A | 7/2000 | Funderburk et al. |
| 6,096,268 A | 8/2000 | Inbar |
| 6,103,033 A | 8/2000 | Say et al. |
| 6,106,484 A | 8/2000 | Terwilliger et al. |
| 6,134,461 A | 10/2000 | Say et al. |
| 6,149,626 A | 11/2000 | Bachynsky et al. |
| 6,159,181 A | 12/2000 | Crossman et al. |
| 6,175,752 B1 | 1/2001 | Say et al. |
| 6,237,394 B1 | 5/2001 | Harris et al. |
| 6,259,181 B1 | 7/2001 | Kawano et al. |
| 6,266,551 B1 | 7/2001 | Osadchy et al. |
| 6,270,455 B1 | 8/2001 | Brown |
| 6,283,982 B1 | 9/2001 | Levaughn et al. |
| 6,293,924 B1 | 9/2001 | Safabash et al. |
| 6,293,925 B1 | 9/2001 | Safabash et al. |
| 6,298,255 B1 | 10/2001 | Cordero et al. |
| 6,377,829 B1 | 4/2002 | Al-Ali |
| 6,424,847 B1 | 7/2002 | Mastrototaro et al. |
| 6,424,874 B1 | 7/2002 | Mastrototaro et al. |
| 6,560,471 B1 | 5/2003 | Heller et al. |
| 6,565,509 B1 | 5/2003 | Say et al. |
| 6,579,690 B1 | 6/2003 | Bonnecaze et al. |
| 6,600,997 B2 | 7/2003 | Deweese et al. |
| 6,607,543 B2 | 8/2003 | Purcell et al. |
| 6,637,611 B2 | 10/2003 | Luch |
| 6,641,533 B2 | 11/2003 | Causey, III et al. |
| 6,689,056 B1 | 2/2004 | Kilcoyne et al. |
| 6,695,860 B1 | 2/2004 | Ward et al. |
| 6,746,582 B2 | 6/2004 | Heller et al. |
| 6,749,740 B2 | 6/2004 | Liamos et al. |
| 6,809,653 B1 | 10/2004 | Mann et al. |
| 6,850,859 B1 | 2/2005 | Schuh |
| 6,931,327 B2 | 8/2005 | Good, Jr. et al. |
| 6,942,518 B2 | 9/2005 | Liamos et al. |
| 6,960,192 B1 | 11/2005 | Flaherty et al. |
| 6,990,366 B2 | 1/2006 | Say et al. |
| 7,027,859 B1 | 4/2006 | McNichols et al. |
| 7,098,803 B2 | 8/2006 | Mann et al. |
| 7,110,803 B2 | 9/2006 | Shults et al. |
| 7,144,384 B2 | 12/2006 | Gorman et al. |
| 7,207,974 B2 | 4/2007 | Safabash et al. |
| 7,299,082 B2 | 11/2007 | Feldman et al. |
| 7,324,012 B2 | 1/2008 | Mann et al. |
| 7,344,500 B2 | 3/2008 | Talbot et al. |
| 7,381,184 B2 | 6/2008 | Funderburk et al. |
| 7,481,819 B2 | 1/2009 | Koeppel et al. |
| 7,585,287 B2 | 9/2009 | Bresina et al. |
| 7,693,485 B2 | 4/2010 | Parys |
| 7,699,807 B2 | 4/2010 | Faust et al. |
| 7,731,691 B2 | 6/2010 | Cote et al. |
| 7,837,633 B2 | 11/2010 | Conway et al. |
| 7,846,132 B2 | 12/2010 | Gravesen et al. |
| 7,867,244 B2 | 1/2011 | Lathrop et al. |
| 7,883,473 B2 | 2/2011 | LeVaughn et al. |
| 7,946,984 B2 | 5/2011 | Brister et al. |
| 8,016,774 B2 | 9/2011 | Freeman et al. |
| 8,028,837 B2 | 10/2011 | Gerstle et al. |
| 8,175,673 B2 | 5/2012 | Say et al. |
| 8,221,332 B2 | 7/2012 | Robbins et al. |
| 8,382,681 B2 | 2/2013 | Escutia et al. |
| 8,398,664 B2 | 3/2013 | Lamps et al. |
| 8,401,194 B2 | 3/2013 | Nierzwick et al. |
| 8,469,986 B2 | 6/2013 | Schraga |
| 8,515,519 B2 | 8/2013 | Brister et al. |
| 8,747,363 B2 | 6/2014 | Nielsen et al. |
| 8,750,955 B2 | 6/2014 | Brister et al. |
| 8,764,651 B2 | 7/2014 | Tran |
| 8,771,183 B2 | 7/2014 | Sloan |
| 8,864,651 B2 | 10/2014 | Kuyava et al. |
| 8,945,056 B2 | 2/2015 | Iio et al. |
| 9,000,914 B2 | 4/2015 | Baker et al. |
| 9,211,065 B2 | 12/2015 | Marsh et al. |
| 9,241,631 B2 | 1/2016 | Valdes et al. |
| 9,344,777 B2 | 5/2016 | He et al. |
| 9,351,669 B2 * | 5/2016 | Stafford .................. H04L 67/12 |
| 9,402,544 B2 | 8/2016 | Yee et al. |
| 9,465,943 B2 * | 10/2016 | Paris ...................... G06F 16/00 |
| 9,474,479 B2 | 10/2016 | Pusey et al. |
| 9,566,384 B2 | 2/2017 | Gyrn et al. |
| 9,577,934 B2 | 2/2017 | Gross |
| 9,668,682 B2 | 6/2017 | Brister et al. |
| 9,808,574 B2 | 11/2017 | Yodfat et al. |
| 9,980,140 B1 | 5/2018 | Spencer et al. |
| 9,996,668 B2 | 6/2018 | Reihman et al. |
| 10,085,640 B2 | 10/2018 | Mensinger et al. |
| 10,292,632 B2 | 5/2019 | Lee et al. |
| 10,375,222 B2 | 8/2019 | Mandapaka et al. |
| 10,772,547 B1 | 9/2020 | Lee et al. |
| 10,827,954 B2 | 11/2020 | Hoss et al. |
| 10,945,647 B2 | 3/2021 | Mazza et al. |
| 10,973,443 B2 | 4/2021 | Funderburk et al. |
| 10,980,461 B2 | 4/2021 | Simpson et al. |
| 11,000,213 B2 | 5/2021 | Kamath et al. |
| 11,013,440 B2 | 5/2021 | Lee et al. |
| 11,064,917 B2 | 7/2021 | Simpson et al. |
| 11,141,084 B2 | 10/2021 | Funderburk et al. |
| 11,202,591 B2 | 12/2021 | Yee et al. |

(56) References Cited

U.S. PATENT DOCUMENTS

| | | |
|---|---|---|
| 11,298,056 B2 | 4/2022 | Harper |
| 2002/0022855 A1 | 2/2002 | Bobroff et al. |
| 2002/0072657 A1 | 6/2002 | Bousquet et al. |
| 2002/0109621 A1 | 8/2002 | Khair et al. |
| 2002/0161288 A1 | 10/2002 | Shin et al. |
| 2002/0169439 A1 | 11/2002 | Flaherty |
| 2002/0177782 A1* | 11/2002 | Penner .................... A61B 8/56 600/485 |
| 2003/0050009 A1 | 3/2003 | Kurisko et al. |
| 2003/0065536 A1 | 4/2003 | Hansen et al. |
| 2003/0100821 A1 | 5/2003 | Heller et al. |
| 2003/0144581 A1 | 7/2003 | Conn et al. |
| 2003/0153900 A1 | 8/2003 | Aceti et al. |
| 2003/0208113 A1 | 11/2003 | Mault et al. |
| 2003/0225373 A1 | 12/2003 | Bobroff et al. |
| 2004/0002682 A1 | 1/2004 | Kovelman et al. |
| 2004/0010207 A1 | 1/2004 | Flaherty et al. |
| 2004/0106860 A1 | 6/2004 | Say et al. |
| 2004/0117204 A1 | 6/2004 | Mazar et al. |
| 2004/0122353 A1 | 6/2004 | Shahmirian et al. |
| 2004/0127958 A1 | 7/2004 | Mazar et al. |
| 2004/0133164 A1 | 7/2004 | Funderburk et al. |
| 2004/0186365 A1 | 9/2004 | Jin et al. |
| 2004/0193025 A1 | 9/2004 | Steil et al. |
| 2004/0204673 A1 | 10/2004 | Flaherty |
| 2004/0204687 A1 | 10/2004 | Mogensen et al. |
| 2005/0027463 A1 | 2/2005 | Goode, Jr. et al. |
| 2005/0038465 A1 | 2/2005 | Shraga |
| 2005/0049501 A1 | 3/2005 | Conero et al. |
| 2005/0101932 A1 | 5/2005 | Cote et al. |
| 2005/0177398 A1 | 8/2005 | Watanabe et al. |
| 2005/0182306 A1 | 8/2005 | Sloan |
| 2005/0204134 A1 | 9/2005 | Von Arx et al. |
| 2005/0240245 A1 | 10/2005 | Bange et al. |
| 2005/0242479 A1 | 11/2005 | Petisce et al. |
| 2005/0261563 A1 | 11/2005 | Zhou et al. |
| 2005/0283114 A1 | 12/2005 | Bresina et al. |
| 2006/0016700 A1 | 1/2006 | Brister et al. |
| 2006/0019327 A1 | 1/2006 | Brister et al. |
| 2006/0020187 A1 | 1/2006 | Brister et al. |
| 2006/0020189 A1 | 1/2006 | Brister et al. |
| 2006/0025663 A1 | 2/2006 | Talbot et al. |
| 2006/0081469 A1 | 4/2006 | Lee |
| 2006/0094944 A1 | 5/2006 | Chuang |
| 2006/0095014 A1 | 5/2006 | Ethelfeld |
| 2006/0142651 A1 | 6/2006 | Brister et al. |
| 2006/0155180 A1 | 7/2006 | Brister et al. |
| 2006/0202859 A1 | 9/2006 | Mastrototaro et al. |
| 2006/0224109 A1 | 10/2006 | Steil et al. |
| 2006/0258959 A1 | 11/2006 | Sode |
| 2007/0016129 A1 | 1/2007 | Liniger et al. |
| 2007/0027381 A1 | 2/2007 | Stafford |
| 2007/0038044 A1 | 2/2007 | Dobbles et al. |
| 2007/0043279 A1 | 2/2007 | Mannheimer et al. |
| 2007/0060801 A1 | 3/2007 | Neinast |
| 2007/0073129 A1 | 3/2007 | Shah et al. |
| 2007/0093754 A1 | 4/2007 | Mogensen et al. |
| 2007/0093786 A1 | 4/2007 | Goldsmith et al. |
| 2007/0135774 A1 | 6/2007 | Turner et al. |
| 2007/0142727 A1 | 6/2007 | Zhang et al. |
| 2007/0173708 A9 | 7/2007 | Dobbles et al. |
| 2007/0173710 A1 | 7/2007 | Petisce et al. |
| 2007/0219480 A1 | 9/2007 | Kamen et al. |
| 2007/0255116 A1 | 11/2007 | Mehta et al. |
| 2007/0288265 A1 | 12/2007 | Quinian et al. |
| 2008/0009805 A1 | 1/2008 | Ethelfeld |
| 2008/0081977 A1 | 4/2008 | Hayter et al. |
| 2008/0092638 A1 | 4/2008 | Brenneman et al. |
| 2008/0097246 A1 | 4/2008 | Stafford |
| 2008/0114280 A1 | 5/2008 | Stafford |
| 2008/0119705 A1 | 5/2008 | Patel et al. |
| 2008/0129486 A1 | 6/2008 | Jeckelmann et al. |
| 2008/0161666 A1 | 7/2008 | Feldman et al. |
| 2008/0172205 A1 | 7/2008 | Breton et al. |
| 2008/0214900 A1 | 9/2008 | Fennell et al. |
| 2008/0228045 A1 | 9/2008 | Gao et al. |
| 2008/0242962 A1 | 10/2008 | Roesicke et al. |
| 2008/0255440 A1 | 10/2008 | Eilersen et al. |
| 2008/0269687 A1 | 10/2008 | Chong et al. |
| 2008/0275313 A1 | 11/2008 | Brister et al. |
| 2008/0278333 A1 | 11/2008 | Fennell et al. |
| 2008/0281179 A1 | 11/2008 | Fennell et al. |
| 2008/0300476 A1 | 12/2008 | Stafford |
| 2008/0312512 A1 | 12/2008 | Brukalo et al. |
| 2008/0319414 A1 | 12/2008 | Yodfat et al. |
| 2009/0018424 A1 | 1/2009 | Kamath et al. |
| 2009/0033482 A1 | 2/2009 | Hayter et al. |
| 2009/0033485 A1 | 2/2009 | Hayter et al. |
| 2009/0054748 A1 | 2/2009 | Feldman |
| 2009/0055195 A1* | 2/2009 | Karlsgodt ............. H04L 65/764 704/500 |
| 2009/0076360 A1 | 3/2009 | Brister et al. |
| 2009/0085768 A1 | 4/2009 | Patel et al. |
| 2009/0099521 A1 | 4/2009 | Gravesen et al. |
| 2009/0112626 A1 | 4/2009 | Talbot et al. |
| 2009/0124979 A1 | 5/2009 | Raymond et al. |
| 2009/0178459 A1 | 7/2009 | Li et al. |
| 2009/0198118 A1 | 8/2009 | Hayter et al. |
| 2009/0198186 A1 | 8/2009 | Mernoe et al. |
| 2009/0216215 A1 | 8/2009 | Thalmann et al. |
| 2009/0240121 A1 | 9/2009 | Bickoff |
| 2009/0240193 A1 | 9/2009 | Mensinger et al. |
| 2009/0247857 A1 | 10/2009 | Harper et al. |
| 2010/0045425 A1 | 2/2010 | Chivallier |
| 2010/0145377 A1 | 6/2010 | Lai et al. |
| 2010/0160759 A1 | 6/2010 | Celentano et al. |
| 2010/0198034 A1 | 8/2010 | Thomas et al. |
| 2010/0198142 A1 | 8/2010 | Sloan et al. |
| 2010/0213057 A1 | 8/2010 | Feldman et al. |
| 2010/0230285 A1 | 9/2010 | Hoss et al. |
| 2010/0274218 A1 | 10/2010 | Yodfat et al. |
| 2010/0302979 A1 | 12/2010 | Reunamäki |
| 2010/0327063 A1 | 12/2010 | Medina et al. |
| 2011/0002223 A1 | 1/2011 | Gross |
| 2011/0055917 A1* | 3/2011 | Wickstrom ............. G06F 21/10 455/418 |
| 2011/0125000 A1 | 5/2011 | Rantala |
| 2011/0177780 A1 | 7/2011 | Sato et al. |
| 2011/0178378 A1 | 7/2011 | Mernoe et al. |
| 2011/0193704 A1 | 8/2011 | Harper et al. |
| 2011/0213225 A1 | 9/2011 | Bernstein et al. |
| 2011/0282671 A1 | 11/2011 | Dicks et al. |
| 2011/0320130 A1 | 12/2011 | Valdes et al. |
| 2012/0066501 A1* | 3/2012 | Xiong ................... H04L 9/3228 713/168 |
| 2012/0078071 A1 | 3/2012 | Bohm et al. |
| 2012/0108931 A1 | 5/2012 | Taub et al. |
| 2012/0123227 A1 | 5/2012 | Sun et al. |
| 2012/0182917 A1 | 7/2012 | Edlund |
| 2012/0237022 A1 | 9/2012 | Berson et al. |
| 2012/0255875 A1 | 10/2012 | Vicente et al. |
| 2012/0260323 A1 | 10/2012 | San Vicente et al. |
| 2012/0265035 A1 | 10/2012 | Bohm et al. |
| 2013/0078912 A1 | 3/2013 | San Vicente et al. |
| 2013/0127627 A1 | 5/2013 | Hayter et al. |
| 2013/0147490 A1* | 6/2013 | Lindegger ......... A61M 5/14244 324/435 |
| 2013/0310896 A1 | 11/2013 | Mass |
| 2014/0176338 A1 | 6/2014 | He et al. |
| 2014/0266776 A1 | 9/2014 | Miller et al. |
| 2014/0266785 A1 | 9/2014 | Miller et al. |
| 2014/0273858 A1 | 9/2014 | Panther et al. |
| 2014/0313052 A1 | 10/2014 | Yarger et al. |
| 2014/0379273 A1 | 12/2014 | Petisce et al. |
| 2015/0005601 A1 | 1/2015 | Hoss et al. |
| 2015/0038818 A1 | 2/2015 | Cole |
| 2015/0089222 A1 | 3/2015 | White et al. |
| 2015/0118658 A1 | 4/2015 | Mayou et al. |
| 2015/0123810 A1 | 5/2015 | Hernandez-Rosas et al. |
| 2015/0164391 A1 | 6/2015 | Hernandez-Rosas et al. |
| 2015/0205947 A1 | 7/2015 | Berman et al. |
| 2015/0207796 A1 | 7/2015 | Love et al. |
| 2015/0289124 A1 | 10/2015 | Palin et al. |

(56) References Cited

U.S. PATENT DOCUMENTS

| | | | |
|---|---|---|---|
| 2015/0334564 A1* | 11/2015 | McClure | H04L 63/18 |
| | | | 726/7 |
| 2016/0038083 A1* | 2/2016 | Ding | A61B 5/1135 |
| | | | 600/388 |
| 2016/0049624 A1* | 2/2016 | Bhardwaj | H01M 10/0525 |
| | | | 29/623.2 |
| 2016/0066826 A1 | 3/2016 | Larvenz et al. | |
| 2016/0081597 A1 | 3/2016 | Bhavaraju et al. | |
| 2016/0165649 A1 | 6/2016 | Polo et al. | |
| 2016/0210099 A1 | 7/2016 | Hampapuram et al. | |
| 2016/0234020 A1 | 8/2016 | Nix | |
| 2016/0248276 A1* | 8/2016 | Hong | H02J 7/00034 |
| 2017/0112531 A1 | 4/2017 | Schoonmaker et al. | |
| 2017/0281000 A1 | 10/2017 | Wedekind et al. | |
| 2018/0217917 A1 | 8/2018 | Hayter et al. | |
| 2019/0142315 A1 | 5/2019 | Love et al. | |
| 2019/0216373 A1 | 7/2019 | Harper | |
| 2019/0383864 A1* | 12/2019 | Joshi | H02J 3/00 |
| 2020/0204394 A1 | 6/2020 | Williams | |
| 2021/0174887 A1* | 6/2021 | Sanada | G11C 16/0483 |

FOREIGN PATENT DOCUMENTS

| | | | |
|---|---|---|---|
| CN | 205121646 U * | 3/2016 | |
| CN | 106535090 A * | 3/2017 | H04W 4/80 |
| CN | 110 750 131 A | 2/2020 | |
| DE | 20 2015 010 002 U1 | 12/2022 | |
| EP | 0 707 270 B1 | 11/2001 | |
| EP | 2 407 094 | 1/2012 | |
| EP | 3 158 922 A1 | 4/2017 | |
| EP | 3240352 A1 | 11/2017 | |
| EP | 3 435 866 | 11/2020 | |
| EP | 3730045 | 3/2022 | |
| EP | 3 797 685 | 5/2022 | |
| EP | 1789116 | 5/2023 | |
| EP | 3977921 B1 | 7/2023 | |
| JP | WO2015/194381 A1 | 12/2015 | |
| WO | WO 99/58190 | 11/1999 | |
| WO | WO 00/62664 A1 | 10/2000 | |
| WO | WO 2001/17875 | 3/2001 | |
| WO | WO 02/15778 | 2/2002 | |
| WO | WO 2002/058537 | 8/2002 | |
| WO | WO 03/026728 | 4/2003 | |
| WO | WO 2004/006982 | 1/2004 | |
| WO | WO 2004/098682 | 11/2004 | |
| WO | WO 2005/011779 | 2/2005 | |
| WO | WO 2005/018450 | 3/2005 | |
| WO | WO 2005/046780 | 5/2005 | |
| WO | WO 2006/040083 | 4/2006 | |
| WO | WO 2006/094513 | 9/2006 | |
| WO | WO 2006/121921 | 11/2006 | |
| WO | WO 2007/002189 A2 | 1/2007 | |
| WO | WO 2007/097754 | 8/2007 | |
| WO | WO-2007104755 A1 * | 9/2007 | A61M 5/14248 |
| WO | WO 2008/065646 | 6/2008 | |
| WO | WO 2008/073813 | 6/2008 | |
| WO | WO 2008/114223 | 9/2008 | |
| WO | WO 2008/115409 | 9/2008 | |
| WO | WO 2008/144325 A1 | 11/2008 | |
| WO | WO 2008/155377 | 12/2008 | |
| WO | WO 2008/157821 | 12/2008 | |
| WO | WO2009/001347 | 12/2008 | |
| WO | WO 2009/007287 | 1/2009 | |
| WO | WO 2009/035773 | 3/2009 | |
| WO | WO 2009/039013 | 3/2009 | |
| WO | WO 2009/066288 | 5/2009 | |
| WO | WO 2013/044153 A1 | 3/2013 | |
| WO | WO 2013/069894 A1 | 5/2013 | |
| WO | WO 2013/090731 A1 | 6/2013 | |
| WO | WO 2013/090791 | 6/2013 | |
| WO | WO 2014/011488 A2 | 1/2014 | |
| WO | WO 2014/158405 A2 | 10/2014 | |
| WO | WO 2014/165172 A1 | 10/2014 | |
| WO | WO 2014/179343 A1 | 11/2014 | |
| WO | WO 2015/069797 A1 | 5/2015 | |
| WO | WO 2016/064184 A1 | 4/2016 | |
| WO | WO 2016/092448 A1 | 6/2016 | |
| WO | WO 2016/101774 A1 | 6/2016 | |
| WO | WO 2017/172781 A1 | 10/2017 | |
| WO | WO 2018/017484 A1 | 1/2018 | |
| WO | WO 2018/075333 A2 | 4/2018 | |

OTHER PUBLICATIONS

"Setting Your Sensor Settings" retrieved from "https://web.archive.org/web/20160803065621/http://www.medtronicdiabetes.com:80/customer-support/device-settings-and-features/sensor-settings/setting-sensor-settings" on Nov. 18, 2022, 5 pages.
Dexcom G5 Mobile Continuous Glucose Monitoring System, Advisory Committee Briefing Materials, Clinical Chemistry and Clinical Toxicology Devices Panel, 283 pages (2016).
Dowla, "The Basics of Radio Frequency Identification (RFID) Technology", Handbook of RF & Wireless Technologies, Chapter 14, 44 pages (2004).
Evans, et al., "Clinical temperature acquisition using proximity telemetry", J. Biomed. Eng., 13:83-86 (1991).
Finkenzeller, "RFID Handbook: Fundamentals and Applications in Contactless Smart Cards and Identification", Second Edition, 114 pages (2003).
Lee, "RFID Coil Design", Microchip Technology Inc., DS00678B, pp. 1-19 (1998).
Liang, et al., "An implantable bi-directional wireless transmission system for transcutaneous biological signal recording", Physiological Measurement, 26:83-97 (2005).
Radio Frequency Identification RFID, AIM Inc., White Paper, Document Version 1.2, 17 pages (2001).
Sorrells, "Passive RFID Basics", Microchip Technology Inc., DS00680B, pp. 1-5 (1998).
U.S. Appl. No. 60/587,787, filed Jul. 13, 2004, Brister, et al.
510(k) Summary of Safety and Effectiveness, CleoTM 90 Infusion Set, 2004, 618 pages.
Accu-Chek® Compact Plus, Blood Glucose Meter, Owner's Booklet, 2008, 100 pages.
Accu-Chek Softclix Plus Lancet Device retrieved from https://web.archive.org/web/20061018055737/http://www.accu-check.com/US/rewrite/content/en_US/2.1.7.1:10/article/ACCM_general_article_3303.htm, 2006, pp. 1-2.
CareLink™ Usb, User Guide Medtronic MiniMed, 11pages (2007).
U.S. Appl. No. 10/633,367, 2003, 97 pages.
Cleo® 90 Infusion Set Training Guide, 1 page, 2007.
Compact Plus Blood Glucose Meter retrieved from https://web.archive.org/web/20090316065810/http://www.accu-check.com/US/rewrite/content/en_US/2.1.9:0/article/ACCM_general_article_5136.htm, 2009, pp. 1-3.
U.S. Appl. No. 60/587,787, 2004, 69 pages.
Finkenzeller, "RFID Handbook: Fundamentals and Applications in Contactless Smart Cards, Radio Frequency Identification and Near-Field Communication", Third Edition, 4 pages (2010).
Freestyle Navigator User's Guide, 2008, pp. 1-195.
Garibotto, et al., "An Innovative Application of Shape Memory Alloy Technology Yields a Novel Therapeutic Approach to Diabetes Management", Insulet Corporation, 2009.
Insulet OmniPod Insulin Management System 019 UST400 User Manual, 2011, 190 pages.
Ocean Systems Test and Evaluation Program, Data Communications Plan, NOAA, U.S. Department of Commerce, National Ocean Service Center for Operational Oceanographic Products and Services, 199 pages, May 2006.
Sen-serter User Guide, Metronic MiniMed, 2006, 96 pages.
Summary of Safety and Effectiveness Data, Continuous Glucose Monitor, FreeStyle Navigator® Continuous Glucose Monitoring System, 2008, 27 pages.
The MiniMed Paradign REAL-Time System: A Practical Guide to Continuous Glucose Monitoring, 18 pages (2006).
The MiniMed Paradign REAL-Time Insulin Pump and Continuous Glucose Monitoring System, Fact Sheet, 2 pages (2006).

(56) References Cited

OTHER PUBLICATIONS

The MiniMed Paradign REAL-Time Insulin Pump and Continuous Glucose Monitoring System, 522 and 722 Insulin Pumps User Guide, 262 pages (2008).
"Within Definition & Meaning" retrieved from "https://www.dictionary.com/browse/within" on Sep. 9, 2022, 5 pages.
Zisser, "The OmniPod Insulin Management System: the Latest Innovation in Insulin Pump Therapy", Diabetes Ther, 2010, vol. 1, No. 1, pp. 10-24.
"Blood glucose monitoring" retrieved from "https://web.archive.org/web/20111215063153/http://en.wikipedia.org/wiki/Blood_glucose_monitoring" on Aug. 1, 2021, 6 pages.
Bluetooth Specification, Encryption and Authentication Overview, vol. 6, Version 4.0, 1 page (2010).
Bluetooth Master/Salve Communications and Sniff/Sniff Sub-Rating Modes, White Paper (2008).
Cunningham et al., "In Vivo Glucose Sensing," Wiley & Sons (2010).
Cornelius, "Usable Security for Wireless Body-Area Networks," Dartmouth College PhD Dissertations. 42 (2013).
Decuir, "Bluetooth 4.0:Low Energy", Standards Architect, CSR Technology, Councilor, Bluetooth Architecture Review Board, IEEE Region 6 Northwest Area Chair, 104 pages (2012).
Dementyev et al., "Power Consumption Analysis of Bluetooth Low Energy, ZigBee and ANT Sensor Nodes in a Cyclic Sleep Scenario", IEEE International Wireless Symposium (IWS), 5 pages (2013).
Diallo et al., "A Secure Authentication Scheme for Bluetooth Connection," 5th International Conference on Computer & Communication Engineering, DOI 10.1109/ICCCE.2014.29, 60-63 (2014).
Ellmerer et al., "Measurement of interstitial albumin in human skeletal muscle and adipose tissue by open-flow microperfusion," Am. J. Physiol. Endocrinol. Metab., 278: E352-E356 (2000).
German Infringement Complaint (2021) with English Abstract.
German Infringement Complaint Service addressed to Dexcom Deutschland GmbH (2021).
Gomez et al., "Overview and Evaluation of Bluetooth Low Energy: An Emerging Low-Power Wireless Technology," Sensors, 12, 11734-11753 (2012).
Guardian® REAL-Time, Continuous Glucose Monitoring System, User Guide, Medtronic MiniMed, Inc., 181 pages (2006).
Guardian® RT, Continuous Glucose Monitoring System, REF MMT-7900, User Guide, Medtronic MiniMed, 128 pages (2005).
Guder et al., "Samples: From the Patient to the Laboratory, The impact of preanalytical variables on the quality of laboratory results," Wiley-Vch GmbH & Co. KGaA (2003).
Higson et al., "Biosensors: a viable monitoring technology?" Med. & Biol. Eng. & Comput., 32, 601-609 (1994).
"In Vivo Glucose Sensing", Chemical Analysis, A Series of Monographs on Analytical Chemistry and its Applications, vol. 174, 62 pages (2010).
Klonoff, "A Review of Continuous Glucose Monitoring Technology", Diabetes Technology & Therapeutics, 7(5):770-775 (2005).
Klonoff, "Continuous Glucose Monitoring: Roadmap for 21st century diabetes therapy", Diabetes Care, 28(5):1231-1239 (2005).
Mohanty et al., Biosensors: A tutorial review, IEEE Potentials, 35-40 (2006).
Morak et al., "Design and Evaluation of a Telemonitoring Concept Based on NFC-Enabled Mobile Phones and Sensor Devices", IEEE Transactions on Information Technology in Biomedicine, 16(1):17-23 (2012).
Movassaghi et al., "Wireless Technologies for Body Area Networks: Characteristics and Challenges", IEEE, International Symposium on Communications and Information Technologies (ISCIT), pp. 42-47 (2012).
"Near field communication" retrieved from "http://en.wikipedia.org/w/index.php?title=Near_field_communication&oldid=543740757" on Jun. 27, 2014, 14 pages.
Near Field Communication (NFC) Technology and Measurements, White Paper, Rohde & Schwarz, 18 pages (2011).
Near Field Communication (NFC) Technology and Measurements, White Paper, Rohde & Schwarz, 1 page (2011).
Padgette et al., "Guide to Bluetooth Security, Recommendations of the National Institute of Standards and Technology," NIST, U.S. Dept. of Commerce, Special Publication 800-121 Revision 1 (2012).
Rivest et al., "A Method for Obtaining Digital Signatures and Public-Key Cryptosystems," MIT, 15 pages (1977).
Schaupp et al., "Direct access to interstitial fluid in adipose tissue in humans by use of open-flow microperfusion," E401-E408, Downloaded from journals.physiology.org/journal/ajpendo (092.040.147.197) on Oct. 4, 2021.
Seymour et al., Bluetooth Master/Slave Communications and Sniff/Sniff Sub-rating Modes White Paper, Aug. 14, 2008.
Sola-Gazagnes et al., "Emergent technologies applied to diabetes: What do we need to integrate continuous glucose monitoring into daily practice? Where the long-term use of continuous glucose monitoring stands in 2011", Diabetes & Metabolism, vol. 37, pp. S65-S70 (2011).
Specification of the Bluetooth System, Experience More, Specification vol. 0, Covered Core Package Version: 4.0, 2302 pages (2010).
Specification of the Bluetooth System, Experience More, Specification vol. 0, Covered Core Package Version: 4.0, 89 pages (2010).
Specification of the Bluetooth System, Master Table of Contents & Compliance Requirements, Version 4.1 (2013).
Specification of the Bluetooth System, Master Table of Contents & Compliance Requirements, Version 4.2 (2014).
Stallings, "Cryptography and Network Security, Principles and Practice," 5th Ed., Prentice Hall (2011).
Strickland et al., "Continuous Glucose Monitoring Profile Bluetooth® Profile Specification," Interest Group, v1.0.1 (2015).
The New Shorter Oxford English Dictionary, p. 50 (1993).
Townsend et al., "Getting Started with Bluetooth Low Energy," O'Reilly (2014).
Wikipedia, "Analyte" retrieved from https://en.wikipedia.org/w/index.php?title=Analyte&oldid=527866671 (2012).
Wikipedia, "Bluetooth", 25 pages retrieved from https://en.wikipedia.org/wiki/Bluetooth (2022).
Wikipedia, "Bluetooth Low Energy," 11 pages retrieved from https://en.wikipedia.org/wiki/Bluetooth_Low_Energy (2022).
Wikipedia, Challenge-response authentication retrieved from https://en.wikipedia.org/wiki/Challenge%E2%80%93response_authentication (2013).
Wikipedia, Digital Signature, 10 pages retrieved from https://en.wikipedia.org/wiki/Digital_signature (2021).
Wikipedia, Digital Signature, 10 pages (2012).
Wikipedia, "In vivo" retrieved from https://en.wikipedia.org/w/index.php?title=In_vivo&oldid=524960105 (2012).
Wikipedia, "Near-field communication" retrieved from https://en.wikipedia.org/w/index.php?title=Near-field_communication&oldid=525308529 (2012).
Wikipedia, RSA (cryptosystem), 17 pages retrieved from https://en.wikipedia.org/wiki/RSA_(cryptosystem) (2021).
Declaration of Brian D. Gross, 150 pages (2023).
Declaration of Morten O. Jensen, Ph.D., Dr.Med, 67 pages (2023).
Dexcom, Inserting Sensor, Instructions for Use, Dexcom, Inc., 2 pages (2021).
DexcomG7, Operational Manual, User Guide, Dexcom, Inc., 179 pages (2022) (with an English Abstract).
DexcomG7, Receiver: Start Here, Operational Manual, Dexcom, Inc., 8 pages (2022).
DexcomG7, Start Here, Operational Manual, Dexcom, Inc. 9 pages (2022) (with an English Abstract).
Diabetes Forecast—The Healthy Living Magazine of the American Diabetes Association, 18 pages, Nov. 2007.
U.S. Appl. No. 10/335,256, filed Dec. 31, 2002, 88 pages.
U.S. Appl. No. 11/322,568, filed Dec. 30, 2005, 50 pages.
U.S. Appl. No. 13/925,694, filed Jun. 24, 2013, 214 pages.
U.S. Appl. No. 15/061,774, filed Mar. 4, 2016, 151 pages.
U.S. Appl. No. 16/228,910, filed Dec. 21, 2018, 37 pages.
U.S. Appl. No. 17/245,719, filed Apr. 30, 2021, 51 pages.
U.S. Appl. No. 17/411,154, filed Aug. 25, 2021, 54 pages.

(56) References Cited

OTHER PUBLICATIONS

Heller, et al., "Electrochemical Glucose Sensors and Their Applications in Diabetes Management", Chemical Reviews, 108(7):2482-2505 (2008).
Medtronic Inc., News Release, *"Medtronic Receives FDA Approval for World's First Insulin Pump with Real-Time Continuous Glucose Monitoring"*, The Wayback Machine—https://web.archive.org/web/20060427084431/http://wwwp.medtronic.com: 80/Newsroom/NewsReleaseDetails.do?itemld=114487, 2 pages (2006).
Medtronic MiniMed, Inc., Fact Sheet, *Features and Benefits for the MiniMed Paradigm® REAL-Time System*—https://web.archive.org/web/20071030065834/http://www.medtronicdiabetes.com/pdf/dtc_features_glance.pdf, 7 pages (2007) and Affidavit of Nathaniel E Frank-White, Internet Archive, 3 pages (2023).
Medtronic MiniMed, Inc., *Features for the MiniMed Paradigm® REAL-Time System*, The Wayback Machine—http://www.medtronicdiabetes.com/products/insulinpumps/features/index.html, 3 pages (2007) and Affidavit of Nathaniel E Frank-White, Internet Archive, 3 pages (2023).
Medtronic MiniMed, Inc., *Frequently Asked Questions About the MiniMed Paradigm® REAL-Time System*, The Wayback Machine—https://web.archive.org/web/20071023121607/http://www.medtronicdiabetes.com/products/insulinpumps/features/index.html, 9 pages (2007) and Affidavit of Nathaniel E Frank-White, Internet Archive, 3 pages (2023).
Medtronic MiniMed, Inc., *Request Information for the MiniMed Paradigm® REAL-Time Insulin Pump and Continuous Glucose Monitoring System*, The Wayback Machine—https://web.archive.org/web/20071009144413/http://www.medtronicdiabetes.com/index.html, 3 pages (2007) and Affidavit of Nathaniel E Frank-White, Internet Archive, 3 pages (2023.
Microchip, microID® 13.56 MHz RFID, System Design Guide, Microchip Technology Inc., 214 pages (2004).
Smith, The Scientist and Engineer's Guide to Digital Signal Processing, Second Edition, 46 pages (1999).
The MiniMed Paradigm® Insulin Pump and Continuous Glucose Monitoring System, Sensor Features User Guide, Paradigm® 522 and 722 Sensor Features, Medtronic MiniMed, 76 pages (2006) and Affidavit of Nathaniel E Frank-White, Internet Archive, 3 pages (2023).
U.S. Food and Drug Administration, Premarket Approval (PMA), Paradigm Real Time System, 3 pages (2006).
United States Patent and Trademark Office, Before the Patent Trial and Appeal Board, *Dexcom, Inc.* v. *Abbott Diabetes Care Inc.*, Notice of Filing Date Accorded to Petition and Time for Filing Patent Owner Preliminary Response in U.S. Pat. No. 11,298,056 issued on Apr. 12, 2022, 6 pages (2023).
United States Patent and Trademark Office, Before the Patent Trial and Appeal Board, *Dexcom, Inc.* v. *Abbott Diabetes Care Inc.*, Petition for Inter Partes Review of U.S. Pat. No. 11,298,056 issued on Apr. 12, 2022, 132 pages (2023).
United States Patent and Trademark Office, Before the Patent Trial and Appeal Board, *Dexcom, Inc.* v. *Abbott Diabetes Care Inc.*, Petition for Inter Partes Review of U.S. Pat. No. 11,298,056 issued on Apr. 12, 2022, 76 pages (2023).
United States Patent and Trademark Office, Before the Patent Trial and Appeal Board, *Dexcom, Inc.* v. *Abbott Diabetes Care Inc.*, Petitioner's Explanation of Material Differences Between Petitions in U.S. Pat. No. 11,298,056 issued on Apr. 12, 2022, 8 pages (2023).
"Abbott Receives CE Mark for Freestyle® Libre, A Revolutionary Glucose Monitoring System for People with Diabetes," 8 pages (2023).
U.S. Appl. No. 10/335,256 Specification and Drawings for "Relay device for transferring information between a sensor system and a fluid delivery system," filed Dec. 31, 2002, 88 pages.
U.S. Appl. No. 11/322,568 Specification and Drawings for "Telemetered characteristic monitor system and method of using the same," filed Dec. 30, 2005, 50 pages.
Armstrong, "Wireless connectivity for health and sports monitoring: a review," Br J Sports Med, 41:285-289 (2007).
ATTD Program, 4 pages (2009).
Boise, Interview with Dexcom CEO, Dexcom CEO Kevin Sayer Explains G6, 9 pages (2018).
Breton et al., "Optimum Subcutaneous Glucose Sampling and Fourier," Journal of Diabetes Science and Technology, vol. 2, Issue 3, 495-500, May 2008.
Buckingham et al., "Real-time continuous glucose monitoring," Curr Opinion Endocrinology, Diabetes & Obesity, 14:288-295 (2007).
Buckingham, "Clinical Overview of Continuous Glucose Monitoring," Journal of Diabetes Science and Technology, vol. 2, Issue 2, 300-306 (2008).
Burge et al., "Continuous Glucose Monitoring: The Future of Diabetes Management," Diabetes Spectrum, vol. 21, No. 2, 112-119 (2008).
Choleau et al., "Calibration of a subcutaneous amperometric glucose sensor implanted for 7 days in diabetic patients Part 2. Superiority of the one-point calibration method," Biosensors and Bioelectronics 17, 647-654 (2002).
Dexcom (DXCM) Company Profile, 2017 /Q4 Earnings call transcript, 12 pages (2017).
Dexcom G6 Continuous Glucose Monitoring System User Guide, 7 pages (2020).
Email communication from Sophie Hood, Jan. 24, 2023, 6 pages.
Excerpts F. White Affidavit, Medronic MiniMed, Inc., MiniMed User Guides, 11 pages (2007).
Excerpts F. White Affidavit, Medronic MiniMed, Inc., Questions regarding MiniMed Paradigm, 94 pages (2007).
Excerpts from Diabetes Forecast, 18 pages, Nov. 2007.
FDA, Premarket Approval (PMA), 3 pages, Apr. 7, 2006.
File History, U.S. Appl. No. 09/935,827, 97 pages, filed Aug. 23, 2001.
File History, U.S. Appl. No. 10/335,256, 103 pages, filed Dec. 31, 2002.
File History, U.S. Appl. No. 11/322,568, 94 pages, filed Dec. 30, 2005.
File History, U.S. Appl. No. 11/931,363, 72 pages, filed Oct. 31, 2007.
File History, U.S. Appl. No. 12/056,651, 323 pages, filed Mar. 27, 2008.
File History, U.S. Appl. No. 12/769,635, 280 pages, filed Apr. 28, 2010.
File History, U.S. Appl. No. 13/925,694, 214 pages, filed Jun. 24, 2013.
File History, U.S. Appl. No. 15/061,774, 151 pages, filed Mar. 4, 2016.
File History, U.S. Appl. No. 16/228,910, 212 pages, filed Dec. 21, 2018.
File History, U.S. Appl. No. 17/245,719, 168 pages, filed Mar. 30, 2021.
File History, U.S. Appl. No. 17/411,154, 320 pages, filed Aug. 25, 2021.
Hall, Interview with Kevin Sayer, President and CEO of Dexcom About The New Dexcom G6, College Diabetes Network, 6 pages (2021).
Hoss et al., "Continuous glucose monitoring in the tissue: Do we really need to calibrate in-vivo?," Diabetes Technology & Therapeutics, vol. 11, No. 2, (2009).
Keenan et al., "Delays in Minimally Invasive Continuous Glucose Monitoring Devices: A Review of Current Technology," J Diabetes Sci Technol, vol. 3, Issue 5, 1207-1214 (2009).
Mastrototaro, "The MiniMed Continuous Glucose Monitoring System," Diabetes Technology & Therapeutics, vol. 2, Suppl 1, S-13-S-18 (2000).
McGarraugh, "The Chemistry of Commercial Continuous Glucose Monitors," Diatebes Technology & Theraputics, vol. 11, Suppl. 1, S-17-S-24 (2009).
News Release, *"Medtronic Receives FDA Approval for World's First Insulin Pump with Real-Time Continuous Glucose Monitoring—MiniMed Paradigm® REAL-Time System Allows Patients to Make Immediate Diabetes Management Decisions; Marks Major Step Toward an Artificial Pancreas,"* The Wayback Machine—https://

(56) References Cited

OTHER PUBLICATIONS web.archive.org/web/20060427084431/http://wwwp.medtronic.com:80/Newsroom/NewsReleaseDetails.do?itemId=114487, 2 pages (2006).
Omnipod image, Exhibit 182, 2 pages, Sep. 22, 2022.
Pantelopoulos et al., "A Survey on Wearable Biosensor Systems for Health Monitoring," 30th Annual International IEEE EMBS Conference, Vancouver, British Columbia, Canada, Aug. 20-24, 2008, 4887-4890 (2018).
Poitout et al., "A glucose monitoring system for on line estimation in man of blood glucose concentration using a miniaturized glucose sensor implanted in the subcutaneous tissue and a wearable control unit," Diabetologia, 36: 658-663 (1993).
Ruder, "Continuous Glucose Monitors For Kids," Diabetes Forecast, 1 page, Aug. 2007.
S&P Global Market Intelligence "DexCom, Inc. NasdaqGS:DXCM, Company Conference Presentation," 10 pages (2020).
S&P Global Market Intelligence "DexCom, Inc. NasdaqGS:DXCM, Company Conference Presentation," 11 pages (2019).
S&P Global Market Intelligence "DexCom, Inc. NasdaqGS:DXCM, Company Conference Presentation," 17 pages (2021).
Sayer, CGMS Changing Diabetes Management: Kevin Sayer, DIC Interview Transcript, Featuring Steve Freed, 11 pages (2019).
Shenoi, "Introduction to Digital Signal Processing and Filter Design," Wiley & Sons, 46 pages (2006).
Smith, The Science and Engineer's Guide to Digital Signal Processing, $2^{nd}$ Ed., 46 pages (1999).
Sonix, Dexcom CEO—Prime Position in Our Market—Mad Money—CNBC.mp4, 4 pages (2023).
U.S. Food & Drug Administration, "Deciding When to Submit a 510(k) for a Change to an Existing Device, Guidance for Industry and Food and Drug Administration Staff," 32 pages (2017).
U.S. Food & Drug Administration, "Deciding When to Submit a 510(k) for a Change to an Existing Device, Guidance for Industry and Food and Drug Administration Staff," 78 pages (2017).
U.S. Appl. No. 60/976,886, filed Oct. 2, 2007, 62 pages.
Velho et al., "In vivo calibration of a subcutaneous glucose sensor for determination of subcutaneous glucose kinetics," Diabetes, American Diabetes Association, 1 (3), pp. 227-233. hal-01179359 (1988).
Watkin, "An Introduction to Flash Glucose Monitoring," 16 pages (2013).
Bluetooth, Bluetooth Basics, Benefits of Bluetooth Technology, https://web.archive.org/web/20060611161103/http://www.bluetooth.com/Bluetooth/Learn/Basics/, 2006, 1 page.
Compare Specification—Apple iPhone 6 vs. Apple iPhone 6 Plus—https://www.gsmarena.com/compare.php3?idPhone1=6378&idPhone2=6665, 2 pages, Jan. 31, 2022.
Declaration of Gary D. Fletcher, Ph.D., dated Oct. 10, 2023 for IPR2023-01409, U.S. Pat. No. 11,202,591 (U.S. Appl. No. 17/221,154).
Declaration of Nathaniel E. Frank-White, Nov. 9, 2023, 28 pages.
Dexcom Continuous Glucose Monitoring, FDA Approves Dexcom G5® Mobile Continuous Glucose Monitoring System, Aug. 24, 2015, 6 pages.
Dexcom Continuous Glucose Monitoring, Discover Dexcom G5 Mobile Continuous Glucose Monitoring (CGM) System, CGM unveils what no meter can . . . , Oct. 17, 2023, 18 pages.
Dexcom G4® Platinum, Continuous Glucose Monitoring System, User's Guide, Dexcom, Inc., 161 pages (2015).
Dexcom G4 Platinum Pediatric, User's Guide Dexcom G4® Platinum (Pediatric) Continuous Glucose Monitoring System Received with ShareTM, 2015, 234 pages.
Dexcom G5 User Guide, Dexcom, Inc., 265 pages (2015).
Dexcom G5® Mobile, Continuous Glucose Monitoring System, User Guide, Dexcom, Inc., 264 pages (2015).
Dexcom News Releases—FDA Approves Dexcom G4 Platinum Continuous Glucose Monitoring System with Share—https://www.dexcom.com/en-us/news/fda-approves-dexcom-g4-platinum-continuous-glucose-monitoring-system-share, Dexcom, Inc., 2 pages, Jan. 26, 2015.

Dexcom Press Release—FDA Approves Dexcom G5® Mobile Continuous Glucose Monitoring System—https://www.dexcom.com/news/1257506247-fda-approves-dexcom-g5®-mobile-continuous-glucose monitoring-system, Dexcom, Inc., 4 pages, Aug. 24, 2015.
Encyclopedia Britannica, Science & Tech, Bluetooth Definition, 5 pages, (Oct. 14, 2023).
Excerpts from the "German Health Report Diabetes 2023" of the German Diabetes Society, 14 pages (2022) (with an English Abstract).
FDA U.S. Food & Drug Administration, Premarket Approval (PMA), Sep. 16, 2006, https://www.accessdata.fda.gov/scripts/cdrh/cfdocs/cfpma/pma.cfm?ID=388585, 4 pages.
Federal Communications Commission Office of Engineering and Technology Policy and Rules Division, FCC Online Table of Frequency Allocations, Revised on Jul. 1, 2022, 180 pages.
Ferro, et al., "Bluetooth and Wi-fi Wireless Protocols: A Survey and a Comparison", IEEE Wireless Communications, pp. 1-24 (2004).
Ferro, et al., "Bluetooth and Wi-fi Wireless Protocols: A Survey and a Comparison", IEEE Wireless Communications, 12(1):12-26 (2005).
File history of U.S. Appl. No. 17/221,154, filed Apr. 2, 2021 (Exhibit 1002—Part 1-8, 1093 pages in total).
FreeStyle Libre Flash Glucose Monitoring System, User's Manual, Abbott Diabetes Care Ltd., 124 pages (2014).
Hamblen, "A short history of NFC: Where Near Field Communication has come from.", 2 pages, Dec. 19, 2012.
IPhone User Guide for iOS 8.4 Software, 2015, 196 pages.
Klueh, et al., "Inflammation and Glucose Sensors: Use of Dexamethasone to Extend Glucose Sensor Function and Life Span in Vivo", Journal of Diabetes Science and Technology, 1(4):496-504 (2007).
Medtronic, CareLink Personal Therapy Management Software for Diabetes, 2007, 20 pages.
Memorandum Opinion, *Abbott Diabetes v. Dexcom, Inc.*, Mar. 22, 2023, 47 pages.
Press Coverage of FreeStyle Libre launch, Antonia Giese, retrieved from https://www.bild.de/ratgeber/gesundheit/diabetes/hightech-zucker-sensor-diabetes-test-freestyle-libre-flash-37732134.bild.html, 8 pages Sep. 20, 2014 (with an English Translation).
Seven STS® Continuous Glucose Monitoring System User's Guide, 2007, 74 pages.
Specification of the Bluetooth System, Experience More, Specification vol. 0, Covered Core Package Version: 4.0, 41 pages (2010).
Specification of the Samsung Galaxy Alpha, Samsung Newsroom Deutschland—http://www.samsung.de/galaxyalpha, 7 pages, Aug. 13, 2014 (with an English Abstract).
Wikipedia, The Free Encyclopedia, "Continuous glucose monitor", retrieved from https://en.wikipedia.org/w/index.php?title=Continuous_glucose_monitor&oldid=1180606331, 10 pages (Oct. 1, 2023).
Wikipedia, The Free Encyclopedia, "Radio-frequency identification", retrieved from https://en.wikipedia.org/wiki/Radio-frequency_identification, 30 pages (Oct. 23, 2023).
Abbott Press Release—Abbott Receives CE Mark for FreeStyle® Libre, A Revolutionary Glucose Monitoring System for People with Diabetes—https://abbott.mediaroom.com/2014-09-03-Abbott-Receives-CE-Mark-for-FreeStyle-Libre-a-Revolutionary-Glucose-Monitoring-System-for-People-with, Abbott, 5 pages (2014).
Breton, et al., "Optimum Subcutaneous Glucose Sampling and Fourier Analysis of Continuous Glucose Monitors," Journal of Diabetes Science and Technology, vol. 2, Issue 3, 495-500 (May 2008).
Continuous Glucose Monitoring Systems, Product Reference Guide, Diabetes Health Magazine, Dec. 2006-Jan. 2007, 3 pages.
Das, et al., "Review—Electrochemistry and Other Emerging Technologies for Continuous Glucose Monitoring Devices", ECS Sensors Plus, 20 pages (2022).
Dexcom G6, Continuous Glucose Monitoring System, User Guide, Dexcom, Inc., 346 pages (2022).
Diabetes Forecast, "Continuous Glucose Monitors for Kids," Practical Living, 10 pages (Aug. 2007).
Englert, et al., "Skin and Adhesive Issues With Continuous Glucose Monitors: A Sticky Situation", Journal of Diabetes Science and Technology, 8(4):745-751 (2014).
File History of U.S. Pat. No. 10,194,844, issued Feb. 5, 2019, 151 pages.

(56) References Cited

OTHER PUBLICATIONS

File History of U.S. Pat. No. 11,013,431, issued May 25, 2021, 212 pages.
File History of U.S. Pat. No. 11,116,431, issued Sep. 14, 2021, 168 pages.
File History of U.S. Pat. No. 8,483,967, issued Jul. 9, 2013, 140 pages.
File History of U.S. Pat. No. 9,310,230, issued Apr. 12, 2016, 214 pages.
U.S. Pat. No. 10,375,222, issued Aug. 6, 2019, 442 pages.
U.S. Appl. No. 13/071,487, filed Mar. 24, 2011, 132 pages.
U.S. Appl. No. 13/071,497, filed Mar. 24, 2011, 162 pages.
U.S. Appl. No. 14/884,622, filed Oct. 15, 2015, 488 pages.
U.S. Appl. No. 17/008,630, filed Aug. 31, 2020, 484 pages.
U.S. Appl. No. 17/017,590, filed Sep. 10, 2020, 486 pages.
Freckmann, et al., "Performance Evaluation of Three Continuous Glucose Monitoring Systems: Comparison of Six Sensors per Subject in Parallel", Journal of Diabetes Science and Technology, 7(4):842-853 (2013).
Harris, et al., "Common Causes of Glucose Oxidase Instability in In Vivo Biosensing: A Brief Review", Journal of Diabetes Science and Technology, 7(4):1030-1038 (2013).
Hoss, et al., "Feasibility of Factory Calibration for Subcutaneous Glucose Sensors in Subjects With Diabetes", Journal of Diabetes Science and Technology, 8(1):89-94 (2014).
IPro™ 2, User Guide, Medtronic MiniMed, Inc., 108 pages (2010).
Medtronic, The MiniMed Paradigm® Real-Time Insulin Pump and Continuous Glucose Monitoring System, Sensor Features User Guide, https://web.archive.org/web/20071028164026/http://www.medtronicdiabetes.com/pdf/x22_sensor_features.pdf, 77 pages (2007).
NFC Forum Bluetooth Special Interest Group, Bluetooth® Secure Simple Pairing Using NFC, 39 pages (2014).
Nichols, et al., "Biocompatible Materials for Continuous Glucose Monitoring Devices", Chem Rev., 113(4), 44 pages (2013).
Omre, "Bluetooth Low Energy: Wireless Connectivity for Medical Monitoring", Journal of Diabetes Science and Technology, vol. 4, No. 2, pp. 457-463 (2010).
Padgette, et al., "Guide to Bluetooth Security—Recommendations of the National Institute of Standards and Technology," National Institute of Standards and Technology, U.S. Dept. Commerce, 800-121, Rev 1, 48 pages (May 2017).
Rice, et al., "Continuous Measurement of Glucose, Facts and Challenges", Anesthesiology, 116(1):199-204 (2012).
Rigo, et al., "Cutaneous Reactions to Continuous Glucose Monitoring and Continuous Subcutaneous Insulin Infusion Devices in Type I Diabetes Mellitus", Journal of Diabetes Science and Technology, 15(4):786-791 (2021).
Rocchitta, et al., "Enzyme Biosensors for Biomedical Applications: Strategies for Safeguarding Analytical Performances in Biological Fluids", Sensors, 16(6):780, 22 pages (2016).
Seven® Plus Continuous Glucose Monitoring System, User's Guide, DexCom, Inc., 145 pages (2010).
Specification of the Bluetooth System, Experience More, Master Table of Contents & Compliance Requirements, 134 pages (Jun. 2010).
Specification of the Bluetooth System, Wireless connections made easy, Master Table of Contents & Compliance Requirements, 92 pages (Nov. 2003).
Strömmer, et al., "Application of Near Field Communication for Health Monitoring in Daily Life," Proceedings of the 28th IEEE, EMBS Annual International Conference New York City, USA, Aug. 30-Sep. 3, 2006, 3246-3249.
WaybackMachine, Medtronic, User Guides, https://web.archive.org/web/20071023121553/http://www.medtronicdiabetes.com/products/insulinpumps/userguides.html, 3 pages (2007).
WaybackMachine, Medtronic, User Guides, https://web.archive.org/web/20071023121437/http://www.medtronicdiabetes.com/products/insulinpumps/userguides.html 9 pages (2007).
WaybackMachine, Medtronic, User Guides, https://web.archive.org/web/20071023121607/http://www.medtronicdiabetes.com/products/insulinpumps/userguides.html, 3 pages (2007).
WaybackMachine, Medtronic, User Guides, https://web.archive.org/web/20071009143917/http://www.medtronicdiabetes.com/products/insulinpumps/ 2 pages (2007).
WaybackMachine, Medtronic, User Guides, https://web.archive.org/web/20071009144413/http://www.medtronicdiabetes.com/index.html, 2 pages (2007).
Xu, et al., "Anti-Biofouling Strategies for Long-Term Continuous Use of Implantable Biosensors", Chemosensors, 8(3):66, 30 pages (2020).
Zhang, et al., "Bluetooth Low Energy for Wearable Sensor-based Healthcare Systems", 2014 IEEE Healthcare Innovation Conference (HIC), Seattle, WA, USA, pp. 251-254 (2014).
Chuang et al., "Pilot Studies of Transdermal Continuous Glucose Measurement in Outpatient Diabetic Patients and in Patients during and after Cardiac Surgery," Journal of Diabetes Science and Technology, 595-602 (2008).
Exhibit B-22.pdf—Opponent's Written Response in Opposition of EP 3 730 045, Sep. 27, 2023, 43 pages.
Letter from the Department of Health & Human Services, Food and Drug Administration (FDA) to Abbott Diabetes Care, Inc. re Premarket Approval Application (PMA) for P050020, FreeStyle Navigator Continuous Glucose Monitoring System, dated Mar. 12, 2008, 8 pages.
McCartney et al., "In vivo glucose sensing for diabetes management: progress towards non-invasive monitoring," BMJ, vol. 319, 4 pages (1999).
Wang et al. "A Feasible IMD Communication Protocol: Security without Obscurity," School of Engineering and Computing Sciences, NYIT Research Experience for Undergraduates (REU), May 26-Jul. 30, 2015, 1 page.
Almurashi, A.M., et al., "Emerging Diabetes Technologies: Continuous Glucose Monitors/ Artificial Pancreases" J. Indian Inst. Sci, 2023, 26 pages.
Atmel® 8-bit AVR® Microcontroller with 16K Bytes In-System Programmable Flash, Atmega169P, 2010, 395 pages.
Atmel® Product Guide, 2008, 90 pages.
Cappon, G., et al., "Continuous Glucose Monitoring Sensors for Diabetes Management: A Review of Technologies and Applications" Diabetes Metabolism Journal, 2019;43:383-397.
Cather, CGM Frustrations Survey, Dexcom, dated Jun. 2020, 37 pages.
U.S. Pat. No. 11,000,216, issued on May 11, 2021, 86 pages.
Clinical Trials Competitor and Ecosystem Players, Abbott, dated Jun. 25, 2020, 29 pages.
Declaration of Dr. Sayfe Kiael, Ph.D., Inter Partes Review of U.S. Pat. No. 10,375,222, 100 pages (2024).
Declaration of Karl R. Leinsing, MSME, PE, in Support of Abbott's Motion for Summary Judgment, executed on May 19, 2023, 81 pages.
Dexcom® User Guide for Dexcom G5® Mobile Continuous Glucose Monitoring (CGM) System, 2016, 372 pages.
Dexcom™STS™—7 Continuous Glucose Monitoring System, Transmitter model No. 9400-02, 2006, 3 pages.
Email from Christopher Dougherty with slides re. Global Commercial Insights Meeting, Abbott, sent on Dec. 17, 2019 (69 pages).
FreeStyle Libre 2 HCP Pulse, Mar. 2021 Report, Abbott, dated Apr. 13, 2021, 14 pages.
FreeStyle Navigator® Continuous Glucose Monitoring System, User Guide, 2008, 196 pgs.
Garg, S.K., et al., "Flash Glucose Monitoring: The Future is Here" Diabetes Technology & Therapeutics, vol. 19, Supplement 2, 2017, 3 pages.
Glucose Sensor Applicator, Project Status Update, design concept, Dexcom, 2014, 6 pgs.
Hirsch, I.B, et al., "Role of Continuous Glucose Monitoring in Diabetes Treatment" American Diabetes Association, Abbott, 2018, 28 pages.
International Diabetes Device, 2022 Blue Book, Seagrove Partners, Globeview™M, 143 Pages.

(56) References Cited

OTHER PUBLICATIONS

National Diabetes Statistics Report, Estimates of Diabetes and Its Burden in the United States, 2023, 15 pages.
The Minimed Paradigm® REAL-Time Insulin Pump and Continuous Glucose Monitoring System, Insulin Pump User Guide, Medtronic, 2007, 180 pages.
Bluetooth SIG Proprietary: "Bluetooth Core Specification v 5.0, vol. 3: Core System Package [Host volume], Part H: Security Manager Specification, 3 Security Manager Protocol", Dec. 6, 2016 Retrieved from the Internet: URL:https://www.bluetooth.com/specifications/specs/core-specification-5-0/.
Invia: "Enabling Bluetooth Out-of-Band pairing through NFC", Nov. 19, 2019 (Nov. 19, 2019), XP093213123, Retrieved from the Internet: URL:https://web.archive.org/web/20191119034315/https://www.design-reuse.com/articles/47133/enabling-bluetooth-out-of-band-pairing-through-nfc.html.
Rodriguez et al., "A Batteryless Sensor ASIC for Implantable Bio-Impedance Applications," IEEE Transactions on Biomedical Circuits And Systems, IEEE, US, 10(3):533-544 (2016).
Supplementary Partial European Search Report mailed Oct. 25, 2024 in Application No. EP 21916112.
Abbott 2023 Annual Report, 86 pages (2023).
Abbott Press Release—"Abbott's FreeStyle Libre® is Named Best Medical Technology in Last 50 Years by the Galien Foundation", 2 pages (2022).
Abbott Press Release—"Abbott's FreeStyle® Libre 2 ICGM Cleared in U.S. for Adults and Children with Diabetes, Achieving Highest Level of Accuracy and Performance Standards", 3 pages (2020).
Abbott Press Release—"FreeStyle Libre Honored by Prix Galien", 4 pages (2019).
Abbott Press Release—"Real-World Data Show Abbott's FreeStyle Libre® Systems and GLP-1 Medicines Work Better Together for People with Type 2 Diabetes", 2 pages (2024).
Ahn, "Abbott's Euro Approved Wearable Glucose Monitor is Different than Anything on the Market", 6 pages (2014).
CDC National Diabetes Statistics Report, Nov. 29, 2023, 17 pgs.
CES 2022 Innovation Award Product, Innovation Awards Honorees, FreeStyle Libre 3 System, 1 page (2022).
Chicago Innovation Awards—Abbott Laboratories, retrieved from: https://chicagoinnovation.com/winners/abbott-laboratories/, 5 pages (2018).
Deposition of Gary Fletcher, Ph.D., dated Jun. 26, 2024, 54 pages in *Abbott Diabetes Care Inc., et al.* v. *Dexcom, Inc.*, Case No. 03946-82752US01, In the United States District Court for the District of Delaware.
Dexcom G5 Mobile, Continuous Glucose Monitoring System, Quick Start Guide, Dexcom, 36 pages (2020).
Dexcom G6 CGM Users Guide, 2022, 347 pgs., Revised Nov. 2022.
Dexcom G6, Start Here, Set up Guide, Dexcom, 20 pages (2022).
Dexcom G7, Overview Webpage, retrieved from: https://www.dexcom.com/g7-cgm-system, 20 pages (2024).
Dexcom G7, User Guide, Dexcom, 196 pages (2024).
Diabetes Product Review: Abbott FreeStyle Libre Flash Glucose Monitor, DiabetesMine, 6 pages (2017).
DXCM STS-7 CGM User Guide FCC Submission, 2006, 4 pgs.
Ex Parte Reexamination Certificate for U.S. Pat. No. 10,959,654, certificate issued on Aug. 5, 2024, 2 pages.
FreeStyle Libre 14 day, "Your FreeStyle Libre 14 day System", In-Service Guide, Abbott, 28 pages (2021).
FreeStyle Libre 2, Get Started, Your guide to the FreeStyle Libre 2 system, Abbott, 15 pages (2023).
FreeStyle Libre 3 Continuous Glucose Monitoring System, User's Manual, Abbott, 248 pages (Part 1—124 pages and Part 2—124 pages) (2023).
FreeStyle Libre 3 Flash Glucose Monitoring System, Get Started with the FreeStyle Libre 3 System, Abbott, 11 pages (2023).
FreeStyle Libre FAQs, retrieved from https://www.freestyle.abbott/uk-en/support/faq/question-answer.html?q=UKFaqquestion-55#, 2 pages (2024).
Galien Golden Jubilee Webpage—https://www.galienfoundation.org/galien-golden-jubilee, 3 pages (2022).
German Innovation Award—FreeStyle Libre 2—Measure Sugar without Piercing Using a Sensor and App, 1 page (2020).
Gonzales, et al., "The Progress of Glucose Monitoring—A Review of Invasive to Minimally and Non-Invasive Techniques, Devices and Sensors", Sensors, 19(4):800, 45 pages (2019).
Good Design Award—2017 Good Design Award, Abbott Japan Co., Ltd., Glucose Monitoring Systems, FreeStyle Libre, 9 pages (2017).
Gough, et al., "Perspectives in Diabetes, Development of the Implantable Glucose Sensor, What Are the Prospects and Why Is It Taking So Long?", Diabetes, vol. 44, pp. 1005-1009 (1995).
Hermanides, et al., "Current Application of Continuous Glucose Monitoring in the Treatment of Diabetes", Diabetes Care, vol. 34, Supp. 2, pp. S197-S201 (2011).
Joseph, et al., "Glucose Sensing in the Subcutaneous Tissue: Attempting to Correlate the Immune Response with Continuous Glucose Monitoring Accuracy", Diabetes Technology & Therapeutics, vol. 20, No. 5, pp. 321-324 (2018).
Letter from the U.S. Food & Drug Administration to Dexcom, Inc. regarding the Dexcom G7 Continuous Glucose Monitoring (CGM) System, 510(k) Premarket Notification and 510(k) summary, 10 pages, Dec. 7, 2022.
Lovett, "What's Next for Dexcom? CEO, CTO Talk G6 for Inpatient Use, Expanding CGMs for Patients without Diabetes", Global Edition, Digital Health, 17 pages (2020).
Medical Design Excellence Awards®, "27 Winners Announced at the 19$^{th}$ Annual Medical Design Excellence Awards (MDEA) Award Ceremony", 4 pages (2017).
Morak et al., "Design and Evaluation of a Telemonitoring Concept Based on NFC-Enabled Mobile Phones and Sensor Devices," IEEE Transactions on Information Technology in Biomedicine, Nov. 2011, 8 pgs.
News Release—Abbott—"BinaxNOW, FreeStyle Libre 2 Win BIG Innovation Honors", 6 pages (2021).
News Release—Abbott Ireland—"Abbott's FreeStyle Libre Flash Glucose Monitoring System Wins the IMSTA Most Innovative Product Multi-National Award 2017", 2 pages (2017).
News Release—Business Intelligence Group—"55 Chosen as Winners in Annual Big Innovation Awards", 3 pages (2018).
News Release—Edison Awards—"Edison Awards Announces 2016 Gold, Silver, and Bronze Awards Winners", 9 pages (2016).
Not Just A Patch, Dexcom G7 Release: The Most Exciting New Features, "Dexcom G7: These are the Most Exciting Features", 14 pages (2024).
Press Release—"Abbott's FreeStyle Libre® 3 Receives U.S. FDA Clearance—Features World's Smallest, Thinnest and Most Accurate 14-Day Glucose Sensor", 3 pages (2022).
Press Release—"Abbott's FreeStyle® Libre 14 Day Flash Glucose Monitoring System Now Approved in U.S.", 2 pages (2018).
The Edison Awards—About Us, Recognizing Global Innovation Excellence, 3 pages (2024).
The Edison Awards—Edison Best New Product Awards, 2022 Winners, 52 pages (2022).
The Edison Awards—Edison Best New Product Awards™, 2021 Winners, 19 pages (2024).
Van den Boom, et al., "Changes in the utilization of blood glucose test strips among patients using intermittent-scanning continuous glucose monitoring in Germany", Diabetes Obes Metab., 22:922-928 (2020).
Bergenstal, et al., Recommendations for Standardizing Glucose Reporting and Analysis to Optimize Clinical Decision Making in Diabetes: The Ambulatory Glucose Profile (AGP), Diabetes Technology & Therapeutics, vol. 15, No. 3, pp. 198-211 (2013).
CareLink Personal Software Quick Start Guide, 2015, 2 pgs.
Clancy, et al., "A new device for assessing changes in skin viscoelasticity using indentation and optical measurement", Skin Research and Technology, 16:210-228 (2010).
Dawson, "The Integration of Ground-based Real-time Telemetry Processing, On-board Chapter 10 Aircraft Data Recorders, and 802.11G Links," International Telemetering Conference Proceedings, Aug. 31, 2024, 5 pgs.

(56) References Cited

OTHER PUBLICATIONS

DexComTM STSTM Continuous Glucose Monitoring System, User's Guide, DexCom, Inc., 58 pages (2006).
DexComTM STSTM Sensor, User Guide, 51 pages (2006).
Diabetes Patents, FreeStyle Libre® Glucose Monitoring System, FreeStyle Libre® 2 Glucose Monitoring System and FreeStyle Libre® 3 Glucose Monitoring System, Abbott, 6 pages (2024).
FDA U.S. Food & Drug Administration, Premarket Approval (PMA), Dexcom G5 Mobile Continuous Glucose Monitoring System (Decision date: Sep. 16, 2016) 4 pages.
File Wrapper of U.S. Pat. No. 7,731,691 issued Jun. 8, 2010, 739 pages.
File Wrapper of US Trademark Registration No. 3154910 (CLEO), registered on Oct. 10, 2006, 67 pages.
FreeStyle Libre Flash Glucose Monitoring System, User's Manual, Abbott Diabetes Care Ltd., 126 pages (2017).
FreeStyle Navigator Continuous Glucose Monitoring System, User's Guide, Abbott Diabetes Care Inc., 191 pages (2008).
FreeStyle Navigator Continuous Glucose Monitoring System, User's Guide, Abbott Diabetes Care Inc., 38 pages (2008).
FreeStyle Navigator Continuous Monitoring System, Summary of Safety and Effectiveness Data in support of Pre-Market Approval (PMA) No. P980022, Abbott Diabetes Care, 25 pages (1999).
Grace et al., "Vehicle Network Concept Demonstration," International Telemetering Conference Proceedings, Aug. 31, 2024, 11 pgs.
HDP Spec, Health Device Profile, Jun. 26, 2008, 44 pgs.
Hodack, "Implementing iNET and the Operational Issues Involved," International Telemetering Conference Proceedings, Aug. 31, 2024, 8 pgs.
In vitro diagnostic test systems - Requirements for blood-glucose monitoring systems for self-testing in managing diabetes mellitus, European Standard, ISO 15197, 44 p. 2003.
Johnson et al., "Chapter 20, Telemetry for Biosensor Systems," Electrochemical Methods of Neuroscience, 13 pgs. (2007).
Kumar Das, et al., Review-Electrochemistry and Other Emerging Technologies for Continuous Glucose Monitoring Devices, ECS Sensors Plus, 1 031601, 19 pages (2022).
Letter from the Department of Health & Human Services, Food and Drug Administration to Mr. David H. Short at Smiths Medical MD, Incorporated re the Cleo 90 Infusion Set, Section 510(k) No. K042172, Premarket Notification dated Oct. 7, 2004, 3 pages.
Mathis et al., "TCP Selective Acknowledgment Options," Sun Microsystems, Oct. 1996, 14 pgs.
Mazze, et al., "Evaluating the Accuracy, Reliability, and Clinical Applicability of Continuous Glucose Monitoring (CGM): Is CGM Ready for Real Time", Diabetes Technology & Therapeutics, vol. 11, No. 1, pp. 11-18 (2009).
National Diabetes Statistics Report, CDC Diabetes, 14 pages (May 15, 2024).
Piper, et al., "Real-Time Continuous Glucose Monitoring in Pediatric Patients During and After Cardiac Surgery", Pediatrics, vol. 118, No. 3, pp. 1176-1184 (2006).
Rabiee, et al., "Numerical and Clinical Accuracy of a Continuous Glucose Monitoring System during Intravenous Insulin Therapy in the Surgical and Burn Intensive Care Units", Journal of Diabetes Science and Technology, vol. 3, Issue 4, pp. 951-959 (2009).
Sacks, et al., "Skin blood flow changes and tissue deformations produced by cylindrical indentors", Journal of Rehabilitation Research and Development, vol. 22, No. 3, pp. 1-6, 11 p. (1985).
Schneider, et al., "Evaluating the use of the Cleo® 90 infusion set for patients on a palliative care unit", International Journal of Palliative Nursing, vol. 15, No. 8, pp. 372-376 (2009).

Sohraby et al., "Wireless Sensor Networks. Technology, Protocols, and Applications," 2007, 326 pgs.
Standards of Medical Care in Diabetes-2007, American Diabetes Association, Diabetes Care, vol. 30, Supplement 1, pp. S4-S41 (2007).
The Wayback Machine, CleoTM 90 Infusion Set, Smiths Medical, 1 page (2006).
The Wayback Cleo 90 Infusion Set Training Guide, 1pg, (2006).
The Wayback Machine, DexCom Products and User Manuals - the Seven System and STS System Manuals, DexCom, 2 pages (2007).
The Wayback Machine, DexCom Products, The Seven System, DexCom, 2 pages (2007).
The Wayback Machine, FreeStyle Navigator Continuous Glucose Monitoring System, Answers to Frequently Asked Questions, Abbott Laboratories, 1 page (2008).
The Wayback Machine, FreeStyle Navigator Continuous Glucose Monitoring System, Introducing the new FreeStyle Navigator® Continuous Glucose Monitoring System, Abbott Laboratories, 2 pages (2008).
The Wayback Machine, FreeStyle Navigator® Continuous Glucose Monitoring System, Answers to Frequently Asked Questions, Abbott Laboratories, 2 pages (2007).
The Wayback Machine, Guardian® REAL-Time System, Features and Components, Medtronic MiniMed, Inc., 4 pages (2007).
The Wayback Machine, Medtronic Main Webpage, Medtronic MiniMed, Inc., 1 page (2007).
The Wayback Machine, Medtronic Product Information, Introducing the Guardian® REAL-Time Continuous Glucose Monitoring System, Medtronic MiniMed, Inc., 3 pages (2007).
The Wayback Machine, Medtronic Product Information, We are the Leader in Diabetes Management, Medtronic MiniMed, Inc., 2 pages (2007).
The Wayback Machine, News—CleoTM 90 Infusion Set from Smiths wins medical design excellence award, Smiths Medical, 1 page (2006).
The Wayback Machine, News & Events, Smiths Medical, 1 page (2006).
The Wayback Machine, Products and Promotions, Smiths Medical, 1 page (2006).
The Wayback Machine, Smiths Medical Cleo 90 Infusion Set, Ambulatory Infusion Disposables, 2 pages (2022).
The Wayback Machine, Smiths Medical Latest News, Smiths Medical, 2 pages (2006).
The Wayback Machine, Smiths Medical Main Webpage, Smiths Medical, 2 pages (2022).
The Wayback Machine Smiths Medical is Now Part of ICU, 2pgs (2022).
The Wayback Machine, The STS Seven Continuous Glucose Monitoring System, DexCom, 1 page (2007).
The Wayback Machine, U.S. Food and Drug Administration, Search Premarket Approval (PMA) Database, 1 page (2008).
U.S. Department of Veterans Affairs, Journal of Rehabilitation Research & Development (JRRD), "Jrrd 1980-1989" vol. 17-26, 3 pages (1980-1989).
U.S. Food and Drug Administration, 510(k) Premarket Notification, Cleo 90 Infusion Set, 1 page (2004).
U.S. Food and Drug Administration, Premarket Approval (PMA) Search Database, 1 page (2024).
ZigBee Specification, Jan. 17, 2008, 604 pgs.
EP 21916112.2 Extended Search Report, Jan. 23, 2025.
JP 2023-536025 Ofice Action, Jun. 26, 2025.

* cited by examiner

EMBEDDED SYSTEMS IN MEDICAL MONITORING SYSTEMS

PRIORITY

This application is a continuation of International Patent Application No. PCT/US2021/048521, filed 31 Aug. 2021, which claims the benefit under 35 U.S.C. § 119(e) of U.S. Provisional Patent Application No. 63/132,631, filed 31 Dec. 2020, which is incorporated herein by reference.

BACKGROUND

The disclosed subject matter relates to components and functions of embedded systems operating in medical devices, for example sensors for monitoring levels of analytes, such as glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, or the like.

While some of these medical devices are equipped with powerful processors and operate using a permanent power supply, other medical devices are designed to operate efficiently, using little power. Active medical sensors, including those used in monitoring levels of analytes, are one example of such medical devices. A medical sensor can include sensing hardware to detect raw values of signals that have been determined to correlate with levels of an analyte. The medical sensor can also be configured to perform on-device processing, for example applying algorithms and calibration parameters to the signals, to convert the raw values to levels of the analyte useful for monitoring the condition of the patient or for diagnosis and treatment. Medical sensors can further determine patterns or trends in the levels of analytes in the patient. Such processed information can be provided to the patient or other interested parties for review. To increase efficiency, components of the medical sensor can be dedicated to particular functions of the processing, but increased specialization of the components can also increase the cost of the components used in the medical sensor.

Active medical sensors are also an example of medical devices for which wireless communication capabilities can be incorporated. To facilitate review of medical information gathered about a user, medical sensors can communicate with other devices via wired or wireless communication to offload collected data for storage and/or analysis. Such other devices can include purpose-built devices dedicated for use with the medical sensors or can include multi-purpose medical devices that have been configured for use with the medical sensor. Wired communication can be used to communicate with a medical sensor still attached to the patient but can restrict or inhibit movement of the patient. After the medical sensor is removed from the patient, wired communication can reduce the availability of continuous and convenient monitoring. Wireless communication can be more convenient to allow communication without involving a physical connection to another device. However, it can be challenging to efficiently pair medical sensors with other devices in a seamless manner for end users while still protecting sensitive data from interception and tampering.

In addition, at least in part because active medical sensors can be worn by a patient, attached, for example to the patient's skin, the medical sensor can be designed to operate for extended periods of time using an internal power source. When the internal source is depleted, the low-power medical device can be discarded. Accordingly, there is an opportunity for systems and methods which can be embodied in and implemented by low-power medical devices to increase the computational- and power-efficiency of the devices while reducing the cost of production of the medical devices and maintaining the ability of the medical devices to perform expected functions, such as secure wireless communication, simple application and activation, and compatibility with a variety of receiving devices.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the drawings.

To achieve these and other advantages and in accordance with the purpose of the disclosed subject matter, as embodied and broadly described, the disclosed subject matter includes an embedded system used by a medical sensor and methods of operation thereof. Exemplary configuration of the medical sensor can include a medical sensor including an application-specific integrated circuit (ASIC), medical hardware, and a communication module. The medical hardware can be configured to be partially inserted into a body of a patient. As an example, the medical hardware can be configured to detect body temperature, heart rate, analyte levels, or motion readings. Analytes measured by the analyte sensors can include, by way of example and not limitation, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, etc. The ASIC can be communicatively coupled to the medical hardware and communication module. The ASIC can be configured to receive measurement signals from the medical hardware and provide the measurement signals to the communication module. The communication module can be configured to process the measurement signals into measurement results. As embodied herein, the communication module can be further configured to provide the measurement results to a receiving device for display via wireless communication. As embodied herein, the communication module can operate an application layer for processing the measurement signals and a link layer to manage providing the measurement results to a remote device. The communication module can be a physically separated module from the ASIC. As embodied herein, the communication module can be further configured to detect a change in temperature of the medical sensor and adjust a transmission power associated with the wireless communication in response to the change in temperature.

According to aspects of the disclosed subject matter, the ASIC can be configured to detect an activation request from a computing device via a first communication channel and communicate the activation request to the communication module. The communication module can be configured to send an authentication request to the computing device via a second communication channel. As embodied herein, the ASIC can be further configured when detecting the activation request from the computing device to receive wireless power and use the wireless power to cause activation of the communication module. As embodied herein, the communication module can be further configured to send communication parameters for facilitating communication between the medical sensor and the computing device via the second communication channel to the computing device. As embodied herein, the first communication channel can be compliant with a near-field communication protocol and the second communication channel can be compliant with a Bluetooth Low-Energy protocol. According to aspects of the disclosed subject matter, the communication module can include a memory that stores device-specific data uniquely associated with the ASIC. The communication module can be further configured to, upon activation of the medical sensor, read device-specific data from a memory of the ASIC and compare the device-specific data read from the memory of the ASIC to the device-specific data stored in the memory of the communication module to verify the integrity of the device-specific information. As embodied herein, the ASIC or communication module can be configured to detect a communication request from a computing device that includes a manufacturer code corresponding to the computing device and in response to the communication request, compare the manufacturer code to a set of manufacturer codes stored in a memory of the ASIC. The response to the communication request can be based on the result of the comparison. As embodied herein, the communication module can be configured to, in response to the communication request, compare the manufacturer code to a set of manufacturer codes stored in a memory of the communication module. The response to the communication request can be based on the result of the comparison.

According to aspects of the disclosed subject matter, systems and methods can include detecting, by an application-specific integrated circuit (ASIC) of a medical sensor, that a voltage supplied to the ASIC has fallen below a threshold level. The ASIC can determine an amount of time that the voltage has been below the threshold level. The ASIC can respond to the voltage supplied to the ASIC being below a threshold level based on the determined amount of time. As embodied herein, the ASIC can determine that the voltage supplied to the ASIC satisfies a second threshold level. When the determined amount of time is below a threshold amount of time, responding to the voltage being below a threshold level can include causing the ASIC to reset. As embodied herein, the ASIC can determine that the voltage supplied to the ASIC satisfies a second threshold level. When the determined amount of time is above a threshold amount of time, responding to the voltage being below a threshold level can include causing the ASIC to enter a storage or shutdown mode. As embodied herein, the medical sensor can gather medical data prior to detecting that the voltage supplied to the ASIC has fallen below the threshold level. Then, responding to the voltage being below the threshold level can include erasing the gathered medical data. Additionally or alternatively, responding to the voltage being below the threshold level further can include disqualifying one or more future measurements gathered by the medical sensor. As embodied herein, the medical data can include body temperature, heart rate, blood glucose levels, or motion readings. It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the methods and systems of the disclosed subject matter. Together with the description, the drawings explain the principles of the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts.

DETAILED DESCRIPTION

Figure 1:
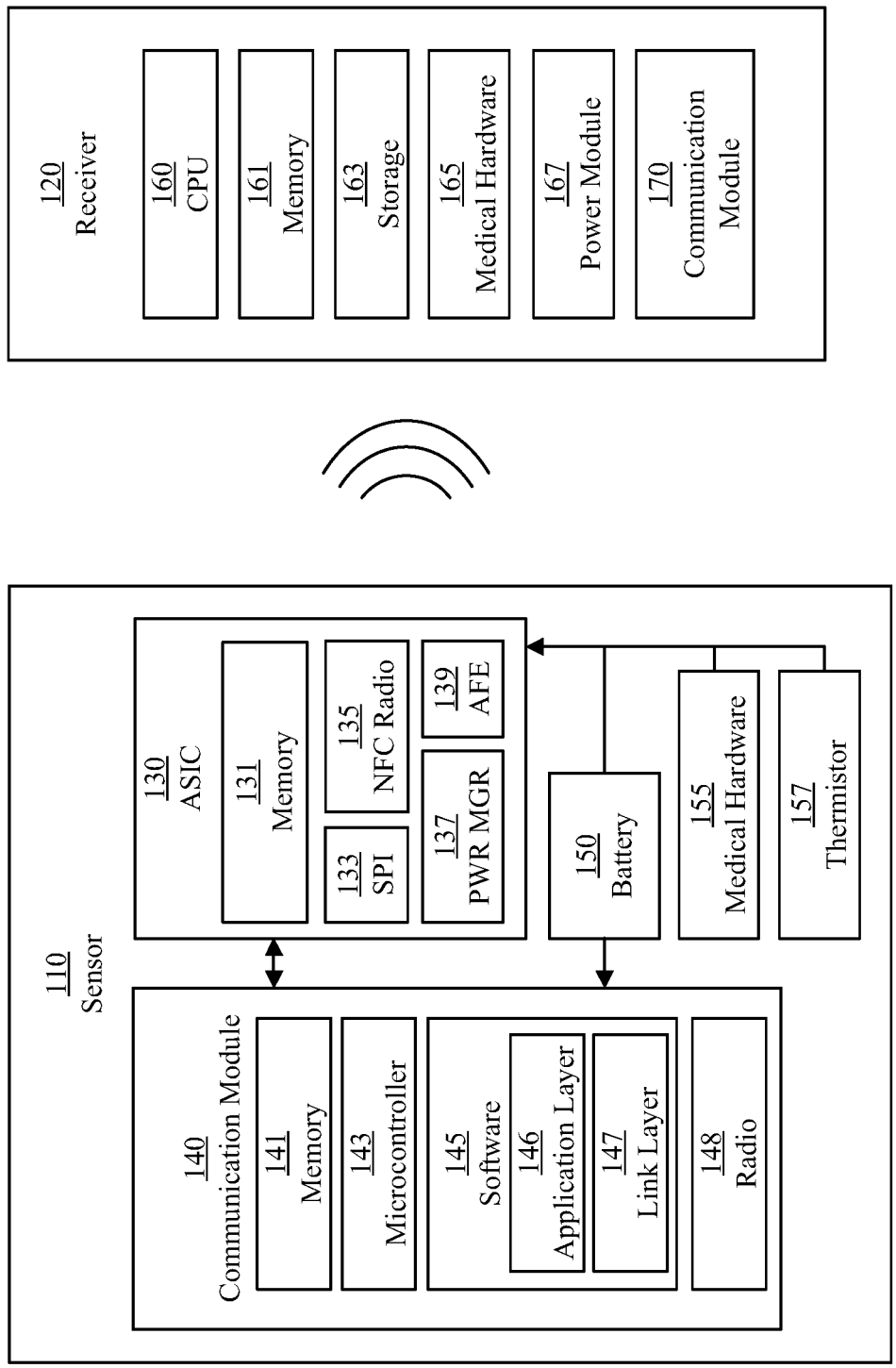
FIG. 1 is a diagram illustrating an example sensor and a receiver for communication with the example sensor according to exemplary embodiments of the disclosed subject matter.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system The systems and methods presented herein can be used for secure operations of a sensor used in a medical monitoring system. As used herein, "medical sensor" or "sensor" can refer to any device capable of receiving sensor information from a user useful for medical purposes, including for purpose of illustration but not limited to, body temperature sensors, blood pressure sensors, pulse or heart-rate sensors, glucose level sensors, analyte sensors, physical activity sensors, body movement sensors, or any other sensors useful for medical purposes. The purpose and advantages of the disclosed subject matter will be set forth and apparent from the description that follows. Additional advantages of the disclosed subject matter will be realized and attained by the methods, apparatus, and devices particularly pointed out in the written description and claims thereof, as well as from the appended drawings.

A medical sensor includes an application-specific integrated circuit (ASIC), medical hardware, and a communication module. The ASIC is communicatively coupled to the medical hardware and communication module. The ASIC is configured to receive measurement signals from the medical hardware and provide the measurement signals to the communication module. The communication module is configured to process the measurement signal into measurement results and transmit the measurement results to a remove device. The communication module includes an application layer for processing the measurement signals and a link layer for transmitting the measurement results. The ASIC is configured to detect that a voltage supplied to the ASIC is below a threshold level and determine an amount of time that the voltage has been below the threshold level. The ASIC is further configured to respond to the voltage supplied to the ASIC being below a threshold level based on the determined amount of time. In accordance with the disclosed subject matter, for purpose of illustration and not limitation, a medical sensor can include an application-specific integrated circuit (ASIC), medical hardware, and a communication module. The medical hardware can be configured to be partially inserted into a body of a patient. As an example, the medical hardware can be configured to detect body temperature, heart rate, analyte levels, or motion readings. Analytes measured by the analyte sensors can include, by way of example and not limitation, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, etc. The ASIC can be communicatively coupled to the medical hardware and communication module. The ASIC can be configured to receive measurement signals from the medical hardware and provide the measurement signals to the communication module. The communication module can be configured to process the measurement signals into measurement results. As embodied herein, the communication module can be further configured to provide the measurement results to a receiving device for display via wireless communication. As embodied herein, the communication module can operate an application layer for processing the measurement signals and a link layer to manage providing the measurement results to a remote device. The communication module can be a physically separated module from the ASIC. As embodied herein, the communication module can be further configured to detect a change in temperature of the medical sensor and adjust a transmission power associated with the wireless communication in response to the change in temperature.

According to aspects of the disclosed subject matter, the ASIC can be configured to detect an activation request from a computing device via a first communication channel and communicate the activation request to the communication module. The communication module can be configured to send an authentication request to the computing device via a second communication channel. As embodied herein, the ASIC can be further configured when detecting the activation request from the computing device to receive wireless power and use the wireless power to cause activation of the communication module. As embodied herein, the communication module can be further configured to send communication parameters for facilitating communication between the medical sensor and the computing device via the second communication channel to the computing device. As embodied herein, the first communication channel can be compliant with a near-field communication protocol and the second communication channel can be compliant with a Bluetooth Low-Energy protocol.

According to aspects of the disclosed subject matter, the communication module can include a memory that stores device-specific data uniquely associated with the ASIC. The communication module can be further configured to, upon activation of the medical sensor, read device-specific data from a memory of the ASIC and compare the device-specific data read from the memory of the ASIC to the device-specific data stored in the memory of the communication module to verify the integrity of the device-specific information. As embodied herein, the ASIC or communication module can be configured to detect a communication request from a computing device that includes a code or more specifically a manufacturer code corresponding to the computing device and in response to the communication request, compare the manufacturer code to a set of manufacturer codes stored in a memory of the ASIC. The response to the communication request can be based on the result of the comparison. As embodied herein, the communication module can be configured to, in response to the communication request, compare the manufacturer code to a set of manufacturer codes stored in a memory of the communication module. The response to the communication request can be based on the result of the comparison.

According to aspects of the disclosed subject matter, systems and methods can include detecting, by an application-specific integrated circuit (ASIC) of a medical sensor, that a voltage supplied to the ASIC has fallen below a threshold level. The ASIC can determine an amount of time that the voltage has been below the threshold level. The ASIC can respond to the voltage supplied to the ASIC being below a threshold level based on the determined amount of time. As embodied herein, the ASIC can determine that the voltage supplied to the ASIC satisfies a second threshold level. When the determined amount of time is below a threshold amount of time, responding to the voltage being below a threshold level can include causing the ASIC to reset. As embodied herein, the ASIC can determine that the voltage supplied to the ASIC satisfies a second threshold level. When the determined amount of time is above a threshold amount of time, responding to the voltage being below a threshold level can include causing the ASIC to enter a storage or shutdown mode. As embodied herein, the medical sensor can gather medical data prior to detecting that the voltage supplied to the ASIC has fallen below the threshold level. Then, responding to the voltage being below the threshold level can include erasing the gathered medical data. Additionally or alternatively, responding to the voltage being below the threshold level further can include disqualifying one or more future measurements gathered by the medical sensor. As embodied herein, the medical data can include body temperature, heart rate, blood glucose levels, or motion readings.

A low-power medical monitoring system can include a system of components designed to provide monitoring of medical statistics about a human or animal body or can provide for other medical operations based on the configurations of the various components. For example, a low-power medical monitoring system can provide continuous glucose monitoring to users or can provide for the delivery of drugs and other medicants. As embodied herein, the system can include a low-power medical device 110, also referred to as a sensor worn by the user or attached to the body for which information is being collected. As embodied herein, the sensor 110 can be a sealed, disposable device, to improve ease of use and reduce risk of tampering, as discussed further herein. The low-power medical monitoring system 100 can further include a data reading device 120 configured as described herein to facilitate retrieval of data form the sensor 110 and delivery of related information to a user. The data reading device 120 can be a single-purpose device created specifically to communicate with the sensor 110. As embodied herein, data reading device 120 can include a multi-purpose hardware device—such as a mobile phone, tablet, personal computing device, or other similar computing device capable of communicating with the sensor 110 over a communication link—further configured with a software library or application licensed to a third-party. When executing the software library or application, the multi-purpose device can securely communicate with the sensor 110. As used herein, a data receiving device or receiver refers equally to a dedicated data receiving device or a multi-purpose data receiving device.

Throughout this disclosure the low-power medical device 110 can be referred to as a sensor for simplicity. As embodied herein, the sensor 110 can include small, individually-packaged disposable devices with a predetermined active use lifetime (e.g., 1 day, 14 days, 30 days, etc.). Sensors 110 can be applied to the skin of the patient body and remain adhered over the duration of the sensor lifetime. As embodied herein, sensors 110 can be designed to be selectively removed and remain functional when reapplied. The role of the sensor 110 can be defined by the nature of medical hardware embodied in the sensor 110.

For purpose of illustration and not limitation, reference is made to the exemplary embodiment of a sensor 110 for use with the disclosed subject matter as shown in FIG. 1. FIG. 1 illustrates a block diagram of an example sensor 110 according to exemplary embodiments compatible with the embedded systems architecture and communication schemes described herein. As embodied herein, the sensor 110 can include a printed circuit board ("PCB") acting as a backplate for the electronic components of the sensors. Coupled to the PCB is an application-Specific Integrated Circuit ("ASIC") 130 communicatively coupled with a communication module 140, medical hardware 155 selected for the monitoring function of the sensor 110, and a thermistor 157. The ASIC 130 and communication module 140 can also be coupled to a battery 150 supplying power to the ASIC 130, communication module 140, and other components of the sensor 110 not illustrated. The ASIC 130 and the communication module 140 can be physically separate modules, as illustrated in FIG. 1. Alternatively, the ASIC 130 and the communication module 140 can both be integrated into a single chip.

As embodied herein, as the sensor 110 is designed to be power-efficient, low-cost, and can be disposable, the ASIC 130 can include on-board non-volatile memory 131. The ASIC can include a single reference clock, used for communication and programming, memory management, on-chip timers, etc. The ASIC 130 can receive power from the battery 150, regulated by the power manager 137. Under conditions described herein components of the ASIC 130 can receive power from nearby fields via coupling with a communication chipset embedded in the ASIC 130 (e.g., with the NFC radio front end 135). The NFC radio front end 135 can be compliant with relevant power-delivery standards. As described herein, the NFC radio front end 135 can be activated once the battery 150 is connected. Alternatively, the NFC radio front end 135 can be used to activate the sensor 110 and turn on the battery 150. The ASIC 130 can further include a serial-peripheral interface (SPI) 133 and analog front end (AFE) 139 for communicating with the other components of the sensor 110. For example, the SPI 133 can be used for communicating with the communication module 140 as described herein. The SPI 133 can also be sued for testing and for programming the components of the sensor 110 during manufacture. Similarly, the AFE 139 can be used for communication with the medical hardware 160. The sensor 110 can also include a communication module 140, as will be described herein.

The non-volatile memory 131 can be programmed by the manufacturer of the ASIC 130, by the manufacturer of the sensor 110 (if the two are manufactured by different entities or at different times) or during other configuration processes. The non-volatile memory 131 of the ASIC 130 can be programmed to include information such as an identifier for the ASIC 130. The identifier can be used to uniquely identify the ASIC 130 for identification and tracking purposes. The non-volatile memory 131 of the ASIC 130 can also be programmed with configuration or calibration parameters for use by the sensor 110 and its various components, including the NFC radio 165, power manager 137, analog front-end 139, medical hardware 155, or by the communication module 140, as discussed herein.

The non-volatile memory can be further programmed to include a manufacturer code as part of, or separate from, the identifier for the ASIC 130, communication module 140, or other components of the sensor 110. As an example, each manufacturer of components that can be used in the sensor 110 can be assigned an internationally-recognized code as designated by a standards-setting organization, such as, by way of example only, the International Organization for Standardization. The manufacturer code can be used to identify the manufacturer of the ASIC 130. As embodied herein, the manufacturer code can be used to verify compatibility with the sensor 110. For example, the sensor 110 can be configured to only be used receivers 120 (or other devices) associated with or produced by a manufacturer from a list of known manufacturers, e.g., a "whitelist", as recognized by the manufacturer code. As another example, the sensor 110 can be configured to refuse operability with receivers 120 associated with or produced by manufacturer's on a list of forbidden manufacturers, e.g., a "blacklist". Similarly, the receiver 120 can be configured to only be compatible with sensors 110 associated with or produced by select manufacturers.

In one embodiment, the determination of whether a device attempting to communicate or operate with the sensor 110 will be recognized by the sensor 110 can be made by the ASIC 130. As described, the list of valid or invalid manufacturer codes can be programmed into the non-volatile memory 131 of the ASIC 130. The ASIC 130 can then compare its list of manufacturer codes to the manufacturer code of the device attempting to communicate with the sensor 110. Making this determination at the ASIC 130 can be advantageous as the non-volatile memory 131 can be protected from alteration after manufacture of the ASIC 130 and sensor 110 is completed. In another embodiment, the determination of whether to allow communication with a device can be made by the communication module 140. As an example, the communication module 140 can be updated by the provider of the sensor 110 to update a list of valid or invalid manufacturer codes (e.g., during a firmware update process). In this way, the list of valid or invalid manufacturer codes is not fixed at time of manufacture but can be adjusted by the provider of the sensor 110 over time. For example, a new manufacturer can be approved for interoperability or a previously-approved manufacturer can be blocked.

The update process, whether through a firmware update or other process for updating data stored by the sensor 110 and specifically the communication module can be performed through communication between the communication module 110 and an update server provided by the provider of the sensor 110 or an authorized representative thereof. The communication module 140 can connect to the update server via any of a variety of network protocols. For example, the communication module 140 can include one or more long-range communication transceivers to allow the communication module 140 to communicate on a wide area network and with the update server. As an example only, the communication module 140 can incorporate one or more broadband cellular network radios (and accompanying chipsets) to communicate using, for example third generation (e.g., HSPA, HSPA+), fourth generation (e.g., Mobile WiMAX, LTE, LTE Advanced Pro), fifth generation (e.g., low-band, mid-band, high-band) standards. The communication module 140 can additionally or alternatively include Wi-Fi radios and chipset to communicate with the wide area network. Additionally or alternatively, the update process can be mediated by a second device, such as a mobile phone or personal computing device. The second device can securely receive an update from the update server and deliver the update the sensor 110. Relatedly, the sensor 110 can use the communication capabilities of the second device to connect with the update server.

As an example only and not by way of limitation, example communication modules 140 of the sensor 110 can include chipsets compatible with a variety of communication protocols, including Bluetooth Low-Energy ("BLE"), Near-Field Communication ("NFC"), similar short-range communication schemes, wireless personal area networks (WPAN) or piconets, wireless body area networks (WBAN), the Zigbee protocol, WIMAX protocols, or other IEEE 802.15 or IEEE 802.11 protocols, or infrared communication protocols according to the Infrared Data Association standards (IrDA), etc. The communication module 140 can transmit and receive data and commands via interaction with similarly-capable communication modules 160 of a receiver 120. As described herein, the communication module 140 can include a microcontroller 143 for executing software operations defined in memory storing software blocks 145. The software 145 can be written to the appropriate memory as a one-time programmable memory. The software 145 can include software directed to an application layer 146 and a link layer 147. The application layer 146 can include application software programmed to the communication module to control functions of the sensor 110 related to medical operations, recording measurements, analyzing measurements, data processing, security applications, anti-fraud applications, error handling, and other customized functions. The link layer 147 can include software programmed to the communication module 140 used to facilitate communication using the chosen communication protocol. As an example, where the communication module includes a BLE chipset, the link layer 147 can include software configured to manage communications using the BLE protocol. The link layer 147 can be preconfigured or updated by the manufacturer of the communication module 140, whereas the application layer 146 can be specially configured or updated by the manufacturer of the sensor 110.

The communication module 140 can further include a memory 141 for supporting the operations of the microcontroller 143. The communication module 140 can further include interfaces (not illustrated) for communicating with the other components of the sensor 110. As embodied herein, the microcontroller 143 of the communication module 140 can be relatively more capable than the ASIC 130. As described herein, the microcontroller 143 of the communication module 140 can be a general, reprogrammable processor configured to handle more processing-intensive tasks than the ASIC 130.

As embodied herein, the sensor 110 can be a disposable device with a predetermined life span, and without wide-area network communication capability. As embodied herein, the communication module 140 can provide for communication under battery power. Although this disclosure is described with respect to exemplary configurations of the sensor 110, other suitable configurations are envisioned. As an example, processing hardware of the sensor 110 can be implemented as another type of special-purpose processor, such as a field programmable gate array (FPGA). As embodied herein, the processing hardware of the sensor 110 (e.g., of the communication module 140) can include a general-purpose processing unit (e.g., a CPU) or another programmable processor that is temporarily configured by software to execute the functions of the sensor 110. More generally, the processing hardware can be implemented using hardware, firmware, software, or a suitable combination of hardware, firmware, and software. For purpose of illustration and not limitation, the processing hardware of the sensor 110 can be defined by one or more factors including computational capability, power capacity, memory capacity, availability of a network connection, etc.

As embodied herein, the processing responsibilities of the ASIC 130 and communication module 140 can be divided based on computational complexity and computational resources. The ASIC 130 can be configured to focus on interpreting measurements and other data from the medical hardware 155. For example, the ASIC 130 can be specially configured to interpret the analog signals output by the medical hardware 155 and received by the ASIC 130 through the AFE 139. Through interpretation, the ASIC 130 can create digital measurements suitable for use in algorithms executed by the communication module 140. The communication module 140 can in turn perform advanced processing on the raw measurement signals received from the ASIC 130. For example, the communication module 140 can analyze the measurement signals to derive analyte levels and identify trends and actionable responses for the patient, which are then transmitted to the receiver 120. In certain embodiments, the ASIC 130 can also be configured to derive analyte levels and identify trends and actionable responses for the patient, before providing the analysis to the communication module 140 to transmit to the receiver 120.

To perform its medical functionalities, the sensor 100 can further include suitable medical hardware 155 appropriate to its function. As embodied herein, the medical hardware 155 can include, for example, an autoinjector prescribed to a patient for self-administering a drug or other medicament. Accordingly, the medical hardware 155 can include a mechanism that drives a needle or a plunger of a syringe in order to subcutaneously deliver a drug. The syringe can be pre-filled with the drug and can operate in response to a triggering event. For example, the mechanism can drive the needle into the patient and advance the plunger to deliver the drug subcutaneously via the needle.

As embodied herein, the sensor 110 can be configured as an on-body injector attachable to a patient's body tissue (e.g., skin, organ, muscle, etc.) and capable of automatically delivering a subcutaneous injection of a fixed or patient-selected dose of a drug over a controlled or selected period of time. In such embodiments, the medical hardware 155 or low-power medical device can include, for example, an adhesive or other means for temporarily attaching the medical hardware 155 to the patient's body tissue, a primary container for storing a drug or medicament, a drive mechanism configured to drive or permit the release of a plunger to discharge the drug from the primary container, a trocar (e.g., a solid core needle), a flexible cannula disposed around the trocar, an insertion mechanism configured to insert the trocar and/or flexible cannula into the patient and optionally retract the trocar leaving the flexible cannula in the patient, a fluid pathway connector configured to establish fluid communication between the primary container and the flexible cannula upon device activation, and an actuator (e.g., a user displaceable button) configured to activate the device. As embodied herein, the on-body injector can be pre-filled and/or pre-loaded.

In addition to mechanical components, the medical hardware 155 can include electric and/or electronic components. For example, an electronic switch can be coupled to the mechanism. The sensor 110 can establish an authenticated communication, receive an encrypted signal, decrypt the signal using the techniques of this disclosure, determine that the signal includes a command to operate the switch, and cause the switch to drive the needle. Thus, the low-power computing device embodied herein can be configured to perform a medical function using the medical hardware 155 in response to a remote command.

As embodied herein, the medical hardware 155 can include a travel sensor and an analog-to-digital converter (ADC) to generate a digital signal indicative of the distance travelled by the needle or plunger. Upon delivering the medicament, the sensor 110 can obtain a reading from the sensor, encrypt the reading using the techniques of this disclosure, and securely report the reading to the peer device 14. Additionally or alternatively, the sensor 110 can report other measurements or parameters, such as a time at which the medicament was delivered, volume of medicament delivered, any issues encountered while delivering the medicament, etc. The sensor 110 can be configured to provide data related to the operation of the medical hardware 155 to a remote device.

The medical hardware 155 can be configured to implement any suitable combination of one or more medical functions and can include one or more sensing components. Such sensing components can be configured to detect an operational state of the sensor 110 (e.g., unpackaged/ready for administration, sterile barrier removal, contact with patient's body tissue, cannula and/or needle insertion, drug delivery initiation, actuator or button displacement, drug delivery completion, plunger position, fluid pathway occlusion, etc.), a condition of the sensor 110 or drug contained therein (e.g., temperature, shock or vibration exposure, light exposure, drug color, drug turbidity, drug viscosity, geographic location, spatial orientation, temporal information, ambient air pressure, etc.), and/or physiological information about the patient (e.g., body temperature, blood pressure, pulse or heart rate, glucose levels, physical activity or movement, fingerprint detection, etc.).

The medical hardware 155 can be connected electrically to the PCB via multiple electrical connections, e.g., a working connection, a reference connection, a counter connection. In embodiment in which the medical hardware 155 includes an analyte sensor incorporating multiple electrodes, each electrical connection can correspond to one or more of the electrodes. Voltage from these connections can be delivered to the ASIC 130 (e.g., through the analog front end 139). The analyte sensor can generate a current that flows between the electrodes and is dependent on an analyte concentration and temperature. The ambient conditions of the analyte sensor can also change over time which can affect the voltage readings from the medical hardware provided to the ASIC 130. The potential of one or more of the electrical connections (e.g., the counter connection) can be adjusted correspondingly to ensure a relatively constant target voltage over other electrical connections (e.g., the reference connection) for interpretation to determine analyte levels.

Figure 22:
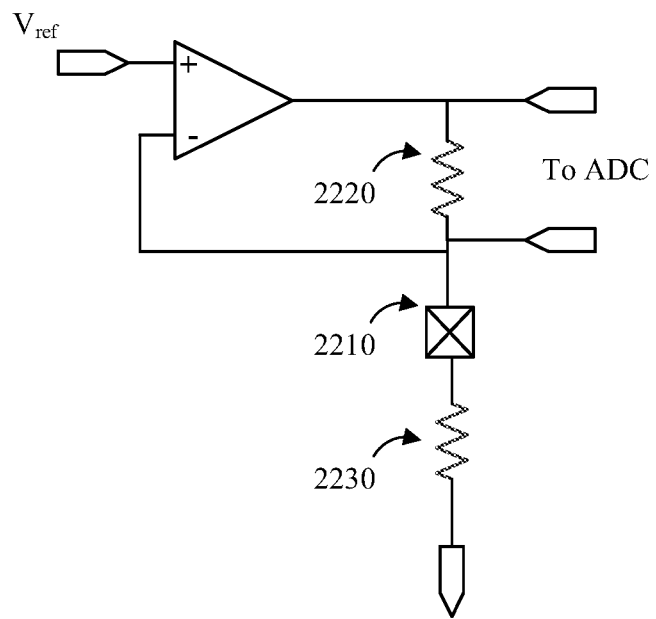
FIG. 22 is a diagram illustrating example functionality of a measurement along a thermistor of the sensor according to exemplary embodiments of the disclosed subject matter.

The thermistor 157 can include one or more thermistors to measure the skin temperature of a patient to which the sensor 110 is attached or other aspects of the operating environment of the sensor 110, and especially the medical hardware 155. As embodied herein, user skin measurement can be implemented with a single element thermistor and a trimmed resistive elements within the ASIC 130. The thermistor can be positioned so that its active element is positioned in close proximity to the sensor element (e.g., an analyte sensor sensing element) and in as close thermal contact with the patient's skin as possible. FIG. 22 illustrates an diagram of the thermistor measurement function 2200. To measure the thermistor temperature, ASIC 130 biases the thermistor element 2210 in series with a trimmed resistive element 2220 and resistive element 2230 included in the ASIC 130. The ASIC 130 measures the voltage across the resistive elements 2220 and 2230. The ASIC 130 can average multiple measurement results depending on a selected sampling frequency. The conversion to temperature can be an iterative calculation, first calculating the temperature based on the trimmed resistive element value and the Steinhart coefficients of the thermistor. Then a second calculation is performed applying the temperature correction for the resistive element. The calculations can further include device specific parameters provided with the ASIC 130.

FIG. 1 further illustrates an architectural diagram of an exemplary embodiment of a receiver 120 for use with the disclosed subject matter. As embodied herein, the receiver 120 can include a small-form factor device. The receiver 120 can optionally not be as memory- or processing-power constrained as the sensor 110, and as embodied herein, the receiver 120 can include sufficient memory for operational software storage and data storage, and sufficient RAM for software execution to communicate with sensor 110 as described herein. The receiver 120 can include a CPU 160, memory 161, and storage 163, communicatively coupled with a communication module 170. Power for the components of the receiver 120 can be delivered by a power module 167, which as embodied herein can include a rechargeable battery, allowing for sustained operations and continued use.

The receiver 120 can be configured to wirelessly couple with, or scan the sensor 110 and retrieve data, e.g., sensitive medical data, therefrom. As embodied herein, the receiver 120 can optionally include medical hardware 165 similar to, or expanded from, the medical hardware 155 of the sensor 110. As an example only, and not by way of limitation, in an embodiment in which the medical hardware 155 of the sensor 110 is configured for continuous glucose monitoring, the medical hardware 167 of the receiver 120 can be configured with a blood glucose meter, compatible for use with blood glucose test strips, thus expanding on the blood glucose monitoring of the sensor 110. In additional embodiments, the receiver 120 does not include the additional medical hardware 165.

As embodied herein, the receiver 120 can be configured to operate, with respect to the sensor 110 as described herein, as an NFC scanner and a BLE end point via specific modules of the communication module 170. As embodied herein, the receiver 120 can be configured for communication with via a Universal Serial Bus (USB) of the communication module 170. As embodied herein, the on-board storage 163 of the receiver 120 can be capable of storing medical data received from the sensor 110 over an extended period of time. Further, the receiver 120 can be configured to communicate with a user computing device or remote cloud server via a wide area network.

Upon successful activation of the sensor 110 by a receiver 120, the sensor 110 can be configured to collect medical data and makes that data available to the receiver 120. The receiver 120 acts as a collector. As an example, the receiver can pair with the sensor 110 over an NFC interface, providing short-range power to the sensor 110 and communicatively coupling with the sensor 110 over said NFC interface. Alternatively, the receiver 120 can communicatively couple with the sensor 110 over a medium-range interface, such as a Bluetooth or Bluetooth Low Energy ("BLE") interface or any suitable interfaces compatible with the communication protocols implemented by the sensor 110, as described herein. The sensor 110 can transmit medical data used for medical monitoring and alarms functions.

As used throughout this disclosure, Bluetooth Low Energy refers to a medium-range communication protocol configured to make paring of Bluetooth devices simple for end users. As described herein, the use of BLE on the sensor 110 can optionally not rely on standard BLE implementation of Bluetooth for security but can instead use application layer encryption using one or more block ciphers to establish mutual authentication and encryption. The use of a non-standard encryption design implemented in the application layer has several benefits. One benefit of this approach is that the user can complete the pairing of the sensor 110 and receiver 120 with only an NFC scan and without involving the user providing additional input, such as entering a security pin or confirming BLE pairing between the data receiving device and the sensor 110. Another benefit is that this approach mitigates the potential to allow devices that are not in the immediate proximity of the sensor 110 to inadvertently or intentionally pair, at least in part because the information used to support the pairing process is shared via a back-up short-range communication link (e.g., NFC) over a short range instead of over the longer-range BLE channel. Furthermore, as BLE pairing and bonding schemes are not involved, pairing of the sensor 110 can avoid implementation issues by chip vendors or vulnerabilities in the BLE specification.

As the data collected by the sensor 110 and exchanged between the sensor 110 and data receiving device pertain to medical information about a user, the data is highly sensitive and can be beneficial to be protected. Medical data associated with a patient is sensitive data at least in part because this information can be used for a variety of purposes, including for health monitoring and medication dosing decisions. As embodied herein, encryption and authentication can be used as two of the primary technical controls for providing protective features. As embodied herein, the sensor 110 and receiver 120 can be configured compliant with a security interface designed to protect the Confidentiality, Integrity and Availability ("CIA") of this communication and associated data. To address these CIA concerns, security functions can be incorporated into the design of the hardware and software.

To facilitate the confidentiality of data, communication connections between the sensor 110 and receiver 120 can be mutually authenticated prior to transmitting sensitive data by either device. Communication connections can be encrypted using a device-unique or session-unique encryption key. To guarantee the integrity of data, to ensure that patient data is unmodified, encrypted communications between the sensor 110 and receiver 120 can be verified with transmission integrity checks built into the communications. As embodied herein, session key information, which can be used to encrypt the communication, can be exchanged between two devices after the devices have each been authenticated.

As embodied herein, the sensor 110 and receiver 120 can each employ a variety of security practices to ensure the confidentiality of data exchanged over communication sessions and facilitate the relevant devices to find and establish connections with trusted endpoints. As an example, the sensor 110 can configure the communication module 140 to use preconfigured advertising parameters with a public device address. The communication module can send connectable undirected advertising events and process scans and connection requests from all receivers 120. The sensor 110 can request the communication module 140 to start advertising immediately after it is activated. The communication module 140 can continue to advertise until it receives and accepts a connection request packet. Once connected to a receiver 120, the communication module 140 can be no longer discoverable. No other device can connect to it. The communication module 140 can also stop advertising if no connection request packet is received within a predefined amount of time (e.g., two second, four seconds). The sensor 110 can stop advertising by configuring the communication module to non-discoverable mode. Once in the non-discoverable mode, the communication module 140 stops sending advertising events, and no device can discover or connect to it. To restart advertising, the sensor 110 requests the communication module 140 to advertise on every other instance when a measurement is logged. Therefore, if the sensor 110 is not connected to a receiver 120, it can restart advertising every two minutes. When a sensor 110 is both activated and is in a state in which no measurement data is logged, the sensor 110 can use a timer to continue the same advertising schedule.

These characteristics safeguard against specific denial of service attacks, and in particular against denial of service attacks on a BLE interface. As embodied herein, the identifiers used to connect to the sensor 110 can be mutable to reduce the ability to track a single sensor 110 as it connects to one or more data receiving devices. Connection identifiers for the sensor 110 or data receiving device can include, as an example only, a unique or semi-unique device identifier, a media access control address for the communication module of the device, a device address configured for the particular communication protocol (e.g., a BLUETOOTH address, etc.), internet protocol address, an identifier assigned to the device by the low-power medical monitoring system, a universally-agreed identifier for the type of device that is broadcasting, etc. The sensor 110 can change identifiers between sensor 110 activation and pairing with the first receiver 120. If the sensor 110 disconnects from the first receiver 120 during its active use timeline, the sensor 110 can change the connection identifier on disconnection or on receiving a request for a new connection with a second receiver 120.

As embodied herein, the sensor can support establishing long-term connection pairs by storing encryption and authentication keys associated with data receiving devices, or support a data receiving device storing an encryption and authentication key for the sensor 110 for a prolonged period of time. For example, the sensor 110 or data receiving device can associate a connection identifier for the other party to the exchange in association with the encryption and authentication keys used by the other party. In so doing, the sensor 110 can establish connections with a data receiving device more quickly, at least in part because sensor 110 can avoid establishing a new authentication pairing with that data receiving device and can proceed directly to exchanging information via the encrypted communication protocols described herein. After a connection is successfully established, the two devices can refrain from broadcasting connection identifiers and other information to establish a new connection and can communicate using an agreed channel-hopping scheme to reduce the opportunity for third-parties to listen to the communication. As another example, the sensor 110 can be configured to scan available connection points and prefer connections with those devices to which it has already connected, such as those devices which the sensor 110 has previously established an authenticated exchange. Scanning for and connecting to known devices can reduce the opportunity for malicious third-parties to intersect an authentication exchange when other trusted data receiving devices are within communication range.

Figure 2:
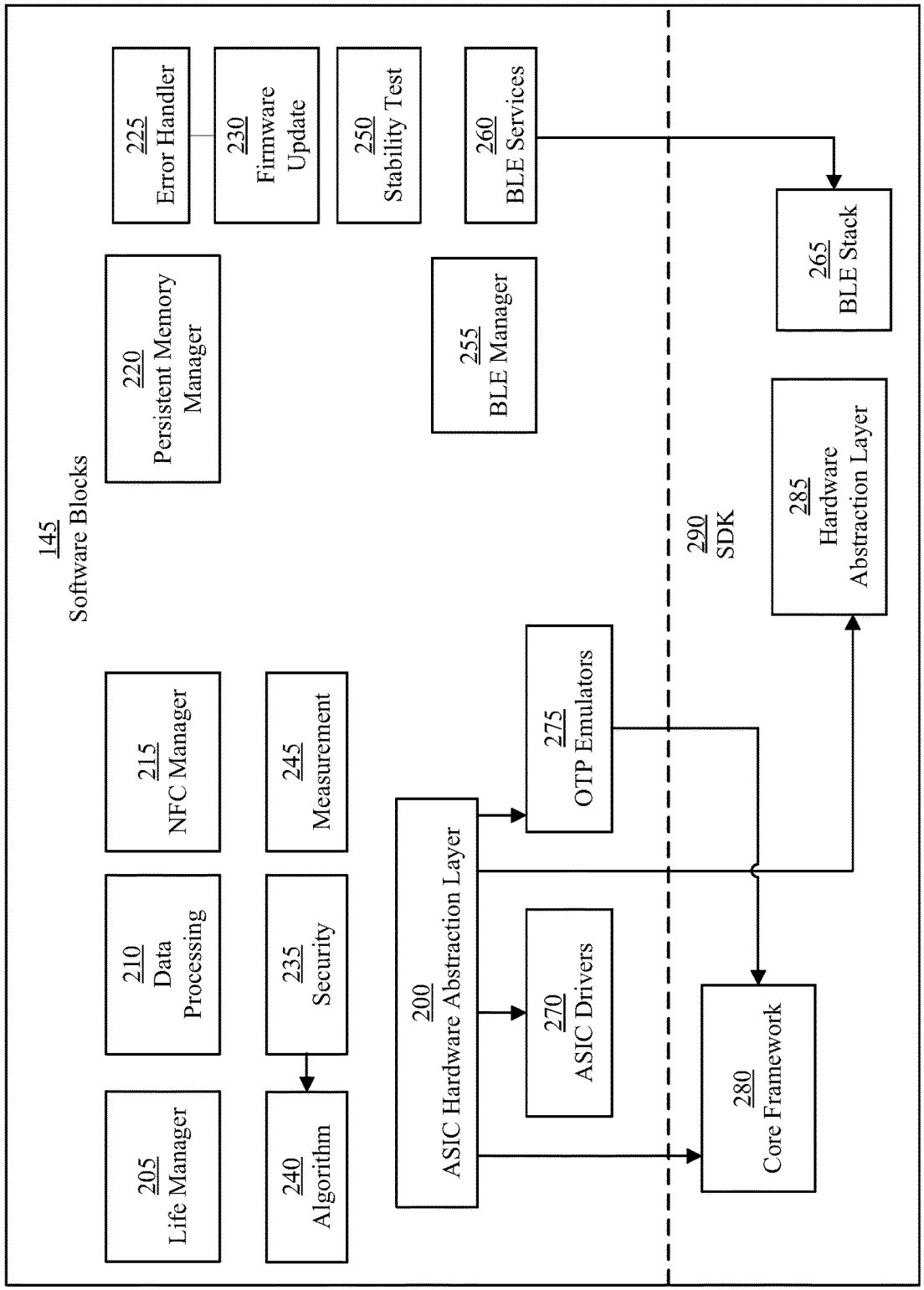
FIG. 2 is a diagram illustrating functional blocks of the sensor according to exemplary embodiments of the disclosed subject matter.

For purpose of illustration and not limitation, reference is made to the exemplary embodiment of the software 145 configured for operation by the communication module 140 as shown in FIG. 2. FIG. 2 illustrates an example hierarchical organization of the software blocks 145 described herein with respect to exemplary embodiments. As embodied herein, all the software blocks can be installed on and run on the communication module 140 (e.g., through the microcontroller 143) alone, on the ASIC 130 alone, and/or can be allocated between the communication module 140 and ASIC 130.

As embodied herein, the software blocks are installed on the communication module 140, and the ASIC 130 is configured without an embedded processor and without software or reprogrammable logic. As such, by installing and executing the software blocks on the communication module 140, the sensor 110 can leverage the processing power of communication module 140 to reduce the cost of the ASIC 130. The complexity of a suitable ASIC 130 can be reduced such that the ASIC 130 is configured to perform operations designated for it and no more. The footprint of the ASIC 130 within the sensor 110 can also be reduced based on the limited complexity and functionality. Additionally, because the ASIC 130 does not necessarily need to be a general-purpose processor, the efficiency of the ASIC 130, and the sensor 110 overall, can be improved.

Additionally or alternatively, one or more software blocks can be installed on or otherwise implemented by the ASIC 130 (not illustrated), such that the ASIC 130 can be configured to have an embedded processor and reprogrammable logic and memory. As such, by installing and executing at least some of the software blocks on the ASIC 130 (e.g., in addition to installing some software blocks on the communication module 140), the sensor 110 can leverage the added flexibility of the programmable ASIC 130 and communication module 140 to extend the usefulness of the sensor 110 at least in part because the ASIC 130 will not need to be replaced to add functionality to the ASIC 130. For example, the ASIC 130 can be updated through firmware or software updates (e.g., using a process similar to that described herein for updating the communication module 140). Additionally, the ASIC 130 in these embodiments can include a processor configured to perform more complex analyte detection and processing algorithms, and the sensor 110 can use the combined processing capabilities of the ASIC 130 and communication module 140.

The overall architecture of the software blocks 145 is shown in FIG. 2. The blocks below the dotted line designated SDK 290, exist in read-only memory and are stereotyped as such. All other software blocks, which can be written by the manufacturer of the sensor 110, are loaded into one-time programmable (OTP) memory of the communication module 140.

The life manager software block 205 can include software functions to manage the overall life operations of the sensor 110. The software functions can include functions to update counter for the active operation time of the sensor 110, manage sensor activation, insertion detection, update the sensor state, and update the sensor status. The data processing software block 210 can include software functions to manage the data processing aspects of the sensor 100. In particular, the communication module 140 handles the bulk of the data processing of the sensor, offloading much of the data processing requirements of the sensor. The software functions can include functions to process raw data after posting, store historical data, and send current measurement data to an authenticated receiving device. The NFC manager 215 can include software functions to hand operations related to sending and receiving NFC communications (e.g., through the ASIC 130). The software functions can include functions to send data to the ASIC NFC radio 135, receive data from ASIC NFC radio 135, and handle received commands.

The persistent memory manager 220 can include software functions to manage the storage of memory in the memory 141 of the communication module 140. For example, the persistent memory 141 can store diagnostic data relating to the sensor 110 as well as historical data of measurements recorded by the medical hardware 155, interpreted by the ASIC 130, and sent to the communication module 140. The software functions can include functions relating to factory configuration of the sensor 110, historical measurement data, sensor event logging, recording sensor state data, managing RAM used by the dynamic algorithm, manage access to and storage on various memory hardware including static and dynamic persistent RAM, dynamic system RAM, managing access to the one-time programmable memory, and providing for access to the persistent memory through an API. The error handler 225 can include software functions, described in detail herein, to manage accounting for errors detected in the performance by the sensor 110 (e.g., while recording measurements). The firmware update software block 230 can include software functions to enable remote updating and upgrading of the firmware of the sensor 110.

The security software block 235 can include software functions to relating to the encryption and decryption of sensitive data stored by the communication module 140, encryption and decryption of communications to and from the sensor 110 (e.g., with a receiver 120), and authentication of devices in communication. The security software block 235 can also include functions relating to management of secure and public keys used by the sensor 110. The algorithm software block 240 can include software functions to process and interpret the raw measurement data reported by the medical hardware 155 via the ASIC 130. The software functions can include functions to process fast data (e.g., instantaneous measurements) and slow data (e.g., multiple measurement trends), data quality accessors, calculate current measurement results (e.g., instantaneous glucose measurements), calculate historical measurement results (e.g., historical glucose trends). The measurement software block 245 can include software functions to directly managing the medical hardware 155. The software functions can include a function to initiate and terminate measurement and configure the analog front end 139 interfacing with the medical hardware 155. The stability test software block 250 can include software functions used to perform sensor testing during or after manufacture.

The communication module 140 can include one or more medium-range communication radios 148 (e.g., with a range longer than the NFC radio 135 of the ASIC 130). As an example, the communication module 140 can include a Bluetooth radio or Bluetooth Low Energy (BLE) radio. The software blocks 145 can include software to manage the communication radios. As an example, the software blocks 145 can include a BLE manager 255. The manager 255 can include software functions relating to maintenance of the BLE radio, such as BLE configuration, sending to a receiver 120, receiving data from a receiver 120, receiving commands from the receiver 120 (e.g., shutdown) and handling advertisements by which the communication module attempts to identify devices with which the communication module 140 can attempt to establish connections. In particular, the parameters relevant to BLE connections can include transmitter power, connection interval, slave latency, and supervision timeout. The transmitter power parameter can be controlled, as embodied herein with respect to FIG. 19. The sensor 110 can use a BLE connection parameter update procedure to request a receiver 120 to use a set of preferred connection parameters. After a receiver 120 completes an authentication process, the sensor 120 can set its preferred parameters to request for an update to the preferred connection interval, latency, and supervision timeout. This update procedure can reduce power consumption by maximizing the time the radio is in low power mode while maintaining the connection with a receiver 120.

Similarly, the software blocks 145 can include a BLE services software block 260 with software functions to provide interfaces to make the BLE radio available to the computing hardware of the communication module 140. These software functions can include a BLE logical interface and interface parser. BLE services offered by the communication module can include the generic access profile service, the generic attribute service, generic access service, device information service, data transmission services, and security services. The data transmission service can be a primary service used for transmitting data such as sensor control data, sensor status data, medical measurement data (historical and current), and event log data. The sensor status data can include error data, current time active, and software state. As embodied herein, the sensor 110 can be configured to send sensor status data to a connected receiver 120 on initial authenticated connection to the receiver 120, when the sensor status changes, or upon request from the receiver 120. The medical measurement data can include information such as current and historical raw measurement values (e.g., blood glucose, temperature, etc.), current and historical values after processing using an appropriate algorithm by the communication module 140, projections and trends of measurement levels (e.g., trends of blood glucose levels or temperature levels, etc.), comparisons of other values to patient-specific averages, calls to action as determined by the algorithms of the communication module (e.g., so that the receiver acts a mere display device, while the communication module 140 handles secured calculations) and other similar types of data.

The security services can be used to provide authentication to communicate with sensor 110 operations. Authentication can include challenge and response commands, challenge data commands, security certificate data, and secured keys used therewith. The BLE stack 265 can include additional software functions used by the BLE components of the communication module 140.

Figure 20A:
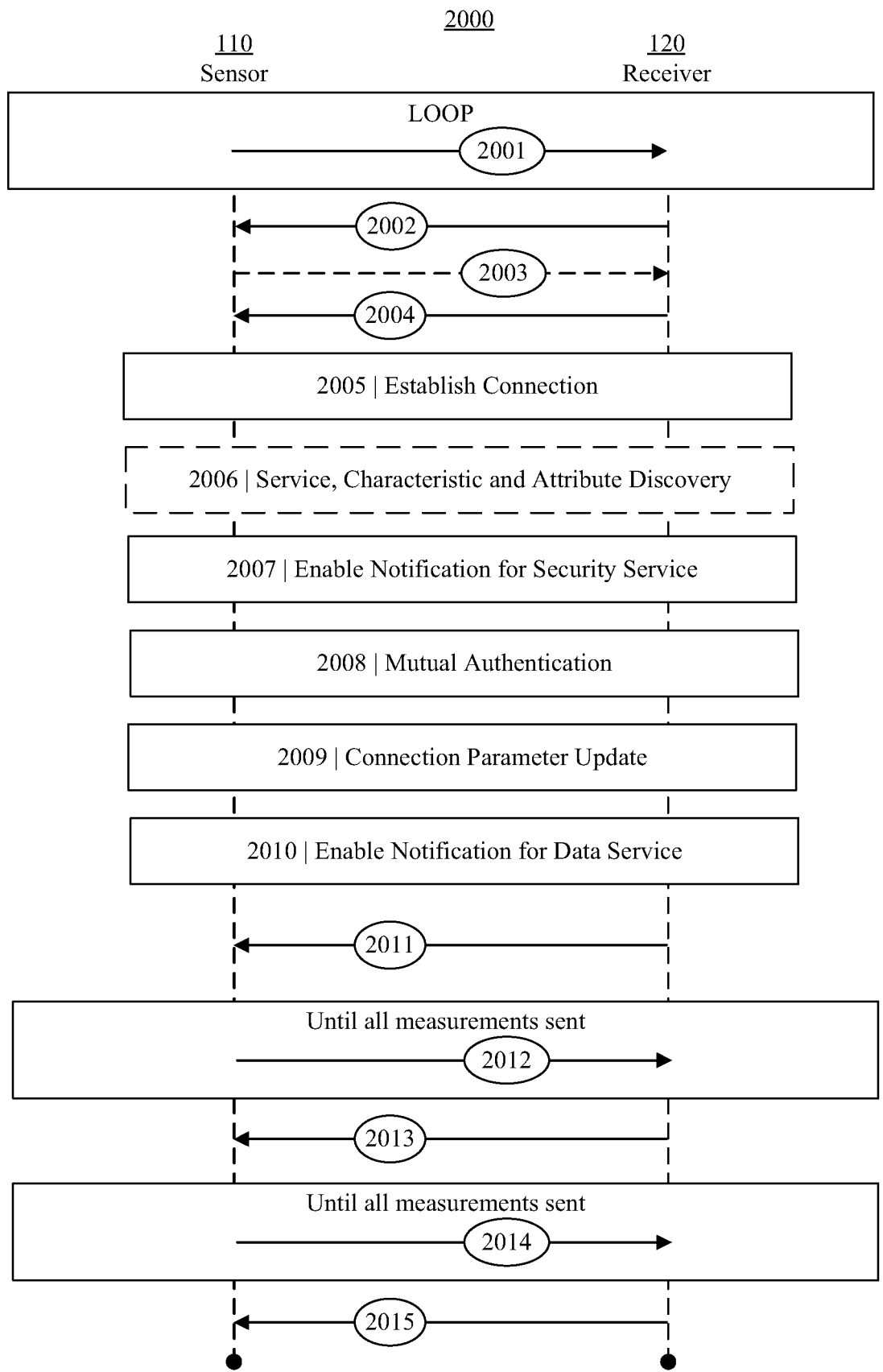
FIGS. 20A-20B is a diagram illustrating example functionality of the sensor and receiver and messages between the sensor and receiver during an exemplary connection operation.
Figure 20B:
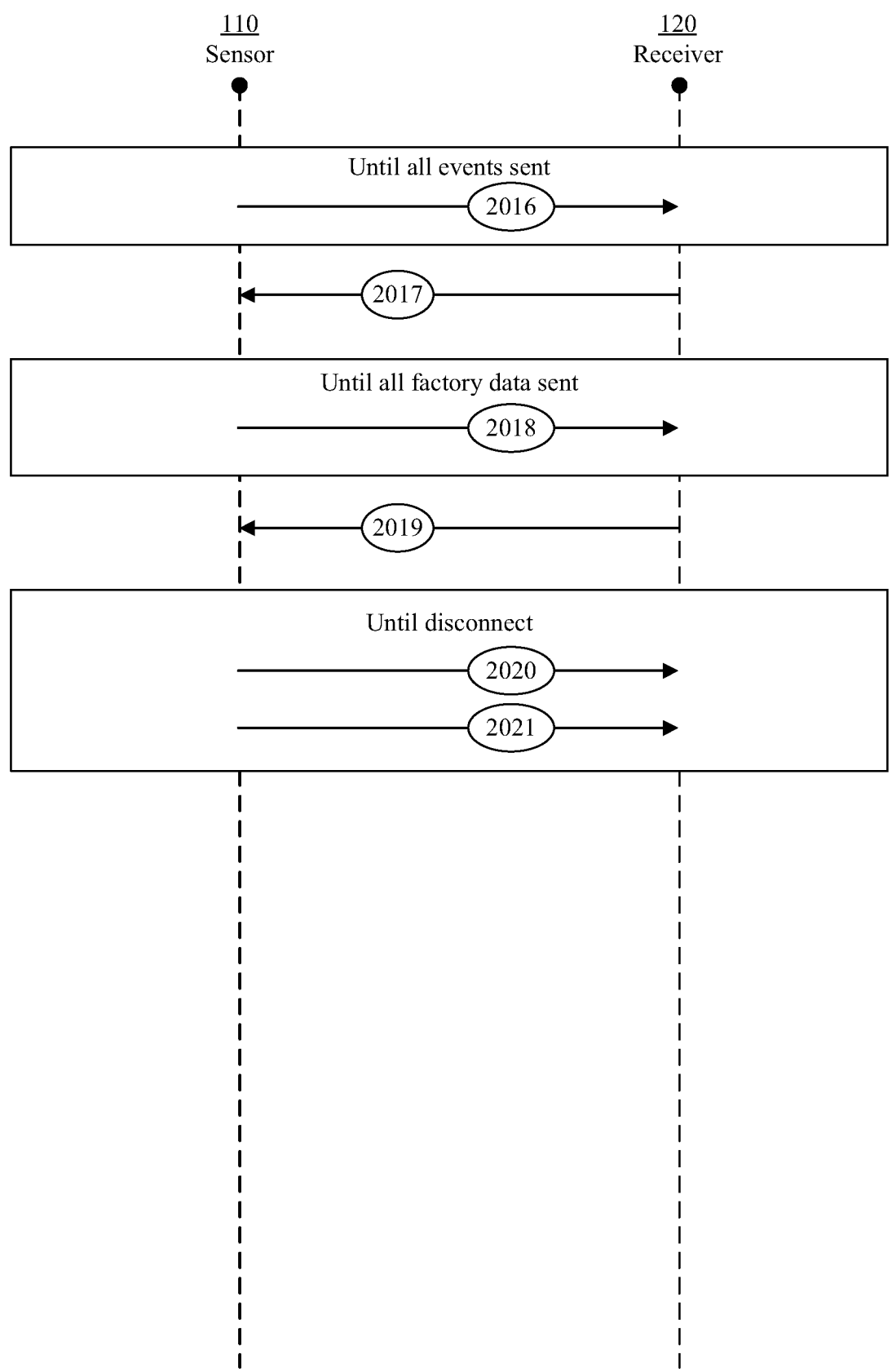

For purpose of illustration and not limitation, reference is made to the exemplary embodiment of a procedure 2000 for a sensor-receiver connection for use with the disclosed subject matter as shown in FIGS. 20A-20B. FIGS. 20A-20B illustrates an example diagram for a BLE sequence to set up an initial connection and re-connection between a receiver 120 and sensor 110. At 2001, the sensor 110 repeatedly advertises its connection information to its environment in a search for a receiver 120 to connect to. As described herein, the sensor 110 can repeat advertising on a regular basis until a connection established. The receiver 120 detects the advertising packet and scans and filters for the sensor 120 to connect to through the data provided in the advertising packet. At 2002, receiver 120 sends a scan request command and at 2003 the sensor 110 responds with a scan response packet providing additional details. The receiver 120 scans and filters for the sensor 110 through the data provided in the advertising and scan response packet. Once the sensor 110 is found and the receiver 120 learns the Bluetooth device address, at 2004 the receiver 120 sends a connection request using the Bluetooth device address associated with the receiver 120. The receiver 120 can also continuously request to establish a connection to a sensor 110 with a specific Bluetooth device address, if receiver 120 is configured for such capability. At 2005, the devices establish an initial connection allowing them to begin to exchange data. The devices then begin a process to initialize data exchange services and perform a mutual authentication procedure.

During the first connection between the sensor 110 and receiver 120, the receiver 120 can, at 2006, initialize a service, characteristic, and attribute discovery procedure. The receiver 120 can evaluate these features of the sensor 110 and store them for use during subsequent connections to the same sensor 110. At 2007, the devices enable a notification for a customized security service used for mutual authentication of the sensor 110 and receiver 120. The notification is enabled from the descriptor of the security characteristics. At 2008, a mutual authentication procedure added to the typical Bluetooth exchange sequence to ensure that the receiver 120 trying to access the sensor 110 is authenticated. The mutual authentication procedure is automated and requires no user interaction. At 2009, following the successful completion of the mutual authentication procedure, the sensor 110 sends a connection parameter update to request the receiver 120 to use connection parameter settings preferred by the sensor 110 and configured to maximum longevity. At 2010, the receiver 120 enables the notifications from the descriptor of data characteristics. The notification also serves as a notice to the sensor 110 that the receiver 120 is ready to receive encrypted data and is capable of decrypting that data as it arrives.

The receiver 120 then performs sensor control procedures to backfill historical data, current data, event log, and factory data. At 2011, the receiver 120 sends a request to initiate a backfill process for historical measurement reading data (e.g., historical glucose readings). The request can specify a range of records that the receiver 120 is interested in receiving, where the range is defined based on the measurement value, timestamp, or similar. At 2012, the sensor 110 sends historical measurement data until all previously unsent data in the memory of the sensor 110 is delivered to the receiver 120. At 2013, the receiver 120 sends a request to initiate a backfill process for current measurement reading data (e.g., clinical glucose readings). As with the historical measurements, the request can specify a range of records that the receiver 120 is interested in receiving, where the range is defined based on the measurement value, raw reading values contributing to the measurement, timestamp, or similar. At 2014, the sensor 110 sends measurement data until all previously unsent data in the memory of the sensor 110 is delivered to the receiver 120. At 2015, the receiver 120 sends a request to initiate a backfill process for event logging data. Turning to FIG. 20B, at 2016, the sensor 110 sends logged event data to the receiver 120 until all previously unsent data in the memory of the sensor 110 is delivered. At 2017, the receiver 120 sends a request to initiate a backfill process for sensor 110 device factory data. At 2018, the sensor 110 sends stored factory data to the receiver 120 until all previously unsent data in the memory of the sensor 110 is delivered.

Each request can include a specification for the order in which data will be received (e.g., oldest to newest, newest to oldest, highest to lowest, etc.). At any point, if the sensor 110 receives a backfill request when the sensor 110 is already processing a previously received request, the sensor 110 can automatically respond with an error message indicating that the sensor 110 is occupied. The sensor 110 can also respond with an error to any malformed requests (e.g., the data record type is invalid, the order is invalid, the timestamp is invalid or malformed, or records not available). The response can indicate the malformation. Although not illustrated, the sensor 110 can respond to a backfill request from the receiver 120 that all data has already been sent. Subsequent to each request, the receiver 120 can detect that no additional data is being sent and interpret that as acknowledgment that all data has been delivered. Alternatively, the sensor 110 can affirmatively deliver a transmission complete message. The sensor 110 can also support receiving backfill abort commands. Upon receiving an abort command, the sensor 110 can respond with an error response if it is currently processing another command. Otherwise, the sensor 110 determines whether the backfill operation which is being aborted is actually in progress (and sends an error if not), terminates the process, and sends a success notification to the receiver 120. Having completed the backfill updates, sensor 110 and receiver 120 are ready to begin regular measurement reading transmission. At 2019, the receiver 120 can send a notification to sensor 110 indicating that it is ready to receive the regular measurement readings. The notification can act as a reminder to the sensor 110 that the receiver 120 is ready to receive encrypted measurement data and decrypt the measurement data. The sensor 110 sends across current data in two notifications, shown at 2020 and 2021 including a first notification (2020) of current measurements and a second notification (2021) of current glucose result on a repeating basis. As embodied herein, the first notification and second notification can be redundant notifications to ensure that data is transmitted correctly. Alternatively, the two notifications can make up a single payload and be concatenated together to form the complete data collection for a single measurement. As an example, the sensor 120 can send the notifications each minute until the connection is interrupted or the devices disconnect.

Figure 21:
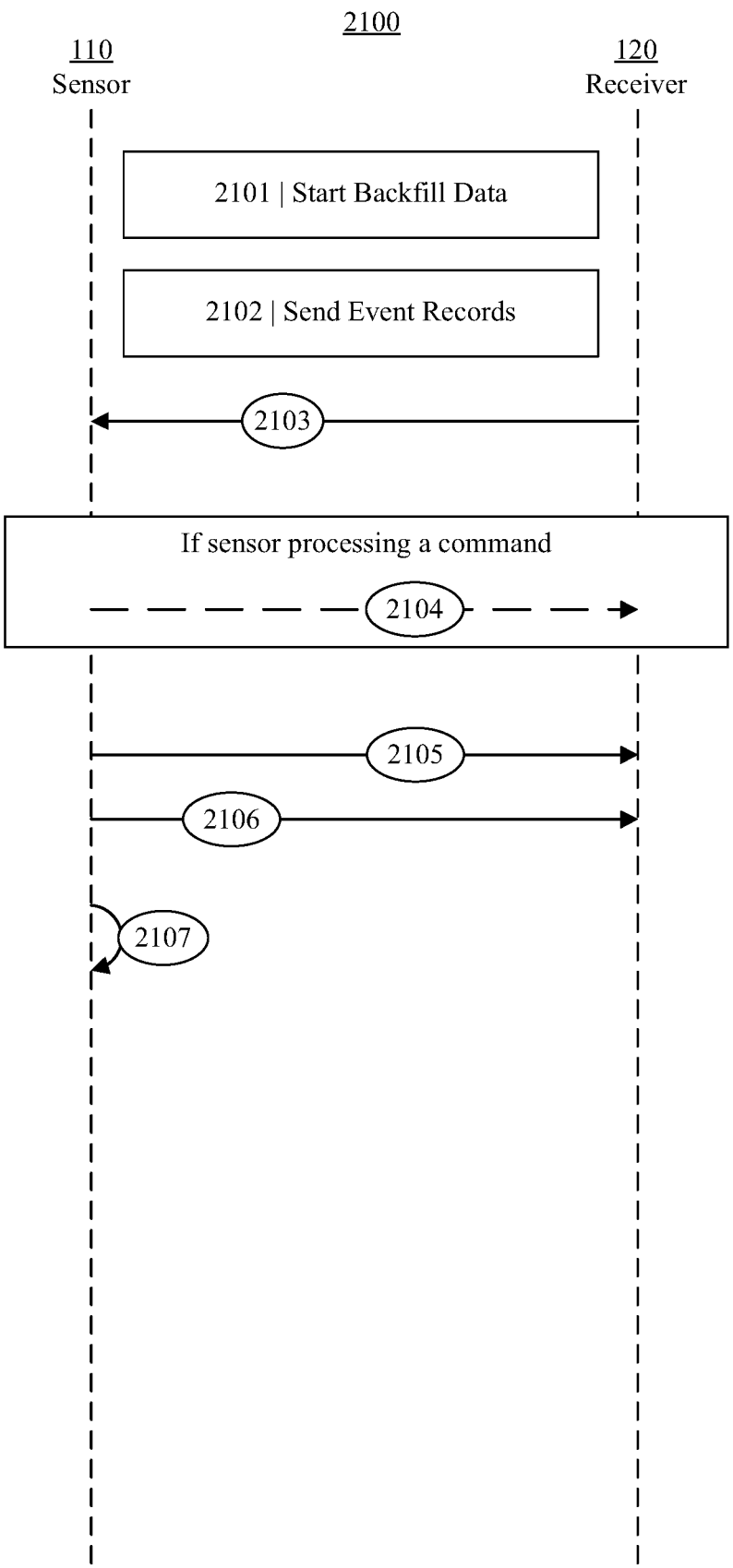
FIG. 21 is a diagram illustrating example functionality of the sensor and receiver and messages between the sensor and receiver during an exemplary shutdown operation.

For purpose of illustration and not limitation, reference is made to the exemplary embodiment of a procedure 2100 for a sensor-receiver connection for use with the disclosed subject matter as shown in FIG. 21. FIG. 21 illustrates an example diagram for a BLE sequence to send a shutdown command to the sensor 110. The shutdown command requests the sensor 110 to shut itself down. As described herein, the shutdown operation is executed immediately if the sensor 110 is in either the error state 620, insertion failed state 540, or sensor expired state 565. If the sensor 110 is not in those states, the sensor 110 would register the command in its internal memory 141 and execute the shutdown when sensor 110 transitions into the error state 620 or sensor expired state 565. Prior to the receiver 120 sending the shutdown command, the sensor 110 and receiver 120 can have exchanged data. For example, at 2101 the sensor 110 and receiver 120 have performed the backfill operations described herein or, at 2102, the sensor 110 and receiver 120 have sent event records and measurement data as described herein. At 2103, the receiver 120 sends a properly formatted shutdown command to the sensor 110. At 2104, if the sensor 110 is actively processing another command, the sensor 110 will respond with a standard error response indicating that the sensor 110 is busy. Otherwise, at 2105, the sensor 110 sends a response as soon as the command is received. Additionally, at 2106, the sensor 110 sends a success notification through the sensor control characteristic to acknowledge the sensor 110 has received the command. At 2107, the sensor 110 registers the shutdown command. At the next appropriate opportunity (e.g., depending on the current sensor state, as described herein), the sensor 110 will shut down. In some embodiments, the receiver 120 uses the shutdown command to notify the sensor 110 that receiver 120 has successfully backfilled all current measurement data, historical measurement data, and event logs.

As embodied herein, the sensor 110 and receiver 120 can be configured compliant with a security interface designed to protect the Confidentiality, Integrity and Availability ("CIA") of this communication and associated data. To address these CIA concerns, security functions can be incorporated into the design of the hardware and software. In particular embodiments, the sensor 110 can be configured to restrict access of certain functions to authorized parties only. The operator of the medical monitoring system 100 can control which parties are able to access specific functions and can revoke access to the functions within a reasonable timeframe. Moreover, the sensor 110 itself can limit access to certain functionality based on receiving evidence of authorization while still remaining available for use with receivers 120, multi-purpose data receiving devices 130 (e.g., executing an authenticated application and/or software library provided by the operator of the medical monitoring system 100), and other authorized parties for debugging, reprogramming, and other manufacturing-specific features. Confidentiality of commands and user data stored on and transmitted between devices is maintained through hardware- and software-implemented security features. Source integrity of session data and commands can be assured. Additionally, software features can empower other features, such as restricting access to the communication interfaces, including but not limited to the communication module 140, NFC radio 135, and the like, to one or more selected receivers 120. In particular embodiments, the selected receivers 120 can include the one or more receivers 120 (or other devices) that last paired with the sensor 110 through another communication interface. In particular embodiments, access to longer-range communication interfaces (e.g., BLE, WiFi) can be restricted based on last access to communication interfaces that requires proximity (e.g., NFC). The systems and techniques to effect these goals will be described herein.

Both the sensor 110 and a receiver 120 can ensure the authorization of the other party in a communication session. To determine if a party has authorization to, for example, issue a certain command or receive certain data, the identity of the party can be authenticated. In particular embodiments, identity authentication can be performed through two features. First, the party asserting its identity (e.g., a sensor 110 to a receiver 120 or a receiver 120 to a sensor) provides a validated certificate signed by the manufacturer of the device or the operator of the medical monitoring system 100. Second, authentication can be enforced through the use of public keys and private keys established by the devices of the medical monitoring system 100 or established by the operator of the medical monitoring system 100 and provided to the devices. To confirm the identity of the other party, the party can provide proof that the party has control of its private key. As described herein, proof of control can be established through mutual authentication or establishment of a mutual security key.

In some embodiments, the format and size of the certificate that is provided by the sensor 110 can vary from the format and size of the certificate that is provided by the receiver 120 or by an application executing on the multi-purpose medical monitoring device 130. As an example, the certificate used by the receiver 120 can use additional memory (compared to the sensor 110) and provide additional information within its certificate. The certificate can include a certificate security version, an identifier for the receiver 120, a validity revision value, access control configuration information, a receiver public key, and a digital signature. The certificate security version can be used to determine the structure and/or signing key required for the certificate to be valid. The identifier can be used to ensure that the certificate corresponds to the receiver 120 that is exchanging the certificate. Additionally, the sensor 110 can store a database (e.g., as a lookup table) for the supported certificate revision for that party. In particular embodiments, the supported party revision database can be loaded to the memory of the sensor 110 during secure updates, such as, but not limited to, during manufacture, during servicing by the manufacturer or a trusted agent, during firmware update, etc. The validity revision value can be used to determine if the certificate is valid and supported by the sensor 110. The access control configuration information can be used to directly determine what features and functionality of the sensor 110 are accessible by the receiver 120. The receiver public key can correspond to the public key for the receiver 120 according to the medical monitoring system 100. The digital signature can be used to be provide validity of the certificate and detect or prevent tampering of the certificate by a malicious party. The digital signature can be signed by a private key of the operator of the medical monitoring system 100 and be validated by a corresponding key held by the sensor 110.

The sensor 110 can accept a certificate as valid based on verifying certain information associated with the certificate. For example, the sensor 110 can check if the certificate security version is a version supported by the sensor 110. As discussed herein, security versions can be rejected by the operator of the medical monitoring system 100. Rejected or other unsupported certificate security versions can be refused by the sensor 110. As another example, the sensor 110 can determine if the digital signature is valid. As described, the digital signature can be signed by a private key of the operator of the medical monitoring system 100. The corresponding public key can be written to the sensor 110 during secured operations. The digital signature, and correspondingly, the information stored in the certificate, can be validated using public key cryptography. As another example, the sensor 110 can check if the certificate is not expired. In some cases, the certificate data can include an express or implicit expiration date. The sensor 110 can compare the expiration date to a trusted source of time and reject the certificate if the expiration date has passed. In other cases, the sensor 110 does not have access to a trusted source of time. In such cases, the certificate validity revision can be used. If the certificates validity revision is less than the supported revised stored by the sensor 110 for that party, the certificate is deemed invalid. Other validity checks can also be used. Once all validity checks are passed, the public key embedded in the certificate can be extracted for use.

As an example, the certificate used by the sensor 110 can include a certificate security version, a sensor serial number or other unique identifier, a manufacturing date stamp, a sensor public key, and a digital signature. As with the receiver certificate, the certificate security version can be used to determine the structure and/or signing key required for the certificate to be valid. The sensor serial number or other unique identifier can be used to ensure that the certificate corresponds to the receiver 120 that is exchanging the certificate. Additionally, the receiver 120 can store a database (e.g., as a lookup table) corresponding to select sensor identifiers, such as a blacklist (to block old sensors or sensor identifiers known to be used by malicious parties) or a whitelist (to expedite recognition of certificates from trusted sensors). The sensor public key can correspond to a public key for the sensor 110 according to the medical monitoring system 100. The digital signature can be used to be provide validity of the certificate and detect or prevent tampering of the certificate by a malicious party. The digital signature can be signed by a private key of the operator of the medical monitoring system 100 and be validated by a corresponding key held by the receiver 120.

The receiver 120 can accept a certificate as valid based on verifying certain information associated with the certificate. For example, the receiver 120 can check if the certificate security version is a version supported by the receiver 120. As discussed herein, security versions can be invalidated by the operator of the medical monitoring system 100. Invalidated or other unsupported certificate security versions can be refused by the receiver 110. As another example, the sensor 110 can determine if the digital signature is valid. As described, the digital signature can be signed by a private key of the operator of the medical monitoring system 100. The corresponding public key can be written to the receiver 110 during secured operations. The digital signature, and correspondingly, the information stored in the certificate, can be validated using public key cryptography. As another example, the receiver 110 can check if the manufacturing date stamp is associated with a valid range of dates and is particularly not associated with an expired sensor 110. As discussed herein, sensors 110 can be relatively low cost and designed to be disposable with a limited shelf life. The receiver 120 can use the known shelf life of a sensor 110 to determine if the sensor 110 associated with the certificate is likely expired. Additionally, the receiver 120 can check if the sensor identifier is stored in the database of known sensor identifiers and particularly determine if the identifier associated with the certificate is blacklisted. Other validity checks can also be used. Once all validity checks are passed, the public key embedded in the certificate can be extracted for use.

To facilitate the confidentiality of data, communication connections between the sensor 110 and receiver 120 can be mutually authenticated prior to transmitting sensitive data by either device. In particular, once the certificates are accepted by both the sensor 110 and the receiver 120, the public keys extracted from the certificates can be used during the mutual authentication process. With public keys in hand, both parties must prove they have access to the corresponding private keys. This proof may be established using challenge-response mechanisms. During such a mechanism, one party sends the other party data to be encrypted or signed using the private key. The receiving party signs or encrypts the data using the private key and returns it to the initiating party. The initiating party decrypts the encrypted data and verifies that the plaintext is correct. To prevent replay attacks, the plaintext data that is used is unpredictable (e.g., truly random) and/or non-repeatable.

Example mutual authentication schemes include direct signing of random data using a digital signature algorithm. The sensor 110 and receiver 120 send a random sequence of bytes to be signed with the other's private key. The sensor 110 and receiver 120 then check the signature of the signed data. As another example, the sensor 110 and receiver 120 can perform mutual authentication using symmetric cryptography. Using the recovered public keys, the sensor 110 and receiver 120 conduct a key exchange to arrive at a shared symmetric key for forward-messaging security. In particular embodiments, the key exchange used can be based on or derived from industry standard and/or government regulated security key exchanges.

In one embodiment, the key exchange used by the devices includes can be based on exploiting the infeasibility of an unauthorized party discovering base large numbers (e.g., prime numbers) used in certain mathematical operations. In an example, the two parties to the key exchange can agree to use a particular finite cyclic group of a large order and a generating element within the group, such as public modulus and base, where the base is a primitive root of the modulus. Each party generates a public value from the base raised to the power of the private key modulo the public modulus. The result is exchanged. The operation is repeated with the exchanged result to arrive at the secret key. For example, party A has secret value a, and party B has secret value b. A and B agree to use modulus m and base c. A calculates a value $a'=c^a$ mod p. B calculates a value $b'=c^b$ mod p. A and B exchange a' and b'. Then, A calculates the shared key $s=b'^a$ mod p and B calculates the shared key $s=a'^b$ mod p. In another example, each party to the key exchange can select two large prime numbers and an auxiliary value. Each party can generate a public key based on the two large prime numbers which are kept secret from the public. The large prime numbers can form the private key. Messages encoded using the public key can be decrypted only by the private key. In particular, as described herein, the public key can be used to encode a shared secrete key. More specifically, each party selects two distinct prime numbers p and q. Throughout the process, p and q are key secret. Part of the public key n is computed as n=pq. A function $\Lambda(n)=\text{lcm}(p-1, q-1)$ is calculated. An integer e is selected such that e and $\Lambda(n)$ are coprime. The integer e is released as the public key. Finally, d, the private key exponent, is selected as the modular multiplicative inverse of e modulo $\Lambda(n)$. Then, the public key includes n and e. The private key consists of d, which can be derived from p, q, and $\Lambda(n)$ which are also kept secret. The parties can exchange and sign a shared key derivable from the each party's public key and verifiable from each party's private key.

In another embodiment, the key exchange used by the devices can be based on exploiting the infeasibility of an unauthorized party discovering the discrete logarithm of a random elliptic curve element with respect to a publicly known base point. Stated differently, the security of said key exchange is based on the inability to easily compute the multiplicand of a point multiplication given the original and product pairs. Such a key exchange implementation has the additional benefit of reducing the necessary key size, allowing for benefits in the amount of storage memory used to hold the resulting keys as well as reducing the network traffic used in establishing the shared key.

In another embodiment, the key exchange used by the devices can be based on the difficulty of problems over a cyclic group G relating to computing a discrete logarithm. G can be, for example, the multiplicative group of integers modulo n. Like other embodiments described herein, the key exchange is based on a public-private key pair. To generate the keys, a party generates a cyclic group G of order q with a generator g. Element e represents the unit element of G. An integer x is selected randomly from the group of $\{1, \ldots, q-1\}$. The value $h=g^x$ is computed. The public key is the set of values G, q, g, and h. The private key is x. To encrypt a message, M, a second party maps M to an element m of G. The second party chooses an integer y from the set of integers $\{1, \ldots, q-1\}$. A shared secret, s, is computed as $s=h^y$. The ciphertext $c_1$ and $c_2$ is computed as $c_1=g^y$ and $c_2=m \cdot s$. Upon receiving $c_1$ and $c_2$ the first party can generate the shared secret as $s=c_1^x$. The original message M is remapped from $m=c_2 \cdot s^{-1}$. The two parties can exchange data using the shared secret s as a shared symmetric key or can newly generate a shared secret for each message exchange for added security.

Once established, the shared symmetric key is then used to perform a mutual authentication such that each device proves control of the corresponding private key by arriving at the same symmetric key and being able to complete mutual authentication using that key. This version of the mutual authentication can be particularly advantageous where an encrypted channel is to be established for communication after authentication (as the shared symmetric key can be used to encrypt communications using the encrypted channel). Additionally, subsequent authentications can be done using the shared symmetric key. The overhead, in terms of computational complexity and network traffic use, is not necessary except during establishment of the initial key. The sensor 110 and receiver 120 can provide evidence of control of the shared symmetric key on subsequent communication attempts. Additionally or alternatively, as embodied herein, session key information, which can be used to encrypt the communication, can be exchanged between the sensor 110 and receiver 120 after the devices have each been authenticated. The sensor 110 and receiver 120 can provide evidence of control of the session key on subsequent communication attempts. The symmetric mutual authentication techniques used can implement, be based on, or be derived from two-pass or three-pass authentication techniques. In certain embodiments, four-pass or five-pass authentication can be used, with the manufacturer of the sensor 110 and/or receiver 120 or operator of the medical monitoring system 100 acting as the trusted additional party.

Figure 35:
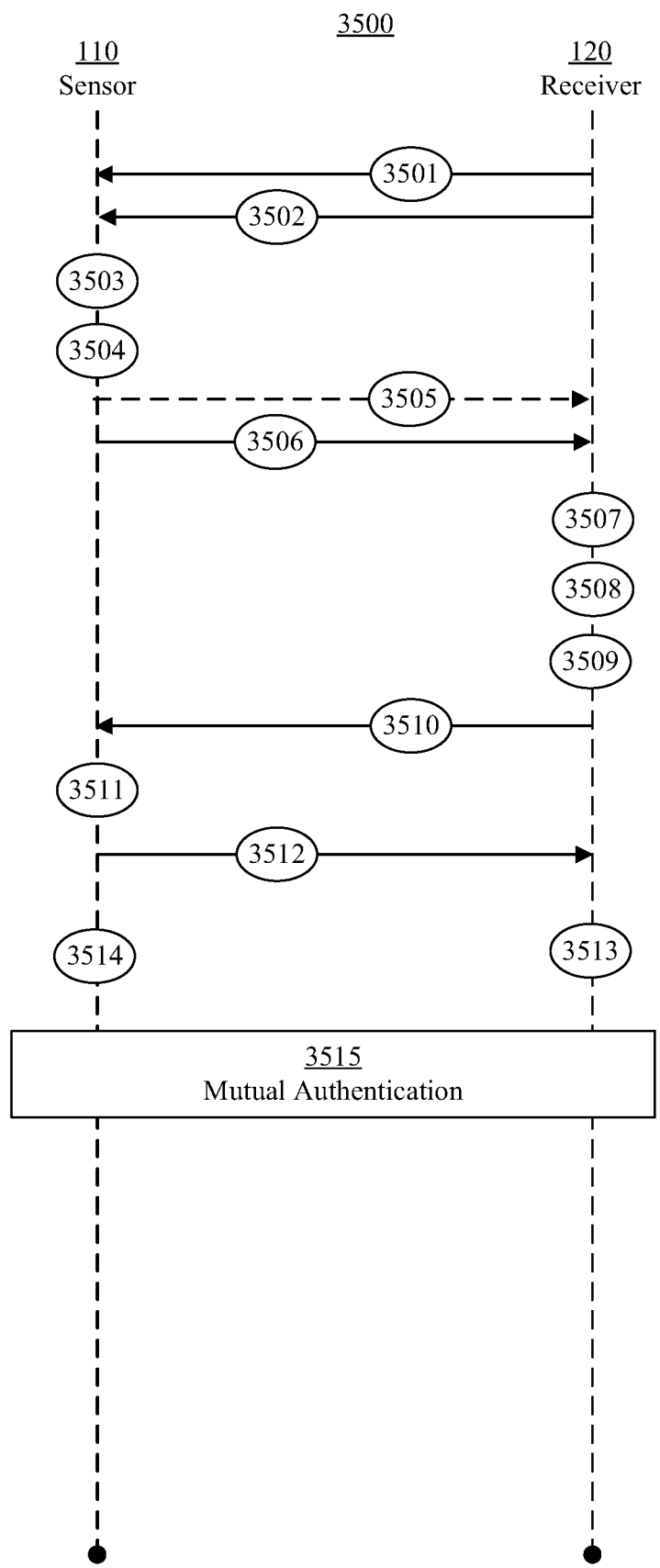
FIG. 35 is a diagram illustrating example functionality of the sensor and receiver and messages between the sensor and receiver during an exemplary connection operation.

FIG. 35 illustrates an overview of the certificate exchange and validation process as well as the symmetric mutual authentication. At 3501, the receiver 120 sends a request to initialize the connection process. At 3502, the receiver 120 sends the certificate data of the receiver 120 to the sensor 110. Sending the certificate data can include alerting the sensor 110 that the receiver 120 will be sending certificate data, transferring the certificate data, and sending a confirmation message to the sensor 110 indicating that the certificate data has been transferred. At 3503, the sensor 110 checks that the certificate data is valid using the techniques described herein. At 3504, after determining that the certificate data is valid, the sensor 110 extracts the public key corresponding to the receiver 120 from the certificate data.

At 3505, the sensor 110 can send a notification to the receiver 120 indicating that the certificate data has been accepted. At 3506, the sensor 110 sends the certificate data of the sensor 110 to the receiver 120. Sending the certificate data can include alerting the receiver 120 that the sensor 110 will be sending certificate data, transferring the certificate data, and sending a confirmation message to the receiver 120 indicating that the certificate data has been transferred.

At 3507, the receiver 120 checks that the certificate data is valid using the techniques described herein. At 3508, after determining that the certificate data is valid, the receiver 120 extracts the public key corresponding to the sensor 110 from the received certificate data. At 3509, the receiver 120 generates a new public key and private key pair to use for mutual authentication. As described herein, the receiver 120 can use a random value or a combination of random, known, and non-sequential values to generate the public key and private key pair. At 3510, the receiver 120 initiates the mutual authentication procedure. The receiver 120 can send a notification or request to the sensor 110. The receiver 120 can additionally or alternatively send the public key generated at 3509. The receiver 120 can additionally notify the sensor 110 when the complete public key has been sent. At 3511, the sensor 110 generates a new public key and private key pair to use for mutual authentication using the techniques described herein. At 3512, the sensor 110 sends the public key generated at 3511 to the receiver 120. The sensor 110 can send a notification or request to the receiver 120. The sensor 110 can additionally or alternatively send the public key generated at 3511. The sensor 110 can additionally notify the receiver 120 when the public key has been sent. At 3513, the receiver 120 generates the shared key used for mutual authentication using the private key of the receiver 120, the public key of the sensor 120, any previously agreed upon secret values (e.g., supplied by the manufacturer of the sensor 120 or receiver 110 or the operator of the medical monitoring system 100), and/or any selected nonce values. Similarly, at 3514, the sensor 110 generates the shared key use for mutual authentication. At 3515, the sensor 110 and receiver 120 can coordinate to perform a mutual authentication scheme using the shared key and generated check values.

An unauthorized receiver 120 can initiate a denial of service attack against the sensor 110 by blocking other devices from connecting to the sensor 110 by staying connected or repeatedly attempting to connect to the sensor 110. To prevent this type of attack, the connection between the sensor 110 and authorized receiver 120 can be terminated if symmetric mutual authentication has not been completed within a predefined amount of time. Additionally or alternatively, the unauthorized device can also be blocked from initiating a subsequent communication request for some time. This allows authorized devices to access the sensor 110 when it becomes connectable again (e.g., while the unauthorized device is blocked).

In certain embodiments, data exchanged using a first communication protocol can be used to further enhance the security of communications using a second communication protocol. As an example, a first communication protocol can be a short-range communication protocol in which physical proximity is required due to, for example, the communication range of the protocol (e.g., NFC). The second communication protocol can be a longer-range communication protocol in which the communication range is longer and therefore physical proximity not as predictable (e.g., BLE, WiFi). In such embodiments, a secret can be shared between a sensor 110 and a receiver 120 using the first communication protocol. In particular embodiments, the secret can be a binding key or binding identifier between the sensor and the receiver 120. The secret can be used on subsequent authentication attempts (e.g., used in combination with randomized data for a symmetric mutual authentication). The secret can be generated as an encrypted value shared over the short-range communication protocol. In environments where other devices can be snooping for data exchanged between the sensor 110 and a receiver 120 using the first communication protocol, a form of a mutual authentication can be performed using the first communication protocol where the result is used as the secret.

The secret can be used by the sensor 110 to prioritize establishing communication sessions with particular receivers 120. For example, the sensor 110 can store a listing of secrets shared with receivers 120. The receiver 110 can refuse to establish communication sessions with receivers 120, even if they have a pre-existing shared key, unless they can provide the most recent secret. The secret, therefore, can be used to revoke access to the sensor 110 from other receivers 120 (e.g., an older receiver after the user has upgraded). Additionally or alternatively, the receiver 110 can refuse a connection to a receiver 120 with an older secret than the most recent secret until a threshold amount of time has passed (e.g., if the preferred receiver 120 is not available). The exchange of secrets adds a layer of physical security to the mutual authentication schemes, because physical proximity can be required to exchange the secret using the first communication protocol.

As embodied herein, certain values used in the authentication process are provided to the devices during manufacture. As an example, private keys and certificate values held by the sensor 110 or receiver 120 can be set by their respective manufacturer. Values such as the private keys and certificate values can be written to memory with a limited number of rewrites, such as non-reprogrammable or one-time programmable (OTP) memory in a containerized manner. In particular embodiments, the values can be updated as security enhancements are made or in order to reduce the known values available to an unauthorized entity. The values can be updated through voiding existing containers and redirecting execution flow to a replacement container with the updated values. In particular embodiments, a version number, timestamp, or other identifier attributed to the security configuration of the sensor 110 or receiver 120 can be used by another device attempting to authenticate the sensor 110 or receiver 120 to determine how to evaluate an offered certificate or public key. Therefore, the security architecture can be updated over time and can support overlapping environments that can develop where, for example, sensors 110 are intended as single- or limited-use devices and are not reprogrammable.

Through a similar mechanism, certificates associated with a receiver 120 and/or a software application executing on a receiving device in communication with the sensor 110 can be invalidated or rejected for use. As an example, the manufacturer of sensors 110 or operator of the medical monitoring system 110 can revoke certificate agreements between the manufacturer or operator and a formerly authorized entity to ensure consumer security. The manufacturer can update the security version on newly produced sensors 110 to a version that does not support certificates associated with the formerly authorized entity, which will cause the sensors 110 to exclude or refuse to connect with receivers 120 associated with the entity. As sensors 110 can be designed with a limited usable lifetime and/or shelf life, older sensors 120 will eventually age out of the field, ensuring that the certificate revocation is made effective. Additionally or alternatively, certificates associated with individual manufacturers of receivers 120 can be revoked by updating the database stored in the sensor 110 for supported certificate revisions for that party. When establishing a communication session, the sensor 110 queries the certificate revision value database using the manufacturer identifier for the receiver 120. If the certificate revision value provided by the receiver 120 does not match the version number supported by the sensor 110, then the communication session is rejected, effectively revoking the certificate and blocking access to the sensor 110 by the receiver 120.

The ASIC hardware abstraction layer 200 can include software functions to enable the communication module to communicate with the ASIC 130 via the serial-peripheral interface 300. As shown by the arrows connecting the ASIC hardware abstraction layer 200 and other components, the ASIC hardware abstraction layer 200 includes a variety of functions to enable the communication module 140 to write to, read from, and control the ASIC 130. For example, the ASIC hardware abstraction layer 200 supports ASIC drivers 270 exposing various functions of the ASIC 130 to the communication module. The OTP emulators 275 can include software functions to emulate and enable access of the communication module 140 to the OTP memory 131 of the ASIC 130, for example, the internal RAM and serial memory.

The core framework 280 can include functions underlying fundamental operation of the ASIC 130. These functions include the necessary core operations allowing for the ASIC 130 to execute, such as the processor scheduler, interrupt handler, memory manager, and timer utility. The hardware abstraction layer 285 can include functions tying into the various low-level hardware components of the ASIC 130. These functions includes functions relating to the boot sequencer, power manager, voltage monitor, and other hardware drivers.

Figure 3:
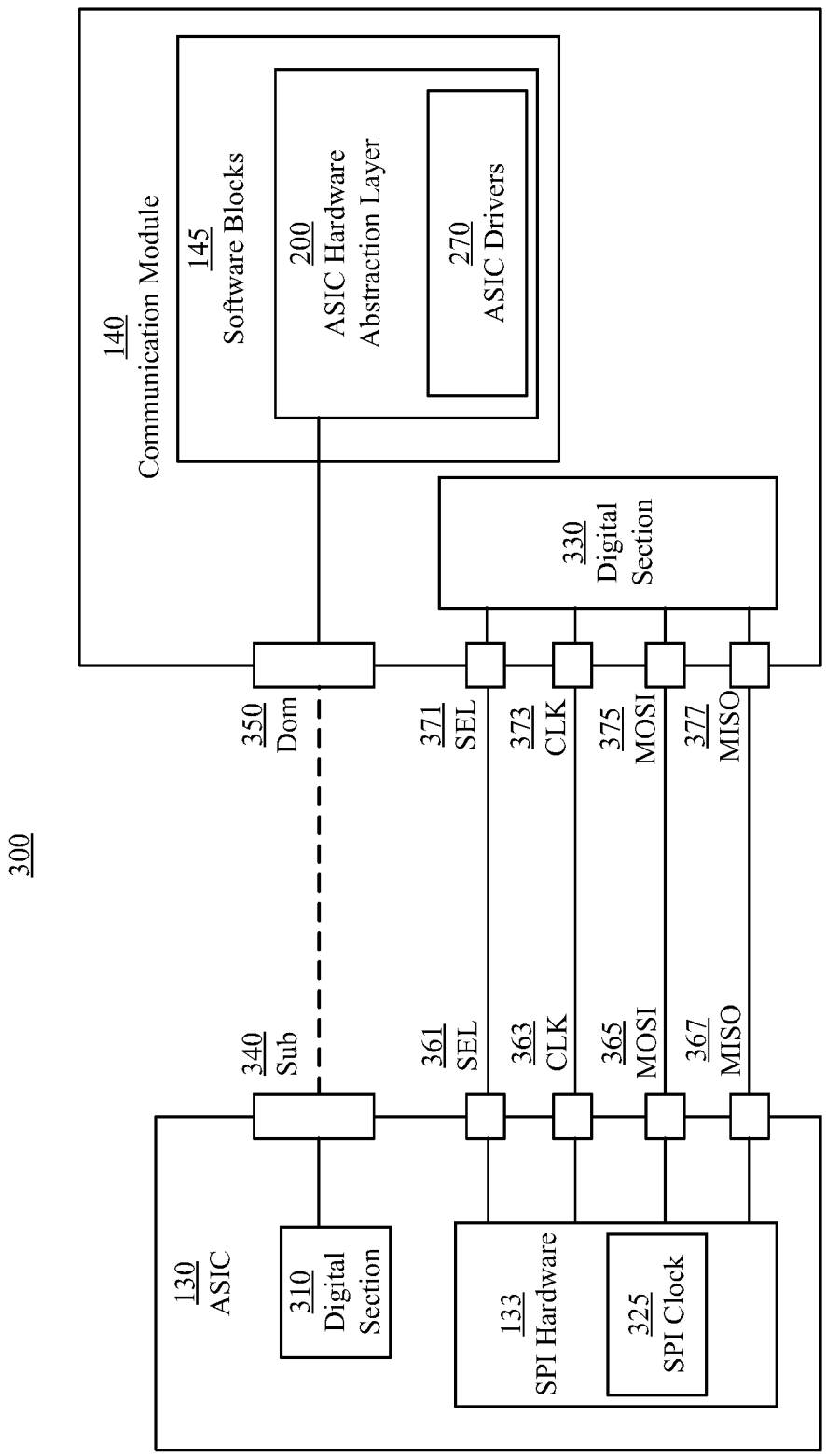
FIG. 3 is a diagram illustrating an example interface between components of the sensor according to exemplary embodiments of the disclosed subject matter.

For purpose of illustration and not limitation, reference is made to the exemplary embodiment of a physical and logical serial-peripheral interface 300 between the ASIC 130 and communication module 140 for use with the disclosed subject matter as shown in FIG. 3. The SPI logical interface maps to the registers and register settings of the ASIC 130. Certain registers of the ASIC 130 are read-only. Additionally or alternatively, certain registers can be written as well as being read. Designated operations allow for the SPI dominant to read and write ASIC registers. Elements of the logical interface (and valid registers of the ASIC 130) that are read only include interrupt requests. Elements of the logical interface (and valid registers of the ASIC 130) that are write only include NFC response flags and error codes, NFC response valid payloads, and NFC response data. Elements of the logical interface (and valid registers of the ASIC 130) that can be read and written include a unique identifier, calculated data, trimmed data, outlier status, temperature measurements, measurement status, and current measurement results.

As illustrated for example in FIG. 3, the ASIC hardware of the serial-peripheral interface 300 includes an ASIC digital section 310 and physical serial-peripheral interface hardware 133. The SPI hardware 133 can include an SPI clock 325. The SPI hardware of the communication module includes a digital section 330. In the illustrated embodiments, one of the ASIC 130 and communication module 140 is designated as the role of the SPI dominant and the other is designated as the SPI submissive. Particularly, the ASIC 130 is the SPI submissive and has a submissive logical interface 340. The communication module 140 is the SPI dominant and has a dominant logical interface 350. The submissive logical interface 340 and dominant logical interface 350 are connected via a logical connection. The SPI logical interface 300 specifies the connection between the ASIC 130 and the communication module 140 at the logical register level. The ASIC Hardware Abstraction Layer 200 module of the software blocks 145 forms messages with their parameters as the SPI dominant, and the ASIC digital section 310 contains the registers and the logic to read and write them. As embodied herein, the SPI clock frequency is set to the maximum allowable by the ASIC 130 (e.g., 3 MHz). FIG. 3 further illustrates the four wire physical SPI interface between the SPI hardware 133 of the ASIC 130 and the digital section 330 of the communication module. The physical SPI interface includes a connection between the SEL pin 361 of the ASIC 130 and a counterpart 371 of the communication module 140, the CLK pin 363 of the ASIC 130 and a counterpart 373 of the communication module 140, the MOSI pin 365 of the ASIC 130 and a counterpart 375 of the communication module 140, and the MISO pin 367 of the ASIC 130 and a counterpart 377 of the communication module 140. For purpose of illustration and not limitation, exemplary sequences of read and write messages suitable to accomplish various functionality and use case scenarios of the system are described herein with reference to the corresponding diagrams.

Figure 4:
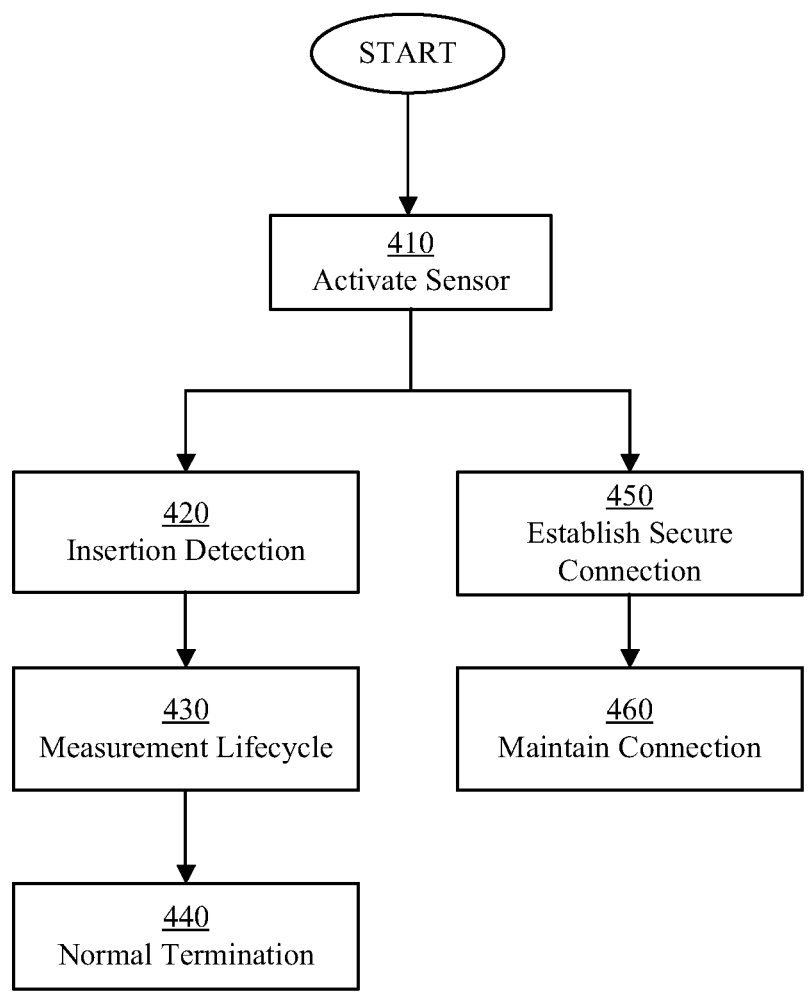
FIG. 4 is a diagram illustrating an example of a normal operating condition of the sensor according to exemplary embodiments of the disclosed subject matter.

For purpose of illustration and not limitation, reference is made to the exemplary embodiment of a high-level functional depiction of a successful lifecycle of the sensor during its operations as shown in FIG. 4. FIG. 4 illustrates an example activity diagram for the nominal, successful lifecycle of the sensor 110 described herein with respect to exemplary embodiments. The communication connection process (e.g., the establish secure connection state 450 and maintain connection state 460) is described herein. Once the sensor 110 is activated, the communication stack attempts to connect to a paired receiver 120 through established communication procedures (e.g., standard BLE communication protocols) and complete a proprietary authentication process. The communication connection process, represented by state 450, and the maintenance of the connection, represented by state 460, can occur in parallel and can be asynchronous with the measurement process, represented by states 420-440. The measurement data is transferred from the ASIC 130 to the communication module 140 for notification to the receiver 120.

State 410 represents the activate sensor state of the sensor 110 lifecycle. The activate sensor process consists of a series of transactions (e.g., NFC transactions) between the ASIC 130 and the communication module 140, facilitated by the radio hardware abstraction layer 200. The activate sensor state 410 is described in further detail herein, e.g., with respect to FIGS. 9A-9B. After the sensor 110 is activated, the sensor 110 can advance to the insertion detection state 420.

The insertion detection state 420 represents the stage of the sensor 110 lifecycle in which the sensor 110 determines whether the sensor 110 has been successfully attached to the body of the patient, and whether the medical hardware 155 has been correctly attached, as applicable based on the type of hardware. For example, if the medical hardware 155 includes a blood glucose analyte sensor, the sensor 110 can determine whether the medical hardware 155 has been properly inserted and is capable of reading glucose levels appropriately. The insertion detection state 420 is described in further detail herein, e.g., with respect to FIG. 10. After the sensor 110 insertion is verified, the sensor 110 can advance to the measurement lifecycle state 430.

The measurement lifecycle state 430 represents the stage at which the sensor 110 is actively recording measurements from the medical hardware 155 and transmitting the measurements to an applicable receiver 120. The measurement lifecycle state 430 is described in further detail herein, e.g., with respect to FIGS. 11-12. At the conclusion of the sensor measurement lifecycle, the sensor can enter a normal termination state 440 during which the sensor wraps up operation and prepares for disposal. The normal termination state is described in further detail herein, e.g., with respect to FIG. 18.

Figure 5:
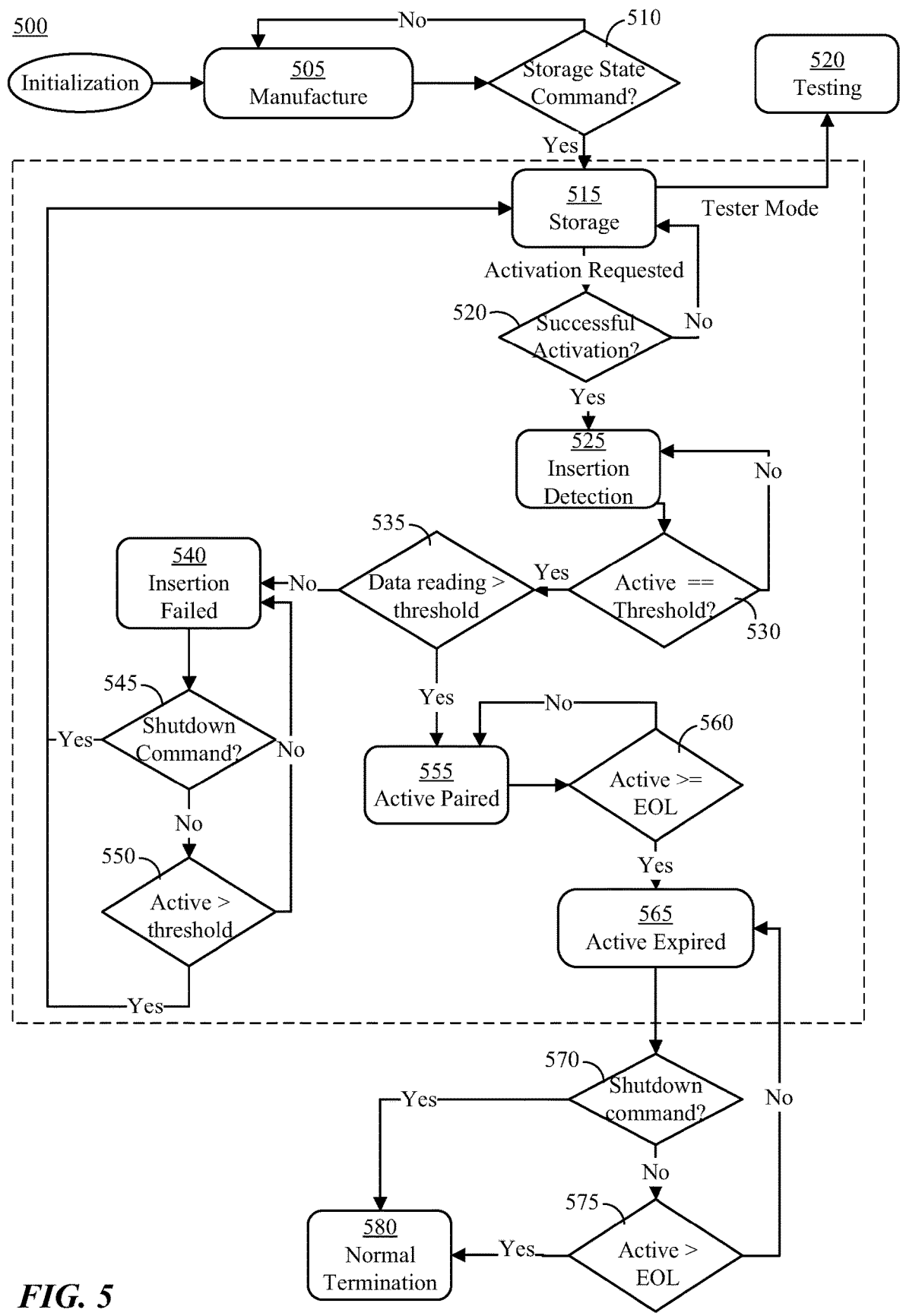
FIG. 5 is a diagram illustrating example operations of the sensor according to exemplary embodiments of the disclosed subject matter.

For purpose of illustration and not limitation, reference is made to the exemplary embodiment of a high-level depiction of a state machine representation 500 of the actions that can be taken by the sensor 110 as shown in FIG. 5. FIG. 5 illustrates a state machine representation of the functions of the sensor described herein with respect to exemplary embodiments. After initialization, the sensor enters state 505, which relates to the manufacture of the sensor. During the manufacture state the sensor 110 can be configured for operation, for example, the one-time programmable memory of the communication module can be written. Other operations requiring increased security protocols can be performed with respect to the sensor. At various times while in state 505, the sensor can trigger the state 510, in which the sensor checks whether a received command is a command to go to the storage state 515. If no "go to storage state" command has been received, the sensor 110 returns to state 505. If a "go to storage state" command has been received, the sensor 110 advances to the storage state 515.

Upon entry to the storage state 515, the sensor performs a software integrity check. While in the storage state 515, the sensor can perform other operations, including, as an example, resetting variables relating to the operation of sensor 110, such as the active time of operation of the sensor 110, the activation time of the sensor 110, identification information of devices authenticated to communication with the sensor 110, and resetting data management functions (e.g., to preserve or erase sensitive data from the device). The storage state 515 can generally relate to operations to facilitate the sensor 110 being made available to an end user (e.g., a patient). As embodied herein, the storage state 515 can also relate to data recovery and preservation operations (e.g., committing data stored in volatile memory to non-volatile memory) so that the sensor 110 can be shut down in a controlled manner and avoid data loss.

While in the storage state, the sensor can receive a sensor testing mode command and advance to the testing state 520. The testing state 520 can be used to repair or debug the sensor 110 and can involve enabling additional security privileges to analyze the memory and operations of the sensor that are not ordinarily available during normal operation. While the sensor 110 is in the testing state 520, a functional tester system can check that the components of the sensor 110 function as designed. The communication module 140 can be programmed with adjustments to the configuration parameters. The functional test can include, for example, and without limitation, a reference board test, an off-current test, reading ASIC 130 registers, ASIC 130 leakage test, current offset calibration, a diagnostics scale factor calibration, power consumption tests, a communication module radio function test, or programming.

While in the storage state, the sensor can also receive an activation request command and advance to state 520, in which the sensor determines whether activation has been completed successfully, as described herein. If the activation is unsuccessful, the sensor returns to the storage state 515. If activation is successful, the sensor 110 advances to the insertion detection state 525.

Upon entry to state 525, the sensor 110 can store information relating to devices authenticated to communicate with the sensor as set during activation, initialize algorithms related to conducting and interpreting measurements from the medical hardware 155, initialize the ASIC 130 of the sensor 110, as described herein. The sensor 110 can also initialize the lifecycle timer, responsible to maintaining an active count of the time of operation of the sensor 110 and begin communication with authenticated devices to transmit recorded data. The sensor 110 can also perform additional operations while in the insertion detection state 525, including additional software integrity checks, recording initial measurements using the medical hardware 155 and related software functions, logging the measurements and transmitting results to an authenticated receiver 120. The sensor 110 can also increment the time of operation as appropriate.

While in the insertion detection state 525, the sensor can enter state 530, where the sensor 110 checks whether the time of operation is equal to a predetermined threshold. As described herein, this time of operation threshold can correspond to a timeout function for determining whether an insertion has been successful. If the threshold has not been reached, the sensor 100 returns to the insertion detection state 525 and continues to monitor measurements. If the time of operation has reached the threshold, the sensor 110 advances to state 535, in which the sensor 110 checks whether the average data reading is greater than a threshold amount corresponding to an expected data reading volume for triggering detection of a successful insertion. If the data reading volume is lower than the threshold while in state 535, the sensor advances to state 540, corresponding to a failed insertion. If the data reading volume satisfies the threshold, the sensor advances to the active paired state 555.

The insertion failed state 540 corresponds to operations used to determine the source of the failed insertion and recover from the failed insertion if possible. On entry to the insertion failed state 540, the sensor 110 can increment a counter used to track the number of insertion failures by the particular sensor 110 and can send the ASIC 130 into a storage mode state. The sensor 110 can also begin operations to determine whether there is a recoverable error in the sensor 110. For example, the sensor 110 can perform a software integrity check to determine if the error relates to the programming of the communication module, the sensor 110 can also determine whether the sensor 110 is connected via the communication module 140 to a receiving device. If not, the sensor 110 can attempt to establish connections (e.g., to offload any recorded data). While in the insertion failed state 540, the sensor 110 can receive a shutdown command 545, which can cause the sensor to return to the storage state 515. If no shutdown command has received, the sensor 110 can, at state 550, revert to the storage state 515 automatically after the time of operation has exceeded a predetermined time of unsuccessful operation (e.g., 30 minutes, 1 hour, two hours, 12 hours, etc.). If no affirmative shutdown command is received and the time of operation has not exceeded the threshold, the sensor 110 stays in the insertion failure state 540.

The active paired state 555 of the sensor 110 reflects the state while the sensor 110 is operating as normal by recording measurements, processing the measurements, and reporting them as appropriate to an authenticated, and connected, receiver 120. While in the active paired state 555, the sensor 110 sends measurement results or attempts to establish a connection with an authenticated receiver 120 to send the measurement results. The sensor 110 also increments the time of operation, as discussed herein. As described herein, the sensor 110 can be configured to operation for only a fixed period of time, for example, due to the limits of the ability of the medical hardware 155 to accurately record measurements or in order to preserve the health of the patient. At state 560, the sensor 110 monitors the stage of the time of operation. If the time of operation has not reached the threshold, the sensor 110 remains in the active paired state 555. Once the sensor 110 reaches a predetermined threshold time of operations (e.g., once the time of operation reaches a predetermined threshold), the sensor 110 transitions to the active expired state 565.

The active expired state 565 of the sensor 110 reflects the state while the sensor 110 has operated for its maximum predetermine amount of time. While in the active expired state 565, the sensor 110 can generally perform operations relating to winding down operation and ensuring that the collected measurements have been securely transmitted to receiving devices as needed. For example, while in the active expired state 565, the sensor 110 can transmit collected data and, if no connection is available, can increase efforts to discover authenticated devices nearby and establish and connection therewith. While in the active expired state 565, the sensor 110 can receive a shutdown command at state 570. For example, the sensor 110 can receive the shutdown command after it has offloaded stored measurements. If no shutdown command is received, the sensor 110 can also, at state 575, check if the time of operation has exceeded a final operation threshold. The final operation threshold can be based on the battery life of the sensor 110, with a goal of ensuring there is enough available battery to perform the final transmission of data. If the threshold is exceeded, at state 575 the sensor 110 transitions to the normal termination state 580. The sensor 110 can also transition to the normal termination state 580 upon receiving the shutdown command at state 570. The normal termination state 580 corresponds to the final operations of the sensor 110 and ultimately shutting down the sensor 110.

Figure 6:
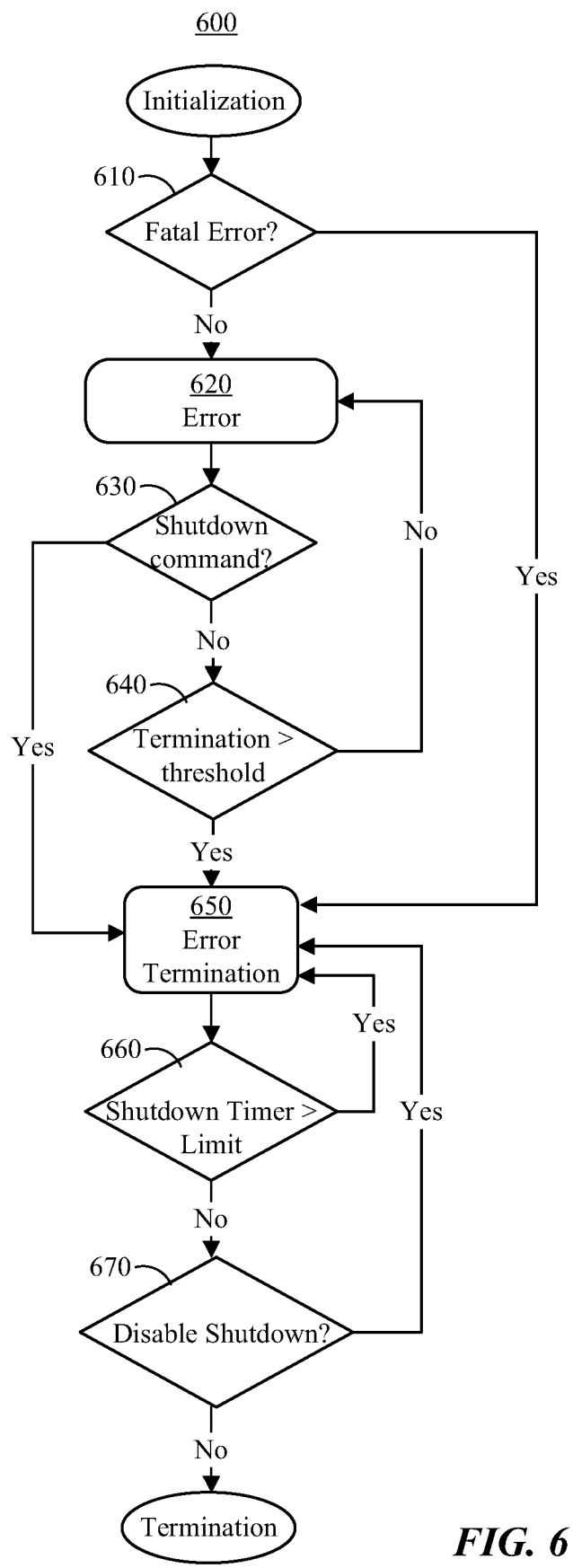
FIG. 6 is a diagram illustrating example operations of the sensor in an error condition according to exemplary embodiments of the disclosed subject matter.

For purpose of illustration and not limitation, reference is made to the exemplary embodiment of a state machine representation 600 of the actions that can be taken by the sensor 110 as shown in FIG. 6. FIG. 6 illustrates a state machine representation of exemplary functions of the sensor described herein. For example, the state machine representation 600 relates to the error states of the sensor 110. The sensor 110 can enter the error state machine upon prompting of an interrupt request by the ASIC 130 or communication module 140 or other similar interrupts. After initialization, the sensor 110 first determines whether the error is a fatal error at state 610. For example, a fatal error is an error from which the sensor 110 cannot recover. If the error is a fatal error, the sensor 110 proceeds immediately to the error termination state 650. If the error is not a fatal error, the sensor 110 proceeds to the error state 620.

Upon entry to the error state 620, the sensor 110 starts a termination timer relating to the amount of time that the sensor 110 has been in the error state. The sensor 110 also attempts to offload stored data to a more permanent storage (e.g., to an applicable receiver 120) by communicating with a receiver 120 or attempting to establish a communication with the receiver 120. At state 630, the sensor 110 can receive a shutdown command, e.g., after offloading its stored measurement data and proceed to the error termination state 650. If no shutdown command is received at state 630, at state 640, the sensor 110 determines whether the termination timer has exceeded a predetermined threshold. The predetermined threshold can relate to an amount of time that the sensor 110 can attempt to salvage the stored data before the battery of the sensor 110 is expected to run out. If the threshold is not exceeded, the sensor 110 remains in the error state 620. If the threshold is exceeded, the sensor 110 transitions into the error termination state 650.

The error termination state 650 relates to processes performed by the sensor 110 in preparation of shutting down after encountering an error. Upon entry to the error termination state 650, the sensor 110 stops the termination timer and starts a new shutdown timer. Once the sensor 110 enters the error termination state 650, the sensor 110 can have a predetermined amount of time to operate before a shutdown is forced, which can be selected, for example, for security reasons, such as to reduce risks of illicit access to the sensor by triggering errors or other sensor malfunctions. At state 660, the sensor 110 determines whether the shutdown timer has reached the threshold amount of time before the shutdown is enforced. If not, the sensor 110 remains in the error termination state 650. If the shutdown timer has exceeded the threshold, at state 670, the sensor 110 determines whether a high-priority disable shutdown flag has been set. If the disable shutdown flag has been set, the sensor remains in the error termination state 650 until the flag is unset. The disable shutdown flag can be set as a result of the sensor 110 receiving a shutdown command from the receiver 120. If the disable shutdown flag is unset, the sensor terminates.

Figure 7:
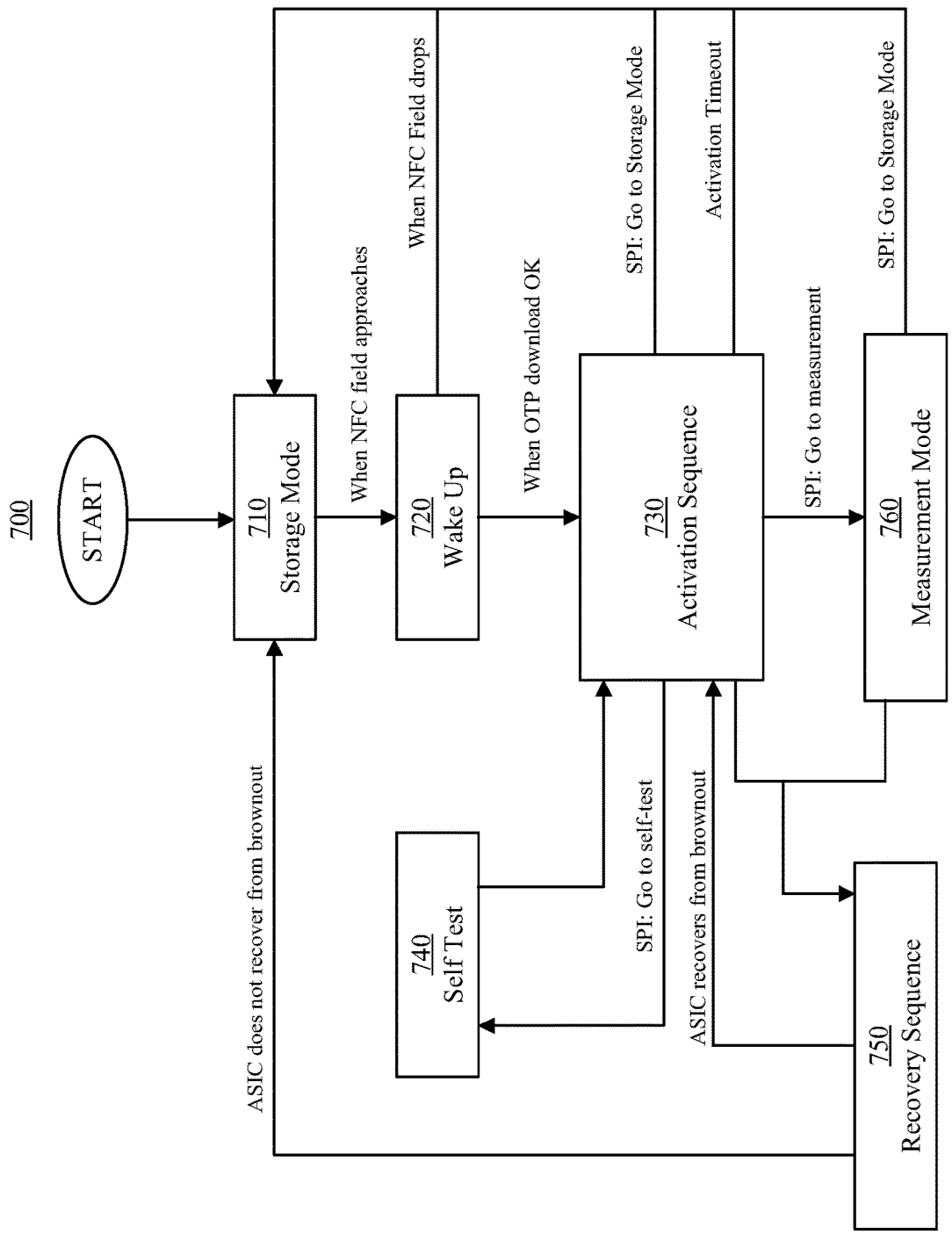
FIG. 7 is a diagram illustrating example states of an application-specific integrated circuit of the sensor according to exemplary embodiments of the disclosed subject matter.

For purpose of illustration and not limitation, reference is made to the exemplary embodiment of a state machine representation 700 of the actions that can be taken by the ASIC 130 as shown in FIG. 7. FIG. 7 illustrates a state machine representation 700 of the functions of the ASIC 130 described herein with respect to exemplary embodiments. After initialization, the ASIC 130 enters the storage mode state 710. When an NFC field approaches the ASIC 130, the ASIC 130 transitions to the wake up state 720. When the NFC field near the ASIC 130 drops, the AISC 130 returns to the storage mode state 710. While in the wake up state, if the one-time programmable memory is validated before the NFC field drops, the ASIC 130 transitions to the activation sequence 730. While in the activation sequence 730 the ASIC 130 can receive a number of commands to return the ASIC 130 to the storage mode state 710. For example, the ASIC 130 can determine it has timed out during the activation process and in response default to the storage mode 710. As another example, the ASIC 130 can receive a "go to storage mode" command over the serial-peripheral interface 300.

Figure 24:
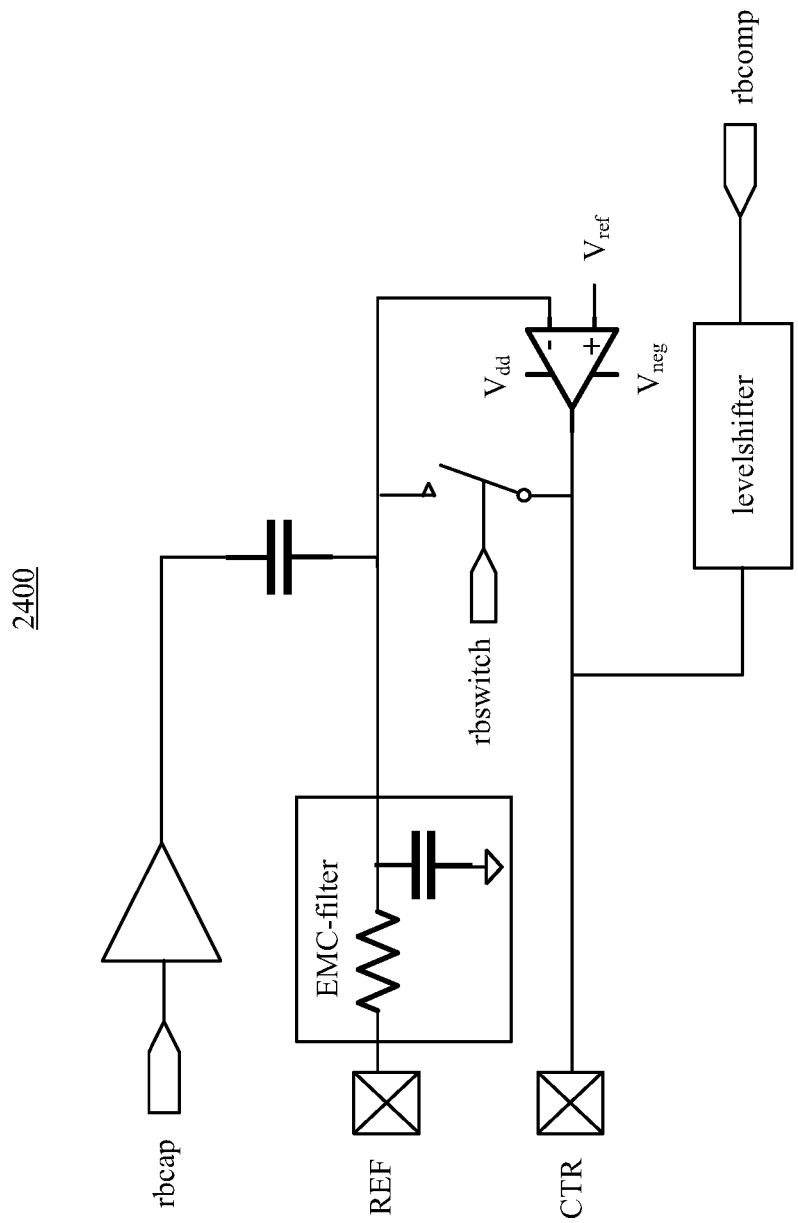
FIG. 24 is a diagram illustrating example functionality of an ASIC of a sensor according to exemplary embodiments of the disclosed subject matter.

While in the activation sequence 730, the ASIC 130 can also receive a "go to self-test" command over the serial-peripheral interface 300. In response, the ASIC 130 advances to the self-test state 740. The self-test circuit (e.g., a reference built-in self-test) detects leakage currents on the reference terminal connecting the medical hardware 155 to the ASIC 130. In the example of the medical hardware being an analyte sensor, the sensor current being measured can be so low that the circuit board of the sensor 110 should be designed to reduce and capture surface leakage of measured current due to small amounts of, for example, contamination and moisture. Contamination can arise from flux residue or handling. Leakage can further arise at connections to different electrodes of the multi-electrode analyte sensor (for example at the working electrode connection and at the reference electrode connection). Leakage at the working electrode connection can be captured as part of device offset calibration. If the level of leakage exceeds a threshold value (e.g., if the required offset is too large) then the analyte sensor can be rejected during manufacture. The built-in self-test can be used to check for leakage at the reference electrode connection (which can be used to compare to the voltage from the working electrode connection). After completing the built-in self-test, the ASIC returns to the activation sequence state 730. FIG. 24 illustrates an example topology 2400 of the built-in self-test.

While in the activation sequence 730, the ASIC 130 can also receive a "go to measurement" command over the serial-peripheral interface 300. In response, the ASIC 130 advances to the measurement mode 760.

Figure 15A:
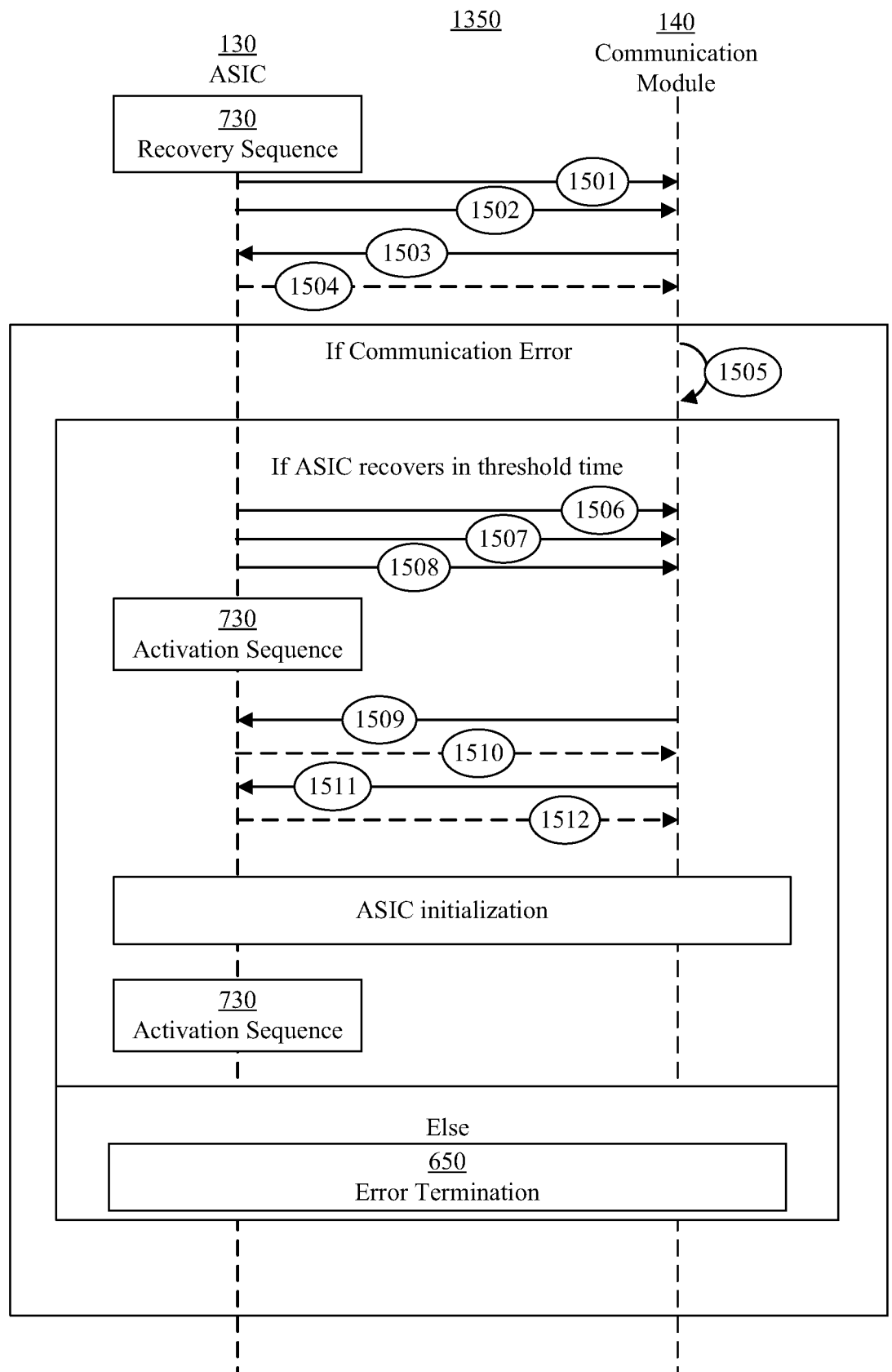
FIGS. 15A-15B is a diagram illustrating example functionality of the sensor and messages between components of the sensor during an exemplary brownout handling operation.
Figure 15B:
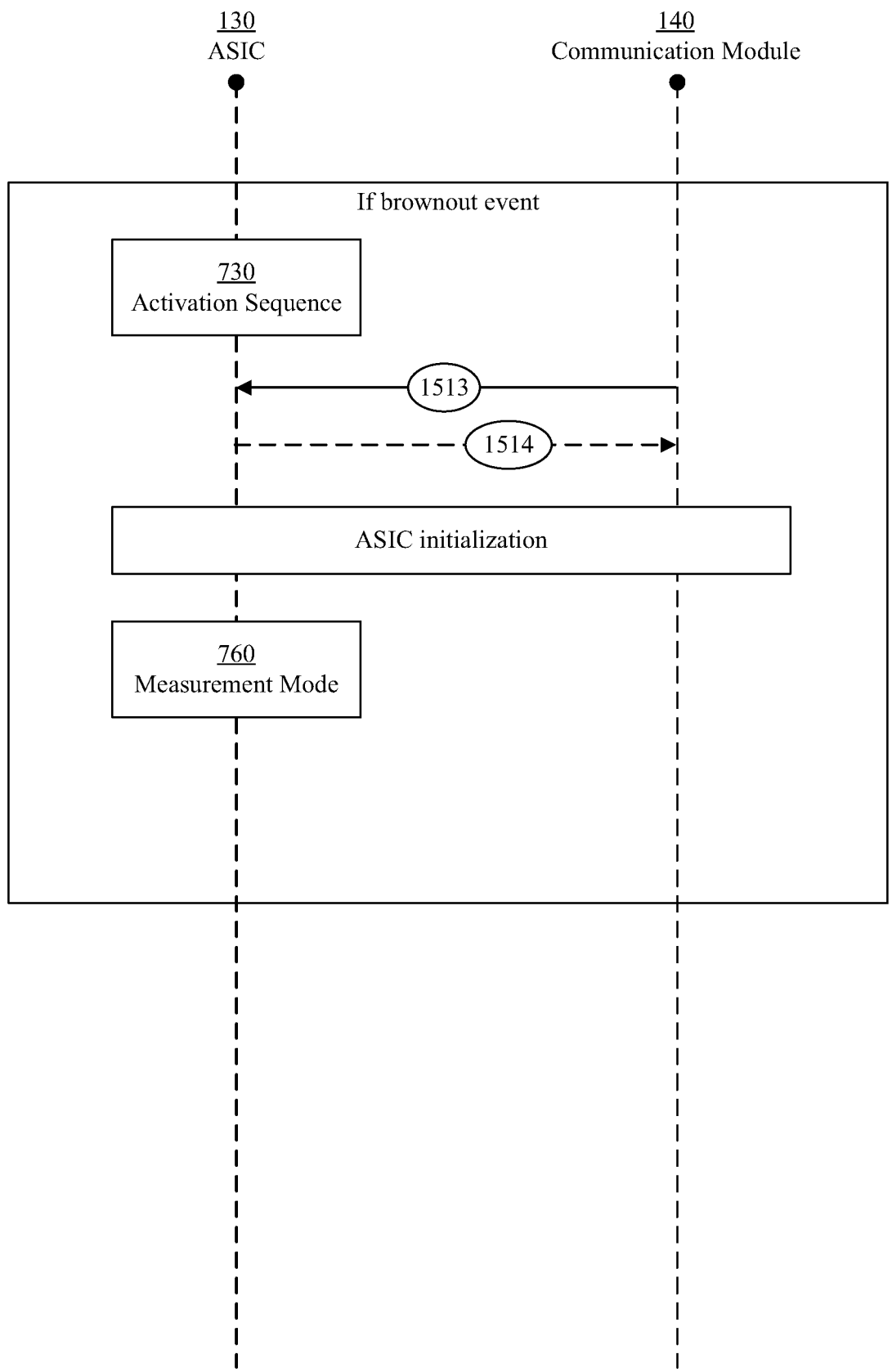

During the activation sequence 730 or the measurement mode 760, the ASIC 130 can proceed to the recovery sequence 750 in response to, for example, detection of a brownout as described herein with respect to FIGS. 15A-15B. In the event of a marginal brownout, the battery voltage supplied to the ASIC 130 temporarily dips below a battery level threshold for a little longer than a nominal threshold time, which would be long enough to leave the ASIC in storage mode and unrecoverable, even if the battery voltage were to recover eventually. As it can be desirable to have the ASIC 130 wake up from the marginal brownout condition, which can be the result of an electrostatic discharge, the ASIC 130 can use the interrupt request (IRQ) pin (e.g., the input-output pin corresponding to IRQ alerts from the communication module 140) for waking up.

When the ASIC 130 recovers from the brownout, the ASIC 130 returns to the activation sequence 730. If the ASIC 130 does not recover from the brownout while in the recovery sequence 750, the ASIC 130 returns to the storage mode 710.

Figure 8:
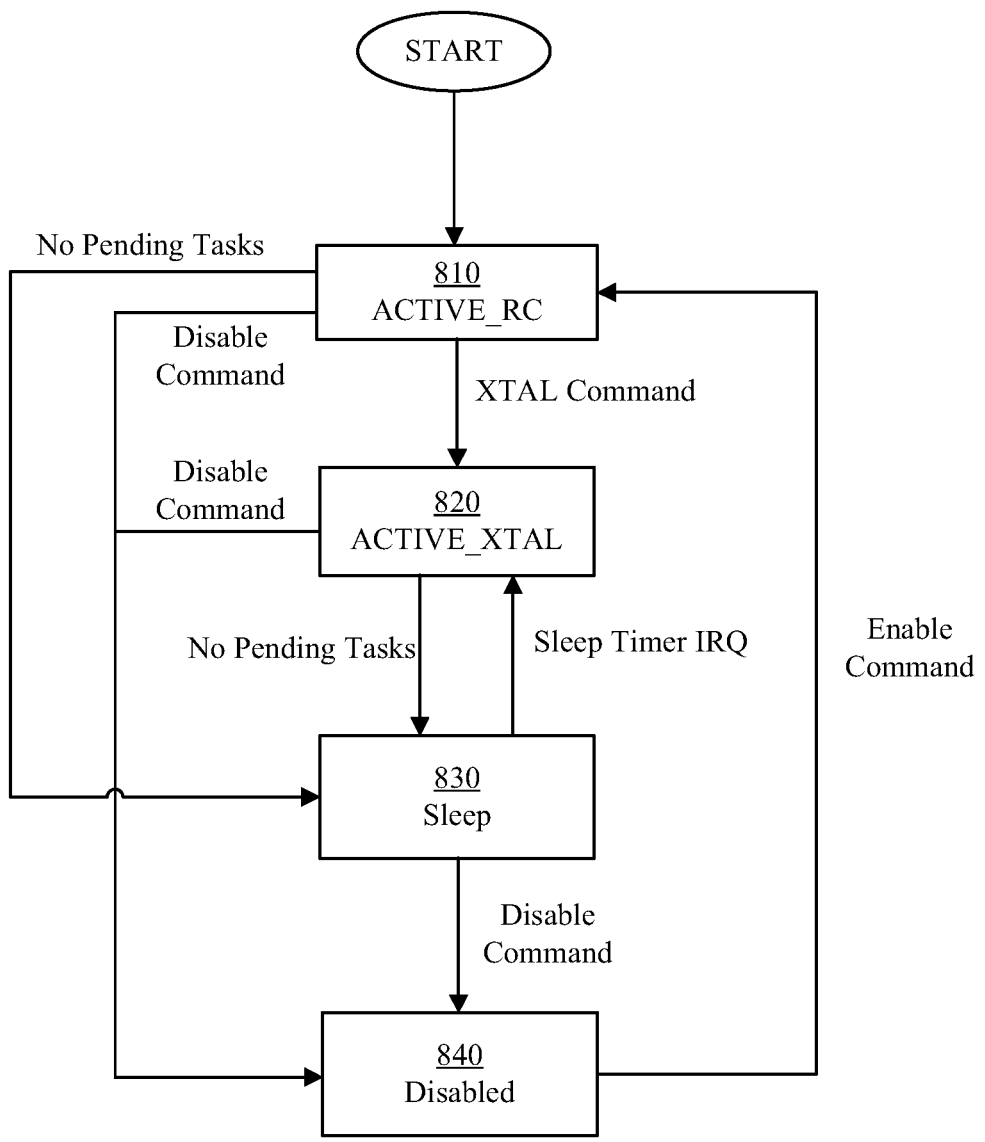
FIG. 8 is a diagram illustrating example states of a communication module of the sensor according to exemplary embodiments of the disclosed subject matter.

For purpose of illustration and not limitation, reference is made to the exemplary embodiment of a state machine representation 800 of the actions that can be taken by the communication module 140 as shown in FIG. 8. FIG. 8 illustrates a state machine representation 800 of the functions of the communication module 140 described herein with respect to exemplary embodiments. After initialization, the communication module 140 transitions to the ACTIVE_RC state 810. While in the ACTIVE_RC state 810, if the communication module 140 receives a "go to XTAL command", the communication module 140 transitions to the ACTIVE_XTAL state 820. In the ACTIVE_XTAL state 820, the radio of the communication module 140 is active and the microcontroller 143 executes application code (e.g., pending tasks).

While in the ACTIVE_RC state 810 or the ACTIVE_XTAL state 820, if there are no pending tasks for the microcontroller 143 of the communication module 140, the communication module advances to the sleep state 830. While in the sleep state 830, the communication module enters a low power mode. The communication module 140 can receive a sleep timer interrupt request, causing the communication module 140 to transition back to the ACTIVE_XTAL state 820.

While in any state (e.g., ACTIVE_RC state 810, ACTIVE_XTAL state 820, and sleep state 830) the communication module 140 receive a chip disable command. In response, the communication module 140 transitions to the disabled state 840. While in the disabled state 840, the communication module can receive an enable command, which causes the communication module 140 to transition to the ACTIVE_RC state 810.

As embodied herein, the communication module 140 can keep itself enabled independently of the ASIC 130 by using a general purpose input-output (GPIO) pin to drive its enable line high. In this manner, the GPIO pin of the communication module 140 can be shorted directly to the corresponding enable pin, which can also be connected to a enable output pin of the ASIC 130. As described herein, when the sensor 110 is in a shelf (e.g., standby or storage) mode, the communication module 140 is in the disabled state 840 where said GPIO and enable pins are in a high impedance state and the enable output pin of the ASIC 130 is driving the enable line low. In the presence of an NFC field, the ASIC 130 can eventually drive the enable line high as ASIC 130 enters the activation state 730 to enable the radio. At substantially the same time, the GPIO pin can be briefly configured as an input with a pull-down resistor as the communication module powers up. The ASIC 130 has adequate drive strength to keep the enable line high during this process. After the communication module 140 has initialized, the GPIO pin can be reconfigured as an output and thus drive the enable pin high. If the system encounters a brownout event, the enable line will be kept high by the GPIO of the communication module 140 even when the ASIC 130 is driving it low, which can be possible at least in part because of the weak low output level of the ASIC 130.

Figure 9A:
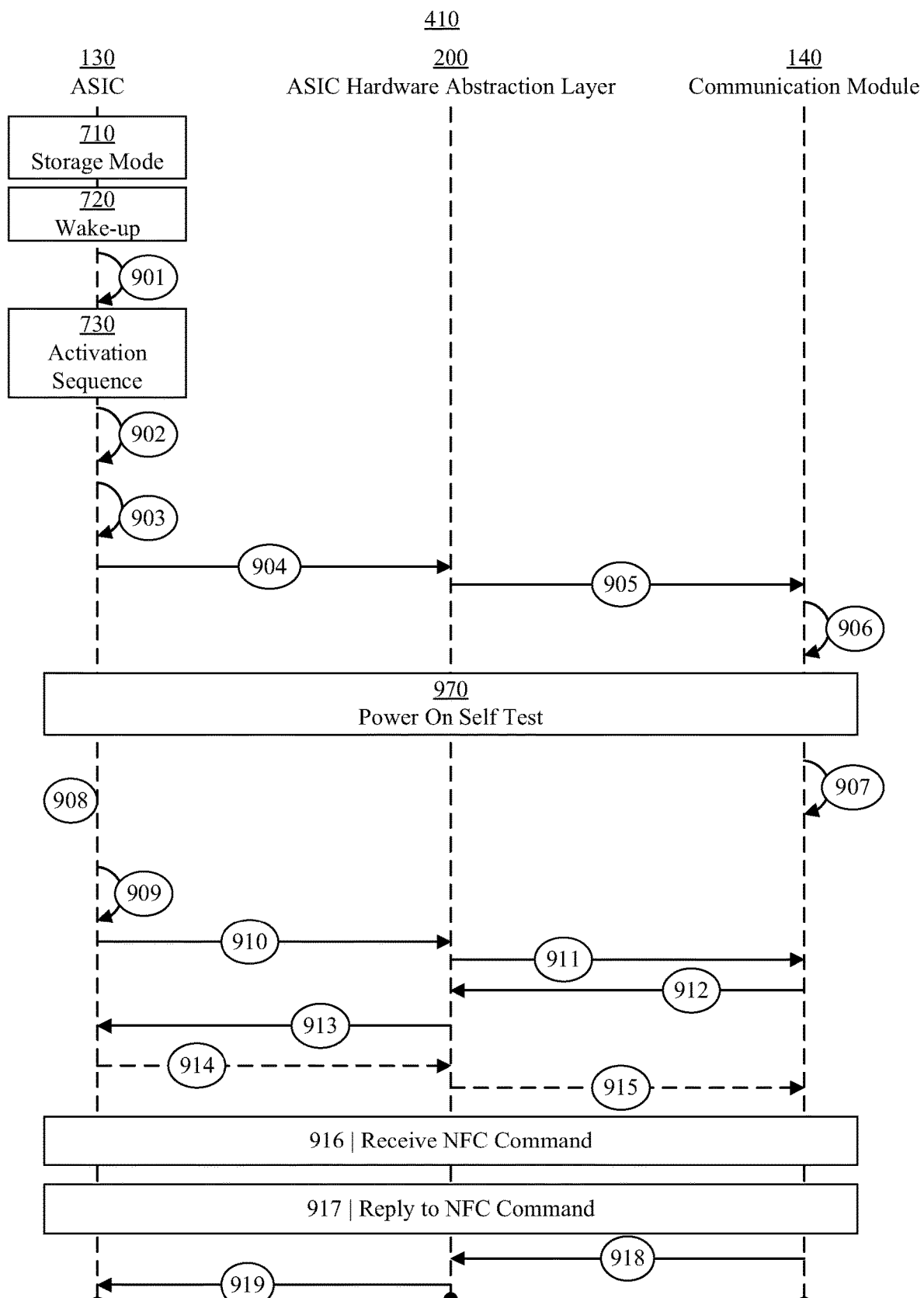
FIGS. 9A-9B is a diagram illustrating example functionality of the sensor and messages between components of the sensor during an exemplary activation operation.
Figure 9B:
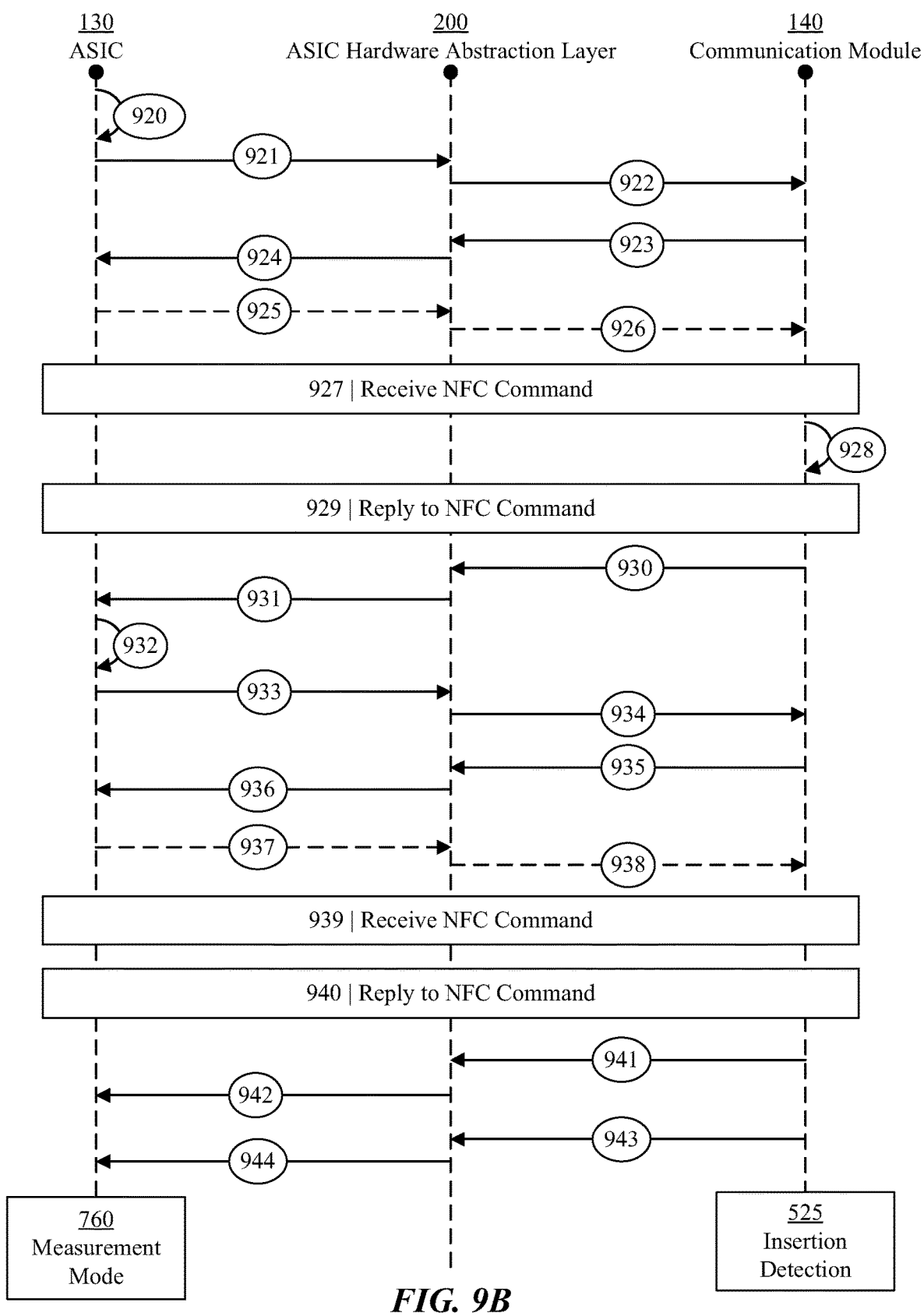

For purpose of illustration and not limitation, reference is made to the exemplary embodiment of a procedure 410 for sensor activation for use with the disclosed subject matter as shown in FIGS. 9A-9B. The sensor activation process includes a series of transactions between the ASIC 130 and the communication module 140, which can be facilitated by the hardware abstraction layer 200. Before a sensor is activated, the ASIC 130 resides in the low power storage mode state 710. In the storage mode state 710, a battery switch of the ASIC 130 is open and the communication module 140 is in a stand-by or low-power state. At this point, the activation process does not begin until an incoming RF field (e.g., NFC field) drives the voltage of the power supply to the ASIC 130 above a reset threshold, which causes the sensor 130 to enter the wake-up state 720. While in the wake-up state 720, at 901, the ASIC 130 downloads OTP data into the main registers in the memory 131 and enters the activation sequence state 730. At 902, the battery switch will be closed, allowing for regular power to flow to the components of the sensor 110. At 903, the ASIC 130 wakes the communication module 140 by asserting an appropriate command along the SPI 300. The assertion passes, at 904 to the ASIC hardware abstraction layer 200, and to the communication module 140 at 905.

At 906, the communication module 140 is initialized, initializing the radio 148, triggering a power on self-test 970. The power on self-test 970 can include the ASIC 130 communicating with the communication module 140 using a prescribed sequence of reading and writing data from various registers of the ASIC memory 131 to verify the memory and one-time programmable memory are not corrupted and that the ASIC 130 and communication module 140 can successfully communicate. As an example, the ASIC 130 can be programmed, by the manufacturer, with device-specific content in its memory, such as calibration and configuration data, unique values to identify the ASIC 130, etc. During manufacture of the sensor 110, the ASIC 130 device-specific information can also be written into the memory of the communication module 140 and verified. The device-specific information can be used during the power on self-test 970 as the subject data that is read from the ASIC memory 131. In particular, the device-specific information can be read by the communication module 140 and compared to the previously-stored device-specific information to ensure data integrity. If the comparison indicates no error, the power on self-test is completed. If there is a discrepancy in the data is determined, the sensor 110 can trigger the error termination state 650. At 907, the communication module 140 starts an activation timer. At 908, the ASIC 130 sends an inventory response out.

At 909, the ASIC 130 receives an incoming NFC request. The ASIC 130 notifies the communication module 140 of the incoming NFC request by asserting the IRQ pin at 910 through the ASIC hardware abstraction layer 200 which is passed onto the communication module 140 at 911. The communication module 140 requests read the registers containing IRQ status at 912. The ASIC hardware abstraction layer 200 passes the appropriate formatted request to the ASIC 130 at 913 which returns, at 914, the IRQ status data through the ASIC hardware abstract layer 200 at 915. At 916, the sensor 110 receives an NFC command and payload and, at 917, replies to the NFC command before, at 918 clearing the IRQ. Through the ASIC hardware abstraction layer 200, at 919, the sensor writes appropriate data to the designated registers.

Figure 31:
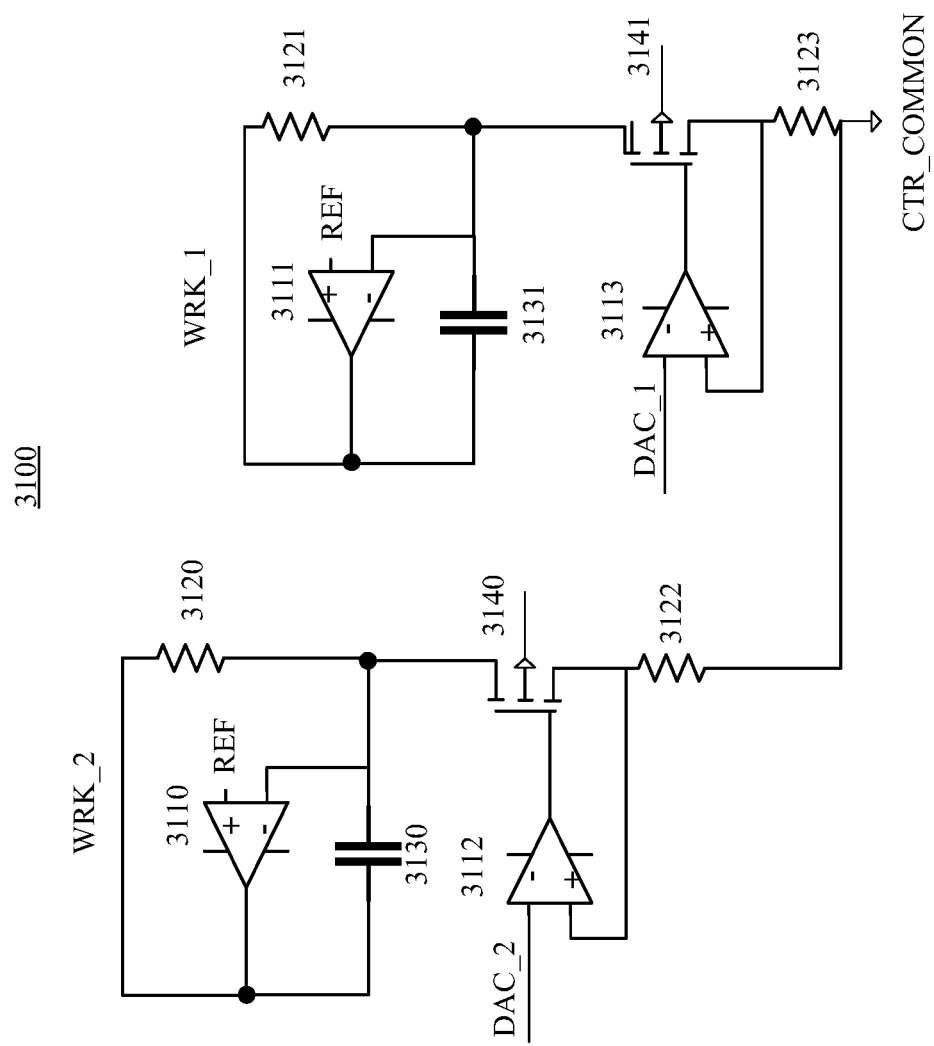
FIG. 31 is a diagram of an example circuit for a variable floating poise voltage generator.

Referring still to FIG. 9B, 920-31 illustrate exemplary handling of an authenticated activation request. At 920, the ASIC 130 receives an incoming NFC request. The ASIC 130 notifies the communication module 140 of the incoming NFC request by asserting the IRQ pin at 921 through the ASIC hardware abstraction layer 200 which is passed onto the communication module 140 at 922. The communication module 140 requests to read the registers containing IRQ status at 923. The ASIC hardware abstraction layer 200 passes the appropriate formatted request to the ASIC 130 at 924 which returns, at 925, the IRQ status data through the ASIC hardware abstract layer 200 at 926. At 927, the sensor 110 receives an NFC command and payload. At 928, the communication module 140 authenticates the activation request. At 929, the sensor replies to the NFC command before, at 930 clearing the IRQ. Through the ASIC hardware abstraction layer 200, at 931, the sensor writes appropriate data to the designated registers in the ASIC memory 131.

With continued reference to FIG. 9B, 930-44 illustrate exemplary procedures for advancing to the measurement mode state 760 after receiving another NFC command. At 932, the ASIC 130 receives an incoming NFC request. The ASIC 130 notifies the communication module 140 of the incoming NFC request by asserting the IRQ pin at 933 through the ASIC hardware abstraction layer 200 which is passed onto the communication module 140 at 934. The communication module 140 requests to read the registers containing IRQ status at 935. The ASIC hardware abstraction layer 200 passes the appropriate formatted request to the ASIC 130 at 936 which returns, at 937, the IRQ status data through the ASIC hardware abstract layer 200 at 938. At 939, the sensor 110 receives an NFC command and payload.

At 940, the sensor replies to the NFC command before, at 941 clearing the IRQ. Through the ASIC hardware abstraction layer 200, at 942, the sensor writes appropriate data to the designated registers in the ASIC memory 131. Additionally, the communication module 140 issues a command, at 943 to go into measurement mode state 760. The command is passed to the ASIC 130 at 944 via writing the command to the appropriate register. The ASIC 130 then transitions to the measurement mode state 760 while the communication module 140 transitions to the insertion detection state 525.

Figure 10:
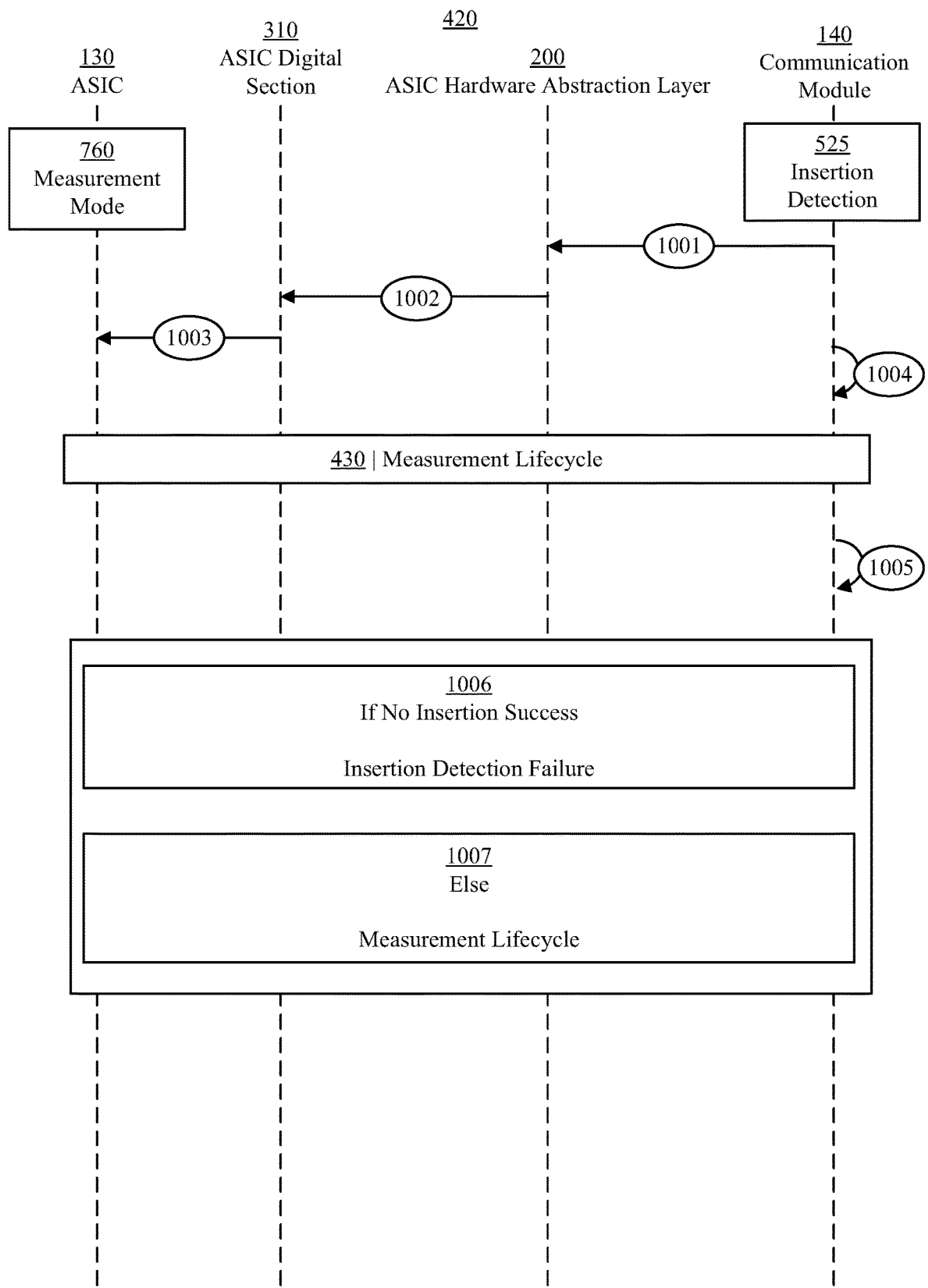
FIG. 10 is a diagram illustrating example functionality of the sensor and messages between components of the sensor during an exemplary insertion detection operation.

For purpose of illustration and not limitation, reference is made to the exemplary embodiment of a procedure 420 for insertion detection for use with the disclosed subject matter as shown in FIG. 10. Initially, for example and as embodied herein, the ASIC 130 is in the measurement mode state 760 and the communication module is in insertion detection mode 525. When the ASIC 130 enters the Measurement Mode 760 for the first time, an insertion detection sequence is performed to verify that the sensor 110 has been properly installed onto the patient's body before a proper measurement can take place. At 1001, the communication module 140 issues a command to activate the measurement configuration process. At 1002, the ASIC hardware abstract layer 200 issues the command to set a command register in the ASIC 130 to cause the ASIC 130 to enter measurement command mode. At 1003, the ASIC digital section 310 converts the command to the drive the appropriate working bias voltage in the predetermined register. The sensor 110 pauses, and the communication module 1005 waits for the counter drive loop to settle after setting the working bias voltage. The sensor 110 then temporarily enters the measurement lifecycle state 430 to runs a predetermined number of consecutive measurements to test whether the insertion has been successful. At 1005, the communication module 140 evaluates the measurement results to determine insertion success. At 1007, when insertion is deemed successful, the sensor 110 enters the measurement lifecycle 430, in which the sensor 110 begins taking regular measurements (e.g., of temperature, glucose, and counter potential).

At 1006, if the sensor 110 determines that the insertion was not successful, sensor 110 is triggered into an insertion failure mode, in which the ASIC 130 is commanded back to Storage Mode 710 while the communication module 140 disables itself. In certain embodiments, the insertion failure mode first determines whether a communication connection has been established (e.g., a Bluetooth connection with an applicable receiver 120). If there is an existing connection, the receiver 120 sends the command for the sensor 110 to go back to the storage state. If there is no existing connection, or the connection is lost, the sensor 110 waits for a predetermined period of time for a connection to be established, allowing the sensor 110 to receiver the go to storage state command from the receiver 120. If the predetermined period of time passes without a successful connection, the sensor 110 enters the storage state.

Figure 11:
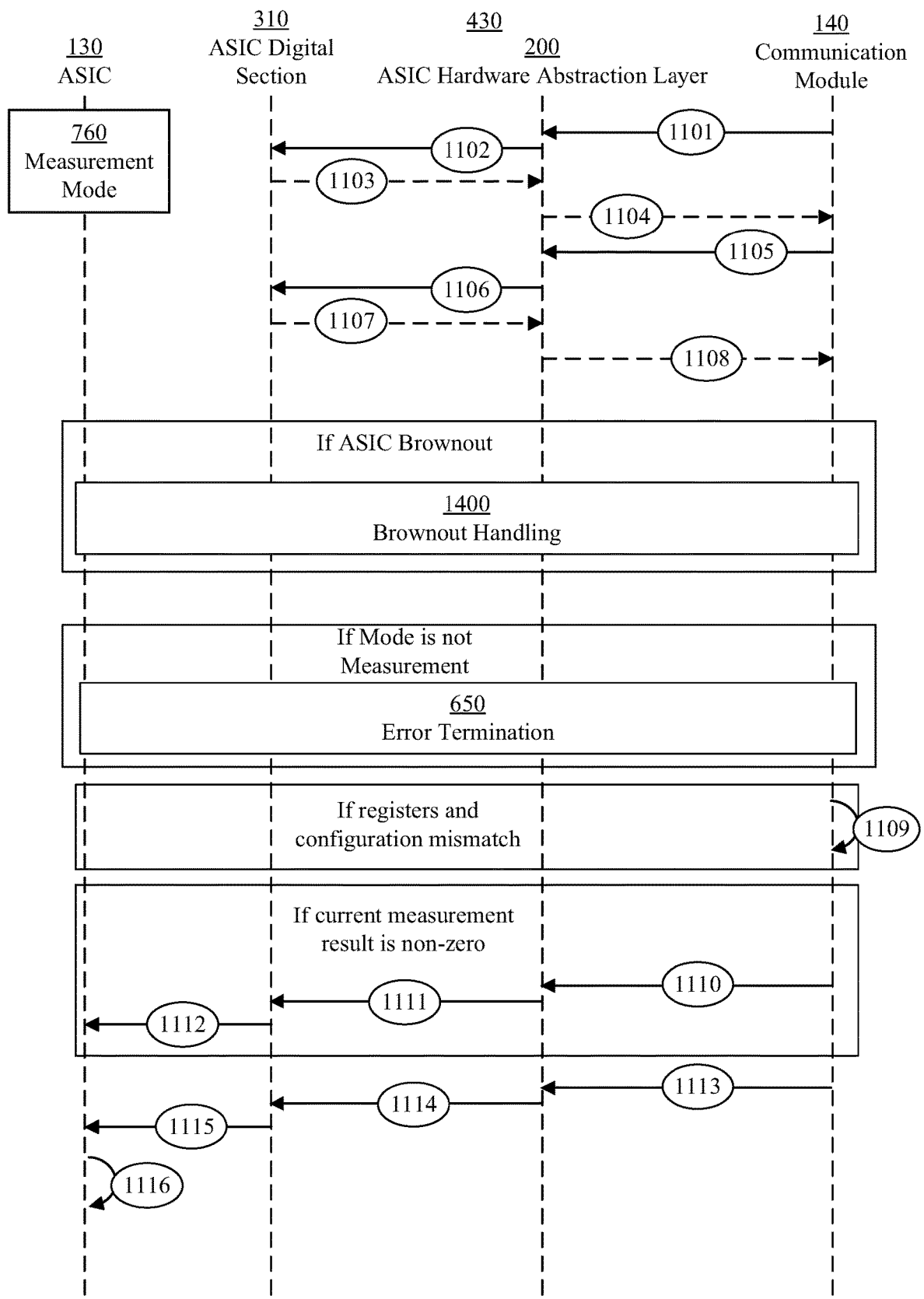
FIG. 11 is a diagram illustrating example functionality of the sensor and messages between components of the sensor during an exemplary measurement operation.

For purpose of illustration and not limitation, reference is made to the exemplary embodiment of a procedure for the measurement lifecycle 430 for use with the disclosed subject matter as shown in FIG. 11. The ASIC 130 begins the measurement lifecycle 430 in the measurement mode state 760. The measurement sequence begin with a burst read of IRQ status, previous measurement results, mode status, outlier status, measurement configurations, and other registers. The communication module 140 checks these data for application integrity to ensure that the sensor 110 is functional to perform the next measurement. For example, at 1101, the communication module issues a request to get previous measurement results. At 1102, the ASIC hardware abstraction layer 200 formats and issues a command to read the appropriate data from the relevant registers of the ASIC memory 131. At 1103, while the SPI clock toggles, the ASIC digital section 310 provides the data from the registers through the ASIC hardware abstraction layer 200, at 1104, to the communication module 140. In FIG. 11 1105-1108 illustrate a procedure for ensuring consistency of the values in the ASIC 130 registers. At 1105, the communication module issues a request to retrieve register data. At 1106, the ASIC hardware abstraction layer 200 formats and issues a command to read the appropriate data from the relevant registers of the ASIC memory 131. At 1107, while the SPI clock toggles, the ASIC digital section 310 provides the data from the registers through the ASIC hardware abstraction layer 200, at 1108, to the communication module 140.

During the measurement lifecycle 430, an ASIC brownout can be detected, as described herein, and the sensor can transition to the brownout handling procedure 1400. If, during the measurement lifecycle 430, the sensor 110 determines that the active mode is not the measurement mode, the sensor 110 determines that it has entered the measurement lifecycle 430 due to an unexpected error and transitions to the error termination state 650. If the communication module 140 determines a mismatch in the ASIC registers and measurement configuration information, at 1109, the communication module 140 initiates a measurement error handling procedure, such as the measurement error handling procedure described herein with respect to FIGS. 16A-16B. If the current measurement, prior to initiating a measurement sequence as described below, is not set to 0, the communication module 1110 activates an outlier filter mode. The ASIC hardware abstraction layer 200 writes the outlier command to the ASIC digital section 310 at 1112 which causes ASIC 130 to enable an outlier filter at 1112.

At 1113, the ASIC measurement sequence is initiated by the communication module 140 issuing a "start measurement" command while in measurement mode. At 1114, the ASIC hardware abstraction layer 200, writes the start measurement command to ASIC digital section 310, which in turn instructs the ASIC 130, at 1115, to start the measurement process. During the measurement process, the ASIC 130 at 1116 sets a measurement status flag to "busy" within the ASIC 130. Thus, if the ASIC 130 receives another "start measurement" command while a measurement sequence is in progress, the ASIC 130 ignores the new command. The ASIC 130 performs measurements through the AFE 139 (e.g., temperature measurements, sensor current measurements, counter potential measurements). For example and as embodied herein, the measurement sequence can follow a set pattern of measurements progressing from one type of measurement to another in response to each received "start measurement" command. For example, a patient skin temperature measurement can precede a sensor current measurement, which can precede a counter potential measurement. Measurements can be performed in any suitable order and can be configured to facilitate efficient processing of results data. As embodied herein, the ASIC measurement sequencer can have configurable fields for determining the sample rate and number of samples per measurement. As an example, the sample frequency can be set to one of various frequencies from about 8 Hz to about 703 Hz, with a preferable combination at 16 Hz. Similarly, the number of samples per measurement can be set to one of various amount from about 1 sample per measurement to about 10000 samples per measurement or more, with a preferable amount of about 512 samples per measurement. For example and without limitation, these fields can be configured at manufacture, or can be updated before use by a particular patient or while in use, e.g., by the patient or a medical professional. The configuration settings used can determine the time needed to perform a successful measurement, the resolution of the data retrieved, or the number of discrete samples collected. After measurements are completed, the measurement data is stable and the measurement status flag is set to "idle," allowing for additional "start measurement" commands to be received. As described herein, the communication module 140, rather than the ASIC 130, can process the results data based on collected measurement.

Figure 12:
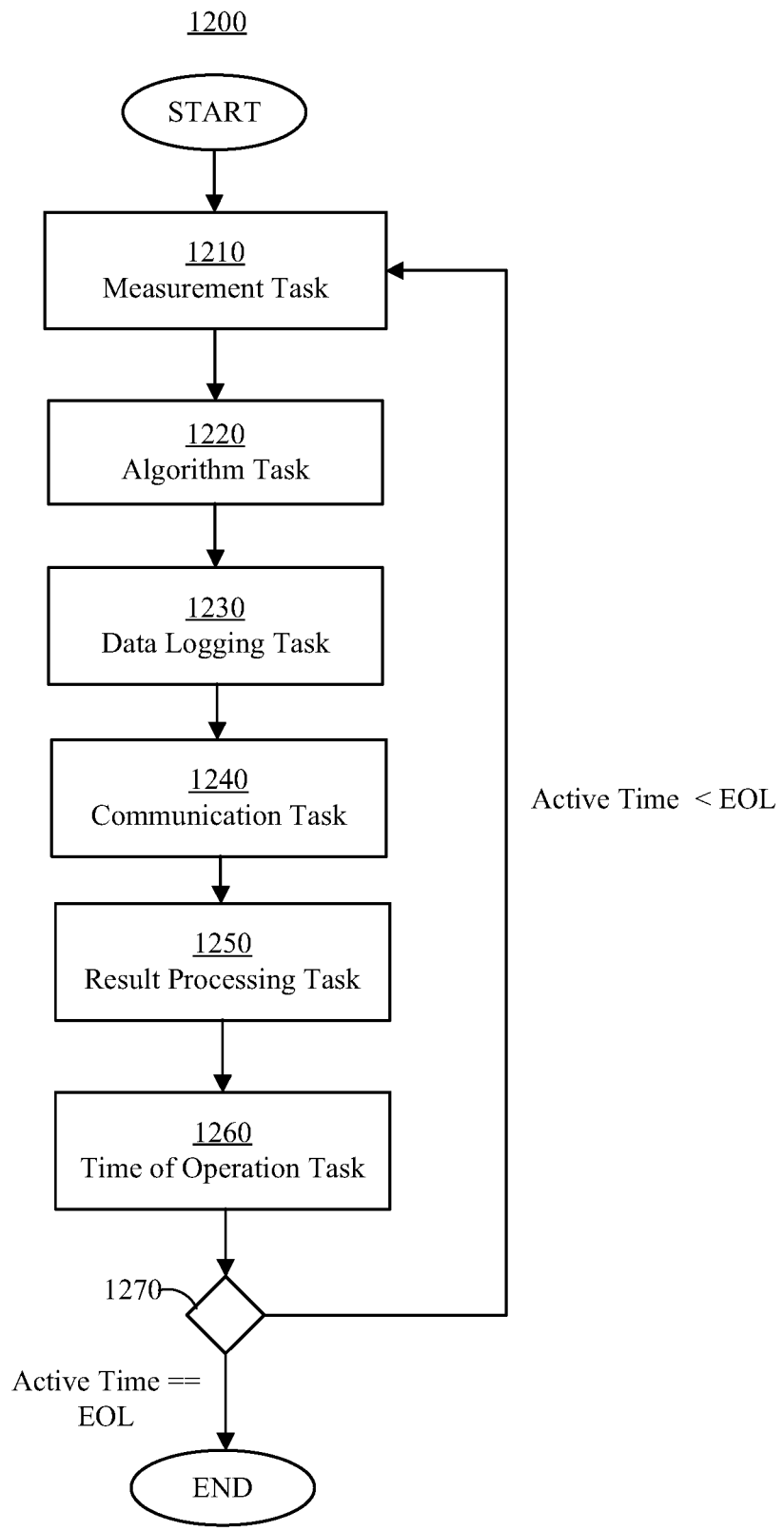
FIG. 12 is a diagram illustrating example states of a lifecycle of an example task of the sensor.

For purpose of illustration and not limitation, reference is made to an exemplary embodiment of a procedure 1200 for measurement, calculation, and transmission of a single measurement for use with the disclosed subject matter as shown in FIG. 12. As embodied herein, each activity task can be performed one at a time, without overlap, and in a predefined sequence. Alternatively, activity tasks described herein can be performed in parallel or at least partially in parallel, if appropriate. The measurement cycle 1200 begins with the sensor 110 transitioning into a measurement task 1210, such as the measurement lifecycle 430. After the measurement task 1210, the sensor 110 performs an algorithm task 1220, such as analyzing the raw measurement data reported by the sensor 110 and using appropriate algorithms to calculate data relevant to the type of medical hardware 155 (e.g., calculating blood glucose levels). After the algorithm task 1220, the sensor 110 performs a data logging task 1230, such as storing the results of the algorithm task in an appropriate log to be retrieved and communicated. After the data logging task 1230, the sensor 110 performs a communication task 1240, such as communicating one or more of the results of the algorithm task to a receiver 120 or other device. As embodied herein, ASIC 130 can assume the communication module 140 can always respond to commands in time. ASIC 130 therefore assembles payload data with whatever content is available. However, in some cases the receiver 120 can lock up when a payload is received from the ASIC 130 before the receiver 120 has time to prepare a response to a previous command. As such, as embodied herein, the ASIC 130 can be prevented from sending any response if the communication module 140 cannot provide the response in time. In this manner, the receiver 140 can resend the command and avoid a lock up.

After the communication task 1240, the sensor 110 performs a result processing task 1250, such as storing the results and measurements to longer-term storage, integrating the results into trend calculations, etc. After the result processing task 1250, the sensor 110 performs a time of operation task 1260, such as increment the internally managed time of operation variable which is used to track the number of measurements made by the sensor and the amount of time the sensor 110 has been in use. For example, the sensor 110 can be configured to only perform a threshold number of measurements and measurement cycles, as the chemical processes used to measure, for example, a patient's blood glucose level, can only be stable and accurate for a certain number of measurement or amount of time. At 1270, the sensor 110 can determine if the time of operation is lower than the end-of-life (EOL) threshold. If so, the sensor 110 can return to the measurement task 1210. After the sensor 110 has completed one sequence, the sensor 110 can wait for a predefined time interval to perform the sequence 1200 again. If, however, the time of operation variable is at or has exceeded the EOL threshold, the measurement procedure 1200 can terminate.

According to other aspects of the disclosed subject matter, components and techniques for handling various error conditions that can occur during operation of the sensor 110 are described herein. Error handling techniques can include, for example and without limitation, interrupt request (IRQ) handling, brownout recovery, measurement status error handling and hardware DQ's, measurement results error handling, and application error handling.

Figure 13:
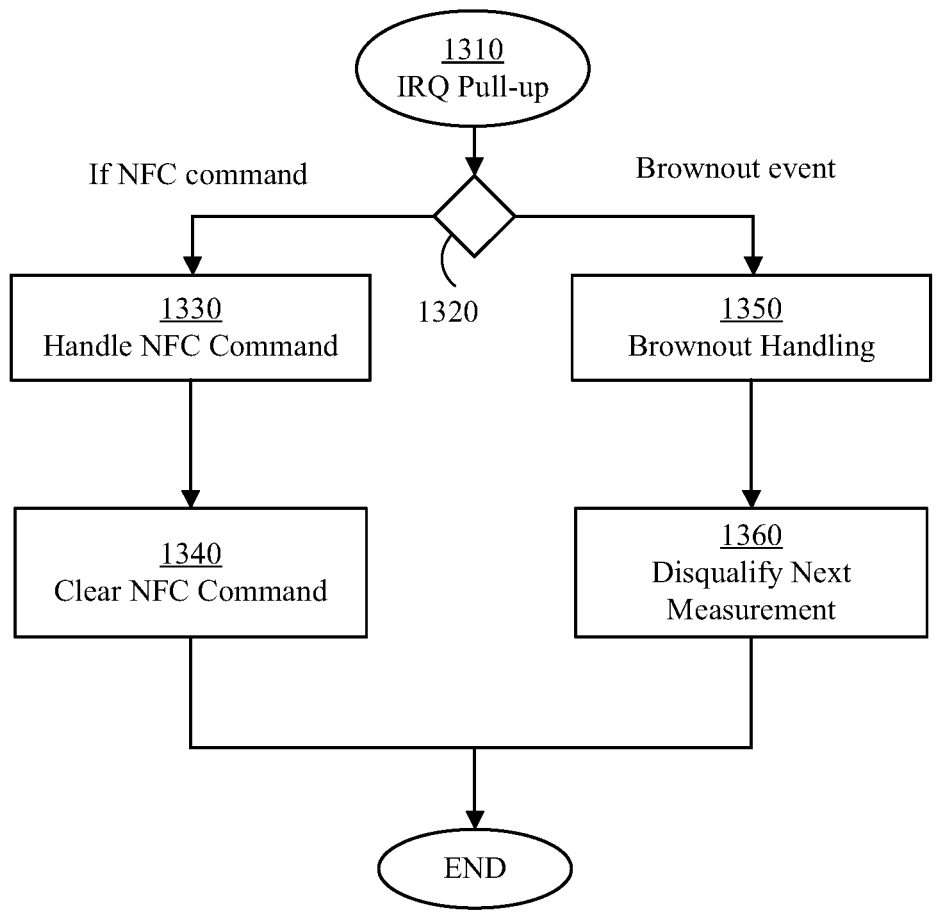
FIG. 13 is a diagram illustrating example functionality of a component of the sensor upon receiving an interrupt request according to exemplary embodiments of the disclosed subject matter.

For purpose of illustration and not limitation, reference is made to the exemplary embodiment of IRQ handling 1300 for use with the disclosed subject matter as shown in FIG. 13. For example and without limitation, IRQ handling 1300 can involve handling an ASIC brownout and incoming NFC command. At 1310, the IRQ handler is invoked upon receipt of an interrupt request. The interrupt request can be prompted, for example, in response to presence of an NFC command, brownout reset, brownout recovery, and power supply monitor conditions, as described herein (see, e.g., FIGS. 14-16B). As embodied herein, the flags for the power supply being low or returning high again and NFC command can be masked by a mask register, thus the IRQ line will not be raised by the masked diagnostic and corresponding IRQ status registers won't be set. Additionally or alternatively, masking the interrupt triggers can also prevent the IRQ line from being pulled high while allowing their corresponding IRQ status registers to be set.

At 1320, the sensor 110 evaluates signals sent through the IRQ pull-up. For example, the IRQ pull-up can evaluate certain registers and determine whether flags for communication errors and indication of a brownout event. If there is a brownout event, at 1350, the brownout handling procedure, described herein, is invoked. After 1350, at 1360, the next measurement is disqualified. The IRQ handling method 1300 then terminates. If at 1320, the registers indicate that an NFC command has been initiated (e.g., if an NFC field has been brought into communicative range of the ASIC 130), at 1330, the procedure to handle NFC commands, described herein, is invoked. After the NFC command is handled, at 1340, the pending NFC command register is cleared. IRQ handling 1300 then terminates.

A drop in battery voltage below a specified reset threshold can cause the ASIC 140 to assert the IRQ, causing IRQ handling 1300 to be initiated. In this state, the ASIC 130 is in reset and will not respond to commands. A brownout is defined as a short interruption in the battery supply voltage, $V_{BAT}$. The duration of the brownout is defined as the time between $V_{BAT}$ going below the reset threshold and $V_{BAT}$ returning above the release threshold. The brownout duration that the ASIC 140 is able to recover from can vary based at least in part on the lowest level of $V_{BAT}$ experienced during the brownout event.

Figure 14:
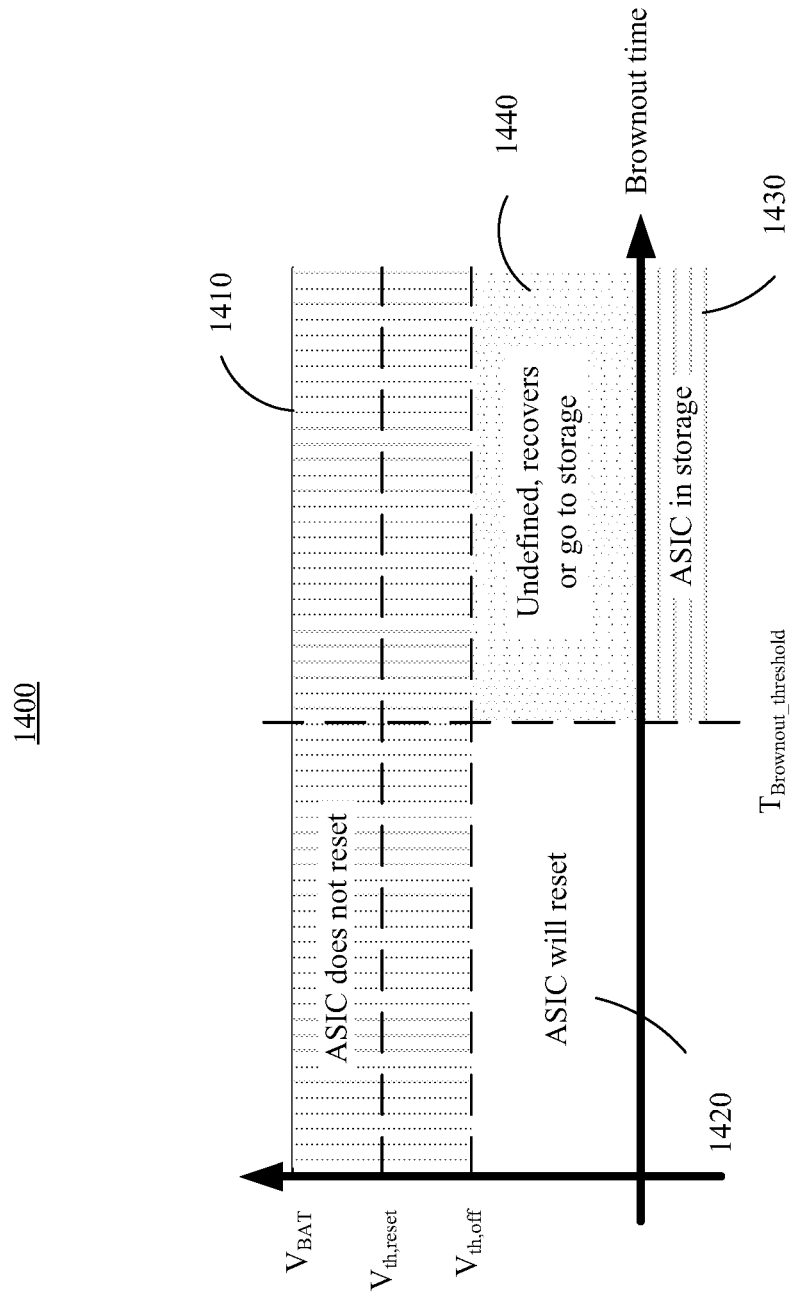
FIG. 14 is a chart illustrating low-power detection and responses according to exemplary embodiments of the disclosed subject matter.

For purpose of illustration only, exemplary techniques for brownout recovery are illustrated and described with reference to the chart shown in FIG. 14. The chart 1400 illustrates a chart having two axes, a vertical axis, marked $V_{BAT}$ corresponds to the battery supply voltage received by the ASIC 130, and a horizontal axis, marked brownout time corresponds to the amount of time elapsed. The $V_{BAT}$ axis includes a plurality of demarcated points. A first point, $V_{th,off}$, corresponds to a defined threshold for determining whether a drop in battery supply voltage is a significant drop. For example, the threshold can be defined as a percentage of the nominal supply voltage (e.g., 40%, 50%, 60%, etc.). A second point on the axis, $V_{th,reset}$, corresponds to a defined threshold for determining whether a sufficient amount of the battery supply voltage has returned to allow for a brownout recovery in certain instances. Along the brownout time axis, a single point is marked, $T_{brownout\_threshold}$, corresponding to the amount of time for the ASIC 130 to experience a brownout before the risk of recovery is greater than a predetermined tolerance. The relationship of these thresholds on the axes creates a number of zones, 1410, 1420, 1430, and 1440 that define the potential behavior of the ASIC 130 in response to the brownout. Zone 1410 corresponds to normal operations, where the battery supply voltage can fluctuate, but does not drop below $V_{th,off}$. In the zone of operation 1410, the AISC will recover from a brownout event independent of the brownout duration. Zone 1420 corresponds to the battery supply voltage dropping below $V_{th,off}$ for a duration less than the $T_{brownout\_threshold}$. In the zone of operation 1420, the ASIC will recover as described herein. Zone 1430, for clarity, corresponds to instances in which the ASIC 130 is already in storage mode 710, which reduces the draw on the battery supply voltage level until a wake command is received. Finally, zone 1440 corresponds to the battery supply voltage level dropping below $V_{th,off}$ for a duration greater than the $T_{brownout\_threshold}$. Zone 1440 can be considered an undefined environment, where the ASIC 130 can recover or cannot, in which case, the ASIC 130 goes into a forced storage mode to protect measurement data.

For purpose of illustration and not limitation, reference is made to the exemplary embodiment of a procedure for the brownout handling 1350 for use with the disclosed subject matter as shown in FIGS. 15A-B. Brownout handling 1350 can be used, for purpose of illustration and not limitation, to handle brownouts that can occur while the communication module 140 is in a sleep mode. At 1501, the ASIC 130 indicates to the communication module 140 that an IRQ has been received and must be handled. For example the ASIC 130 can set a value on a designated register of the ASIC 130, which is read by the communication module 140. At 1502, if needed, the ASIC 130 also sends a wake command to the communication module 140. At 1503, the communication module 140 reads the IRQ status from the appropriate registers of the ASIC 130. At 1504, the ASIC 130 sends the IRQ status data to the communication module. If the IRQ status indicates that the IRQ is the result of a communication error (e.g., not a brownout event), at 1505, the communication module 140 initiates a timer associated with a threshold recovery time. The threshold recovery time (e.g., 10 ms+/−2 ms) can be selected and used to avoid unnecessarily causing error termination. If the ASIC 130 fails to recover in the threshold amount of time, the sensor 110 proceeds to the error termination state 650. If the ASIC 130 recovers in the threshold amount of time, at 1506, the ASIC modifies the IRQ to indicate that it has recovered. The ASIC 130, at 1507, triggers a connection request with the communication module and, at 1508, again modifies the IRQ. The ASIC 130 then proceeds to perform the activation sequence 730 described herein to refresh itself. At 1509, the communication module reads the IRQ status from the appropriate registers of the ASIC 130. At 1510, the ASIC 130 sends the IRQ status data to the communication module 140. At 1511, the communication module 140 clears the brownout flag, which can have been set during the activation sequence or prior to the IRQ being received by the ASIC 130. At 1512, the ASIC 130 resets the IRQ. The sensor 110 then causes the ASIC 130 to be re-initialized so that the sensor 130 can fully recover.

Referring now to FIG. 15B, if, after 1504, the communication module 140 determines that the IRQ was the result of a brownout event, the ASIC 130 is set to state 730 where it performs the activation sequence. Then, at 1513, the communication module clears the flag corresponding to the brownout event. In response, at 1514, the ASIC 130 modifies the IRQ register to indicate that the flag has been cleared. Then, the sensor 130 causes the ASIC 130 to be re-initialized so that the ASIC 130 can recover. The ASIC 130 is then set to the measurement mode state 760.

In addition or as an alternative to interrupt requests, the sensor 110 can be configured to handle diagnostics and measurement errors during operation. Diagnostics can be organized in three categories. Runtime diagnostics occur throughout the operating period and include cyclic testing done for each measurement cycle. For example and without limitation, runtime diagnostics can include real-time monitoring of the power supply. Startup diagnostics can occur relatively infrequently, for example when the sensor 110 is activated or shortly after activation. Manufacturing diagnostics, conducted during manufacturing, can confirm, for example and without limitation, that the sensor 110 is built correctly, does not have failed or missing components, and/or is calibrated according to set threshold ranges.

Runtime diagnostics include measurement diagnostics. In embodiments described herein, if a runtime diagnostic fails, the corresponding data associated with a diagnostic failure is marked with a data quality error code and can be set aside and not used for calculations. As examples only, data quality error codes can be assigned to represent, for example and without limitation: if the ASIC 130 detects a low battery supply voltage during measurement; if the measurement is above or below an outlier threshold; if an NFC field is detected while in measurement mode; if a brownout is detected during measurement; if ASIC 130 registers or measurement configuration values mismatch; if a voltage associated with the medical hardware 155 is outside of normal operating ranges; if an insertion failure is detected; and for other related occurrences. Responses to detecting an data quality error code can include rejecting current measurement data, rejecting measurement data for one or more future measurement cycles, or rejecting measurement data until the data quality error code is affirmatively removed by the sensor 130.

Runtime diagnostics further include additional runtime diagnostics associated with the ASIC 130, some of which are referenced in the discussion above. These runtime diagnostics include the detection of an NFC field while the ASIC 130 is in the measurement mode state 760. The detection of an NFC field sets a flag for use by the sensor 110 which can be cleared at the start of a new measurement. The ASIC 130 further includes a power supply monitor 137 that monitors voltage levels along various connections with between the battery 150 and the ASIC 130. These connections include the power supplied via an NFC RF field, the standard supply from the battery 150, and the inverting charge pump supply. The power supply monitor 137 can set a flag indicating the drop in power and a return to the power, which can include asserting an interrupt request. The ASIC 130 can include an external thermistor to act as a temperature monitor to determine if the current temperature is outside of the operating temperature range of the ASIC 130. If the temperature is outside of the target range, a flag can be set to potentially cause the ASIC 130 to cease operation to preserve the ASIC 130 and battery 150.

Additionally or alternatively, diagnostics can be derived based on the analog front end 139 of the ASIC 130 monitoring the current and voltage read from various electrodes of the medical hardware 155 (e.g., an analyte sensor). FIG.

Figure 23:
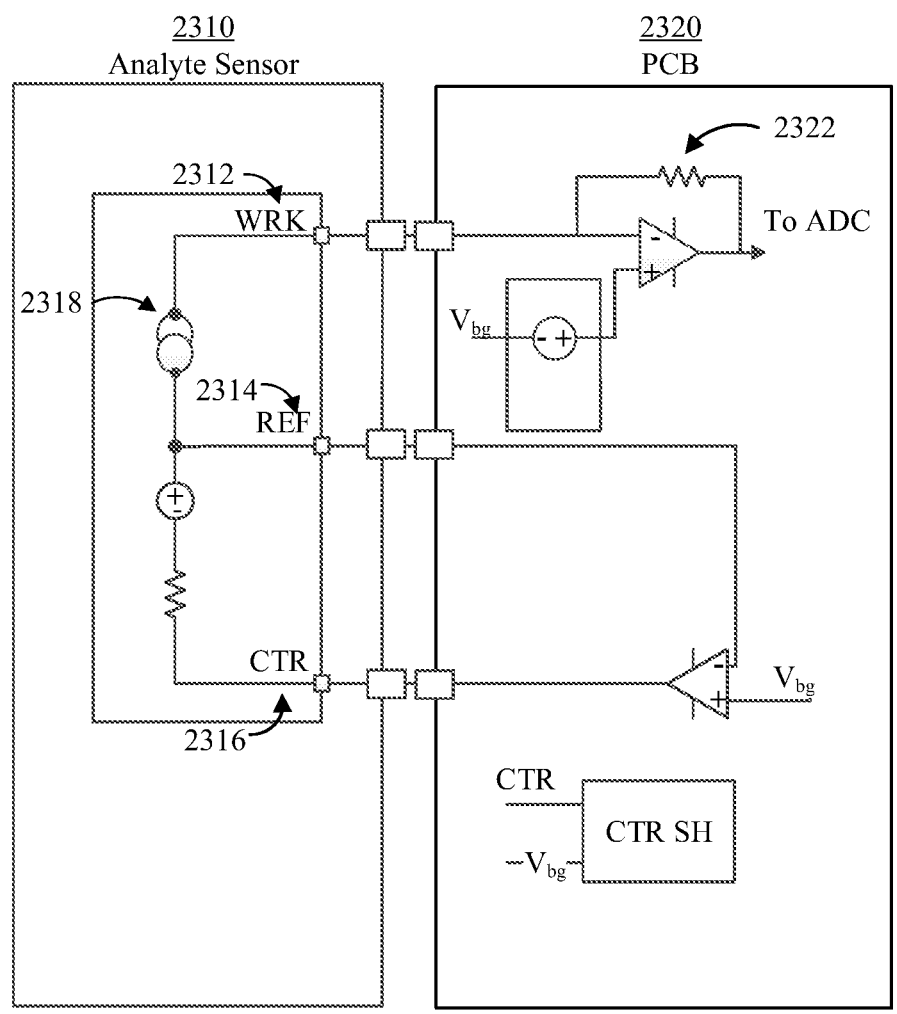
FIG. 23 is a diagram illustrating example functionality of an analog front end of the sensor according to exemplary embodiments of the disclosed subject matter.
Figure 26:
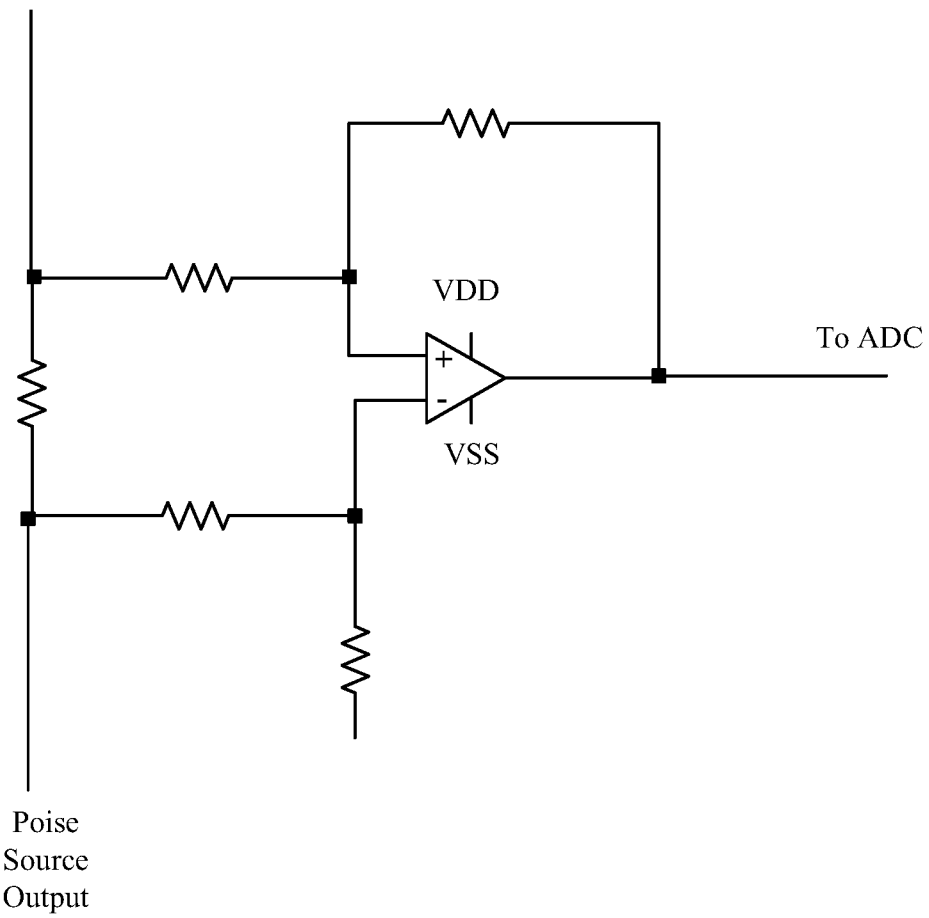
FIG. 26 is a diagram of an example circuit for reading values for an analyte sensor.

23 illustrates an example diagram 2300 of the analog front end 139 illustrating functions for the analog front end 139 between the analyte sensor 2310 and the PCB 2320 of the sensor 110. As embodied herein, FIG. 23 illustrates the working electrode 2312, reference electrode 2314, and counter electrode 2316, with the analyte sensing element 2318 between the working electrode 2312 and reference electrode 2314. The counter electrode is driven with a bandgap reference voltage $V_{bg}$ by the analog front end 139 which is then adjusted before being provided to the reference electrode 2314. The analyte sensing element 2318 provides additional voltage to the working electrode 2312. The difference between the voltage at the working electrode 2312 and the voltage at the reference electrode 2314, referred to as the poise voltage, is used to determine the amount of analyte present. The voltage at the reference electrode 2314 is also monitored. Between each of the working electrode 2312, reference electrode 2314, and counter electrode 2316 can be one or more additional sources of resistance (not illustrated) such as the resistance of the trace that connects the sensor electrodes to the connection point with the sensor connector and the resistance from the PCB connector to the electronics. The PCB can include a transimpedance amplifier 2322 which can include a programmable offset from the bandgap reference voltage $V_{bg}$. The transimpedance amplifier can convert the current signal from the working electrode into voltage at output, however, the common mode voltage (e.g., WRK) must be removed to determine the true measurement. In alternative embodiments, a difference amplifier 2600, such as that illustrated in FIG. 26 can be used. Note that with the difference amplifier 2600 there must be precise matching between the resistors for it to function.

Figure 25:
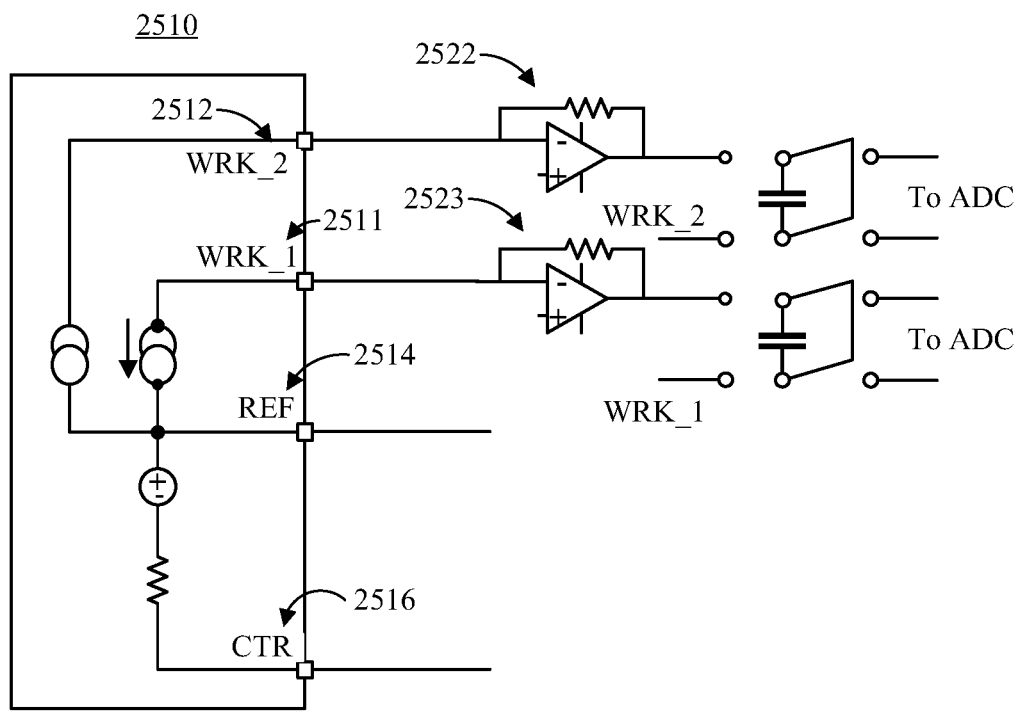
FIG. 25 is a diagram of an example circuit for reading values for an analyte sensor.

In an alternative embodiment, the sensor 110 can include multiple working electrodes. FIG. 25 illustrates an example of a configuration of the sensor 110. As embodied herein, FIG. 25 illustrates an example circuit 2500 including an analyte sensor 2510 with a first working electrode current 2511 (WRK_1) and a second working electrode current (2512 (WRK_2). The analyte sensor 2510 further includes a reference electrode 2514 (REF) and counter electrode 2516 (CTR) similarly situated as in the analyte sensor 2310. The current from each of the working electrodes can be fed to a transimpedance amplifier 2522 and 2523, as illustrated in FIG. 23. Each transimpedance amplifier can include an independently programmable offset from the bandgap reference voltage $V_{bg}$. The transimpedance amplifiers can convert the current signal from the working electrode into voltage at output. In alternative embodiments, a difference amplifier, such as at illustrated in FIG. 26 can be used, however, the common mode voltage (e.g., WRK) must be removed to determine the true measurement. In alternative embodiments, one or more difference amplifiers, such as the difference amplifier 2600 illustrated in FIG. 26 can be used.

As embodied herein, the analog front end 139 can be configured to monitor the current and voltage from at least the working electrode (e.g., working electrode 2312) and counter electrode (e.g., counter electrode 2316). The analog front end 139 can monitor for a low working current. The analog front end 139 or ASIC 130 can be configured with a minimum working current threshold required for the sensor 110 to continue to operate after an analyte sensor has been inserted into a patient. Additionally, the analog front end 139 can particularly monitor for a low working current for a predefined period of time after user insertion of the sensor. In addition to monitoring the working current for the minimum working current threshold, the analog front end 139 and ASIC 130 can monitor for working current values within a threshold range of a target working current value. The analog front end 139 can further monitor for a high working current. The analog front end 139 or ASIC 130 can be configured with a maximum working current threshold that corresponds to a value below analyte sensor saturation, the point at which sensor values cannot be taken as accurate. The analog front end 139 can further monitor for a low counter electrode voltage. In particular, the analyte sensor voltage between the working electrode and counter electrode can be maintained by a servo amplifier that adjusts the voltage at the counter electrode, for example, in response to negative feedback from a reference electrode. As the conditions of the analyte sensor change, the counter electrode voltage automatically adjusts to maintain the reference voltage at a predetermined amount, which can be used to maintain the target poise voltage within a suitable range. The analog front end 139 or ASIC 130 can be configured with a minimum counter voltage threshold required for the analyte sensor to continue to operate properly. The analog front end 139 can further monitor for a high counter electrode voltage. In particular, because the analyte sensor works in part by measuring voltage differences between the working electrode and counter electrode, for the analyte sensor to function properly, the voltage from the counter electrode can be no higher than the working electrode. The analog front end 139 or ASIC 130 can be configured with an appropriate maximum counter voltage threshold. These analog front end diagnostic checks can be used to assess analyte sensor failure modes, including sensor connection problems.

The poise voltage can be maintained using a hardware-enforced or programmable poise voltage source. The purpose of the programmable poise voltage source is to bias the difference between the voltage at working electrodes and reference electrodes to ensure that the measurement range is within a target range that is suitable for analyte measurement. To change the poise voltage with a hardware-enforced poise voltage source, the resistor networks that set the poise voltage had to be recalculated to the new intended poise voltage and change. As such, to change the poise voltage, the board is disassembled and the resistors swapped out for new values, which can be inconvenient, for example if resistors having suitable values are unavailable. A programmable poise voltage thus allows for the sensitivity analyte sensor to be adjusted according to developing conditions over the lifespan of the analyte sensor. For example, the circuit which generates the poise voltage can be controlled by a microprocessor which can set the poise voltage by outputting the necessary voltage via the DAC pin of the microprocessor. This allows for fast and automated calibration of the poise voltage. DAC settings can be optimized with software routines and stored for later usage.

Figure 27:
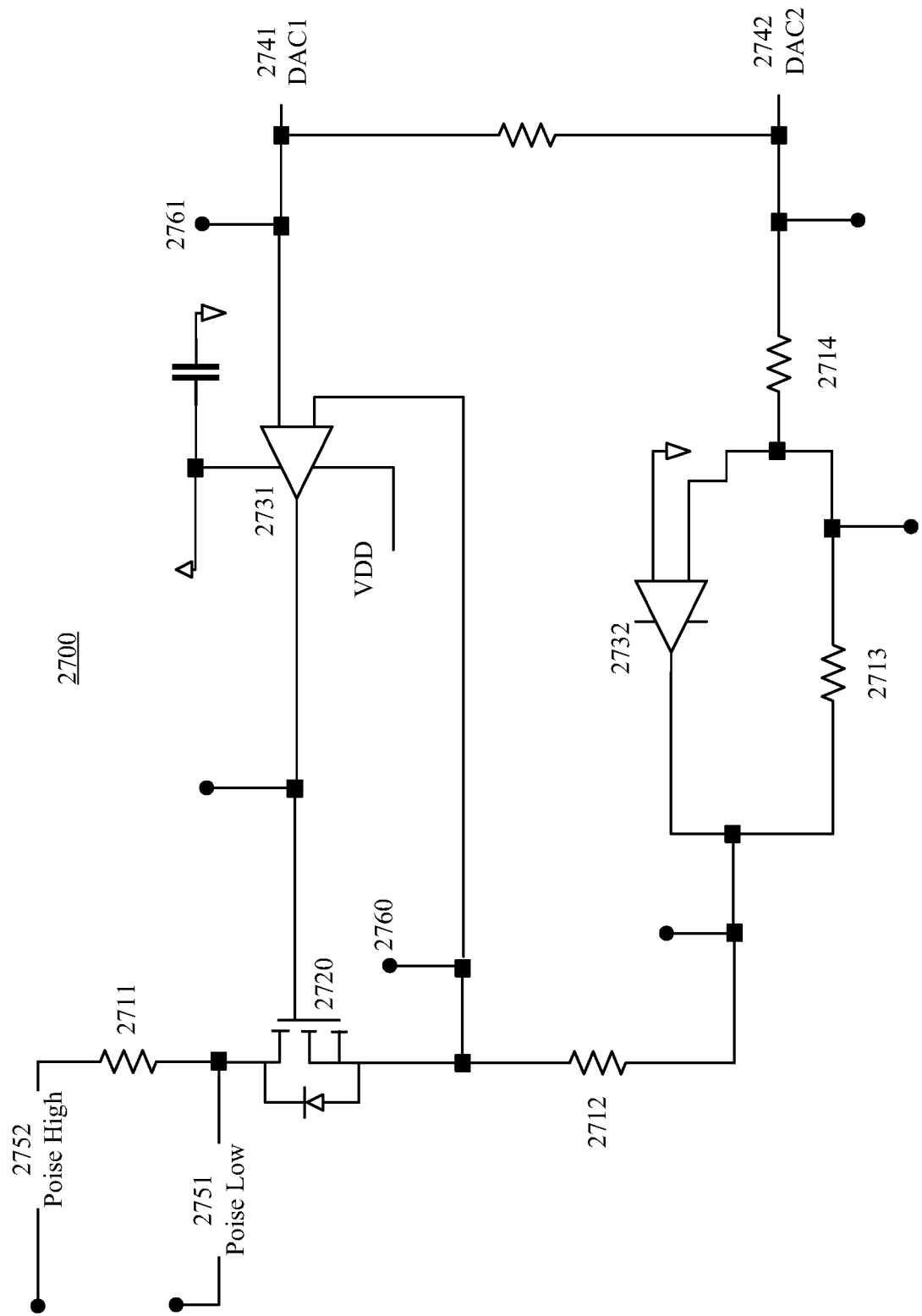
FIG. 27 is a diagram of an example circuit for a variable floating poise voltage generator.
Figure 28:
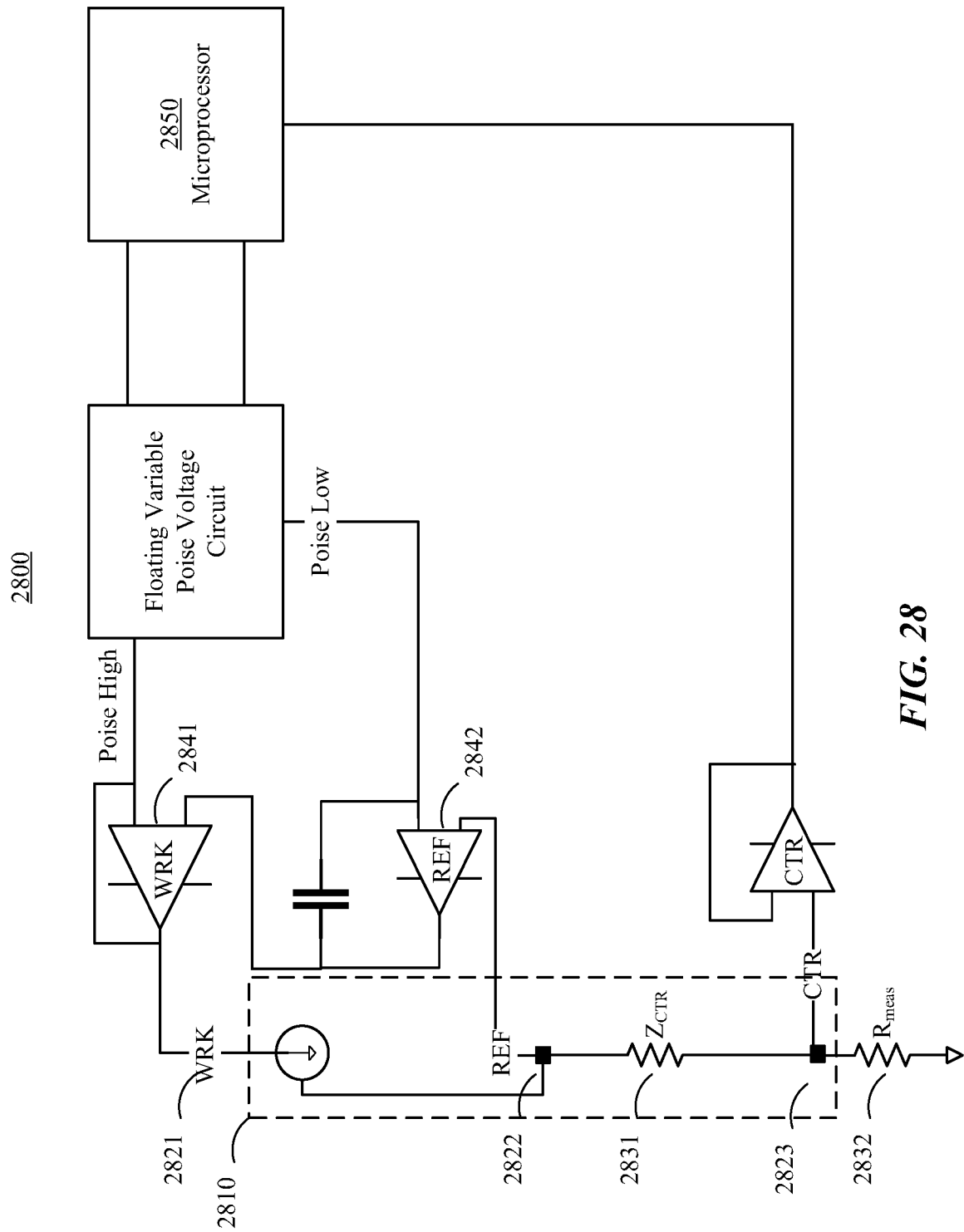
FIG. 28 is a diagram of an example circuit with a sensor with a floating variable poise voltage circuit in a measurement configuration.

FIG. 27 illustrates an example circuit that can used as a variable floating poise voltage generator. The circuit 2700 as shown in FIG. 27 uses four resistors 2711, 2712, 2713, and 2714, an N-channel MOSFET 2720, and two op-amps 2731 and 2732, one acting as a current source 2731 and the other acting as an inverting amplifier 2732. The poise voltage is set with the DAC1 2741 and DAC2 2742 pins from the microprocessor. Op-amp 2732 will invert the voltage from DAC2 2742 into a voltage equal to the negative of DAC2 2742. Op-amp 2731 is configured as a current source that is programmed with the positive input of the op-amp. The difference between "poise high" 2751 and "poise low" 2752 is the poise voltage and is controlled by the current flowing through resistor 2711 (as illustrated in FIG. 28). The voltage at "Poise High" 2752 is driven by an amplifier shown in FIG. 28 that also controls the voltage at the working electrode of the sensor. The op-amp 2731 and MOSFET 2720 will control the voltage at 2760 so that it is equal to the voltage at 2761. The voltage across resistor 2712 is controlled by the settings for DAC1 2711 and DAC2 2712. The current flowing through resistor 2712 is the same as the current flowing through resistor 2711. In this way the poise voltage can be controlled independent of the voltage at WRK. With this circuit, if the voltage at WRK is required to change due to change in sensor current the poise voltage will remain unchanged even as the voltage at WRK changes.

FIG. 28 illustrates an example configuration of a sensor in a measurement configuration with a floating variable poise voltage circuit (e.g., the circuit 2700). The poise voltage is measured from the WRK electrode and the REF electrode and will be equal to the voltage measured from Poise High and Poise Low. The analyte sensor 2710 is a sensor, as described herein, with chemistry to react to the analyte sensor during use.

Figure 29:
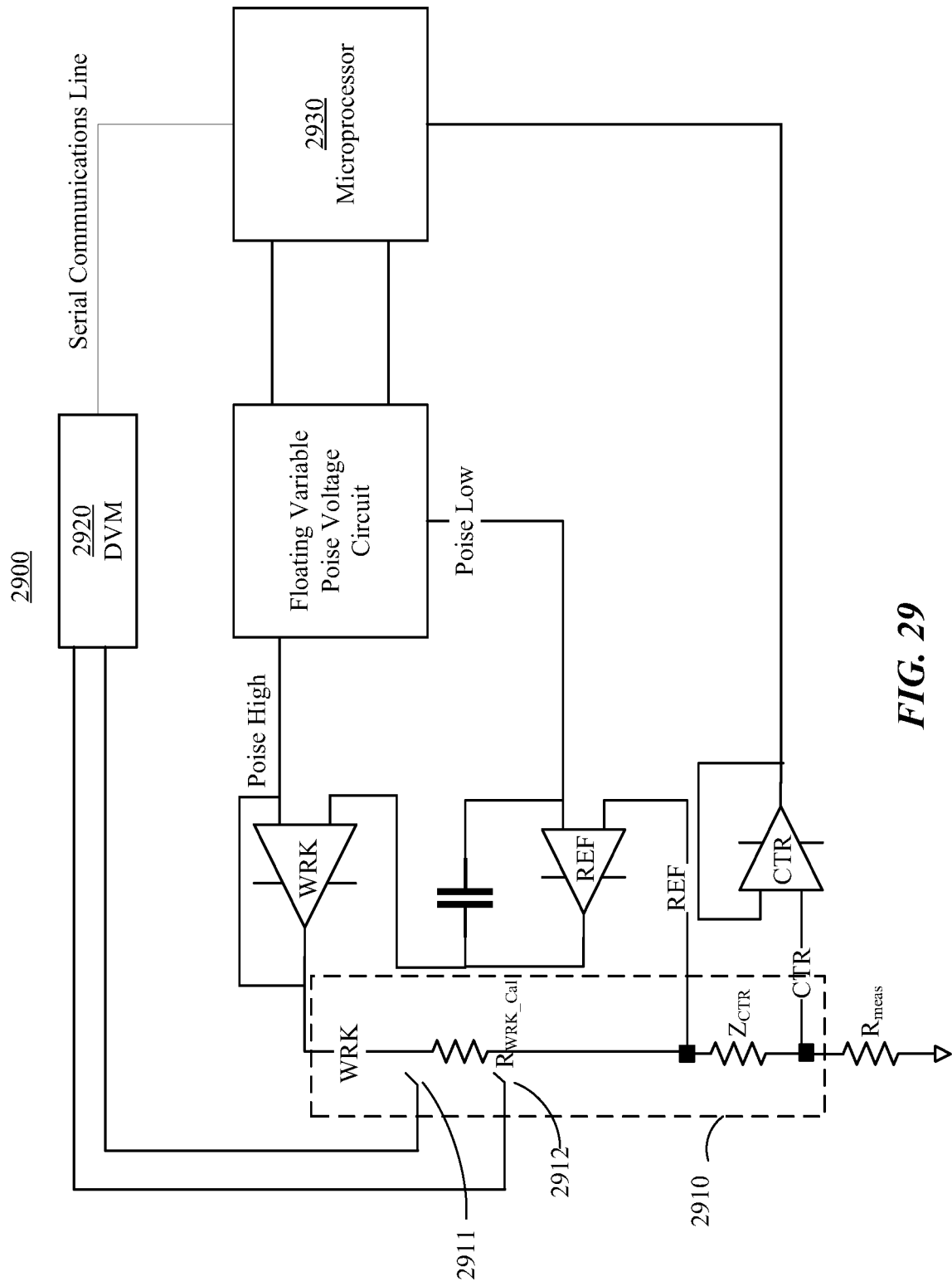
FIG. 29 is a diagram of an example circuit with a sensor with a floating variable poise voltage circuit in a calibration configuration.

FIG. 29 illustrates an example configuration 2900 of a sensor in a calibration configuration with a floating variable poise voltage circuit (e.g., the circuit 2700). During calibration a simulated analyte sensor 2910 can be used with two resists 2911 and 2912 as shown in FIG. 29. A digital voltmeter (DVM) 2920 will measure the voltage between WRK and REF and feed back the measurement to the microprocessor 2930 to adjust DAC1 and DAC2 and get the poise voltage to the desired value. In the sensor measurement configuration, the poise voltage will have previously been set during calibration and the WRK op-amp will provide the current across resistor 2711 of FIG. 27.

When an analyte sensor 2810 is attached to the circuit 2800 in FIG. 28, the sensor portion connected between the WRK 2821 and REF 2821 will generate a current when it comes in contact with the analyte. The variable poise voltage can allow the sensor to detect a variety of analyte, by adjusting the reactive current in both positive and negative domains. The current will flow down through $Z_{CTR}$ 2831 and $R_{meas}$ 2832. The voltage at the CTR electrode 2823 will vary depending on the current generated by the analyte sensor 2810 and therefore the voltage at the REF electrode 2822 will vary according to the current going through $R_{meas}$ 2832 and $Z_{CTR}$ 2831. It is for this reason that a floating poise voltage is needed. The feedback loop of the REF op-amp 2842 includes the WRK op-amp 2842 and resistor 2711. The voltage output of the REF op-amp 2842 goes to the positive terminal of the WRK op-amp 2841 which will cause the output to adjust the negative terminal of the WRK op-amp 2841 to match the positive terminal, the feedback loop of the REF op-amp 2842 continues through resistor 2711, which will have voltage equal to the digitally set poise voltage. It is due to this feedback loop that the voltage at the REF electrode 2822 and WRK electrode 2821 will differ by the voltage across resistor 2711, which is the poise voltage set and calibrated by the microprocessor 2850.

Figure 30:
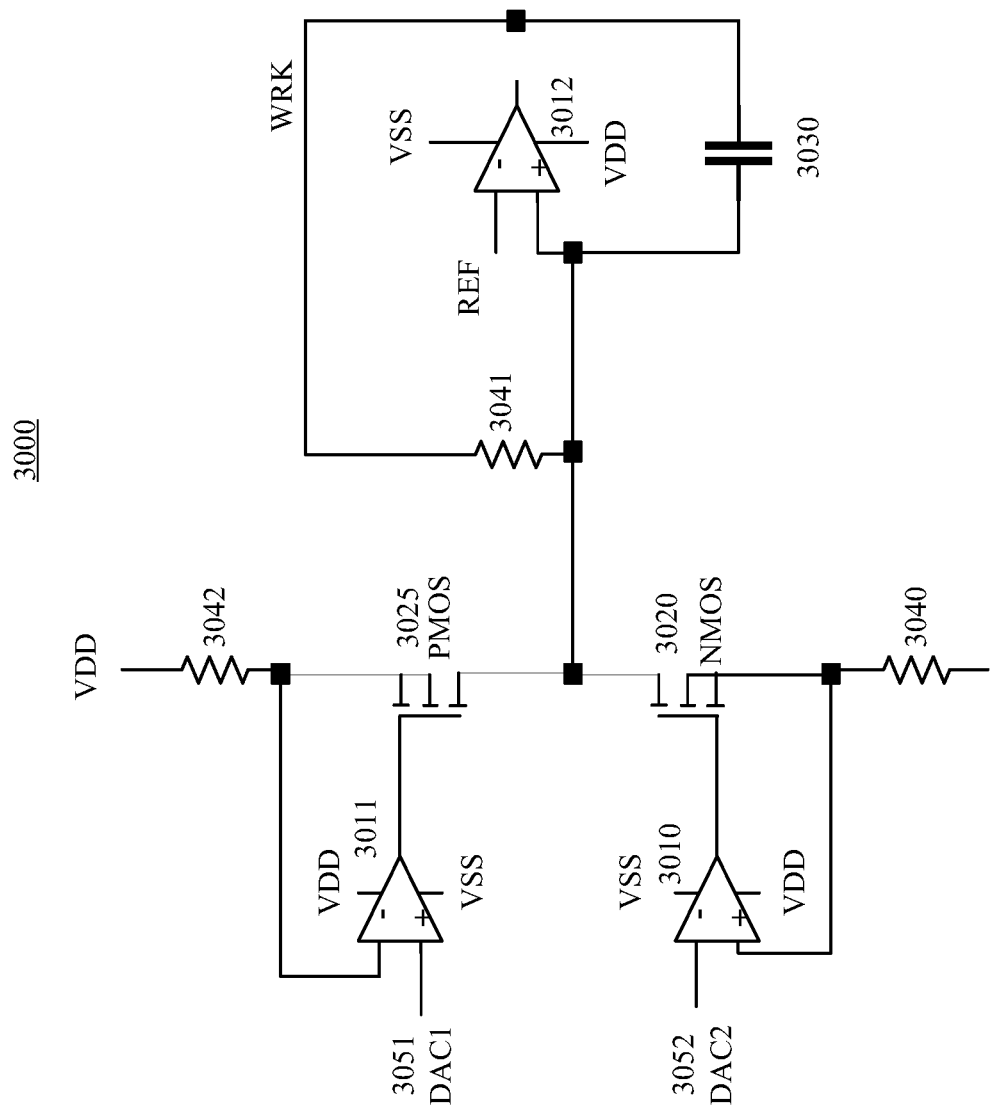
FIG. 30 is a diagram of an example circuit for a variable floating poise voltage generator.

FIG. 30 illustrates an alternative configuration of the floating variable poise voltage circuit 3000. The circuit includes three single-supply operational amplifiers or op-amps 3010, 3011, and 3012, one NMOS transistor 3020, one PMOS transistor 3025, one capacitor 3030, and three resistors 3040, 3041, and 3042. Note that the label WRK, as is used throughout this disclosure and the accompanying drawings, refers to the location with the working terminal is located. The label REF is where the reference terminal connects. DAC1 3051 and DAC2 3052 denote two DAC outputs from either a microcontroller or standalone DAC components. For the sensor to work properly, it is important that no current flows through the REF terminal. Therefore, connecting REF to the non-inverting input of op-amp 3011 ensures a high impedance node at that terminal. In steady state operation, op-amp 3012's inverting input will match the voltage at REF. As a result, the voltage across resistor 3041 becomes the poise voltage. The circuit configuration of op-amp 3012, resistor 3041 and capacitor 3030 is also known as a transimpedance amplifier, which converts current into voltage. A bidirectional current source, which includes op-amp 3010, op-amp 3011, NMOS transistor 3020, PMOS transistor 3025, resistor 3040, and resistor 3042 generates a current that is determined by the values at DAC1 3051 and DAC2 3052. When this current flows through resistor 3041, the poise voltage is formed between WRK and REF. In other words, the poise voltage is linearly proportional to the current generated by the bidirectional current source. To generate a positive poise voltage DAC1 3051 will be set to VDD (e.g., 3V) to turn off PMOS transistor 3025. Op-amp 3010 will drive NMOS transistor 3020 to generate an average current equivalent to about the value at DAC2 3052 divided by the value at resistor 3040. The same current flows through the resistor 3041 and thus the poise voltage is equal to the value at DAC2 3052 divided by the product of the value at resistor 3041 and 3040. On the other hand, if a negative poise voltage is desired, the DAC2 3052 is set to 0V so NMOS transistor 3020 will be turned off. The current generated in this case is equal to VDD minus the value at DAC1 3051 divided by the value at resistor 3042. This time, the generated current will flow through resistor 3041 in the opposite direction, and thus produce a negative poise voltage. Now, the REF voltage is higher than WRK voltage.

FIGS. 31-34 illustrate various alternative configurations of the floating variable poise voltage circuit. The circuit 3100 illustrated in FIG. 31 includes a four single-supply op-amps 3110, 3111, 3112, and 3113, four resistors 3120, 3121, 3122, and 3123, two capacitors 3130 and 3131, and two transistors 3140 and 3141. Op-amp 3110, resistor 3120, and capacitor 3130 are configured in a first transimpedance amplifier, while op-amp 3111, resistor 3121, and capacitor 3131 are configured in a second transimpedance amplifier. This configuration ensures minimal leakage at the REF terminal due to the high impedance. Resistors 3122 and 3123 can be either a programmable DAC source, as discussed herein, or can be external resistors. Note that this configuration can generate only a poise voltage with positive polarity.

Figure 32:
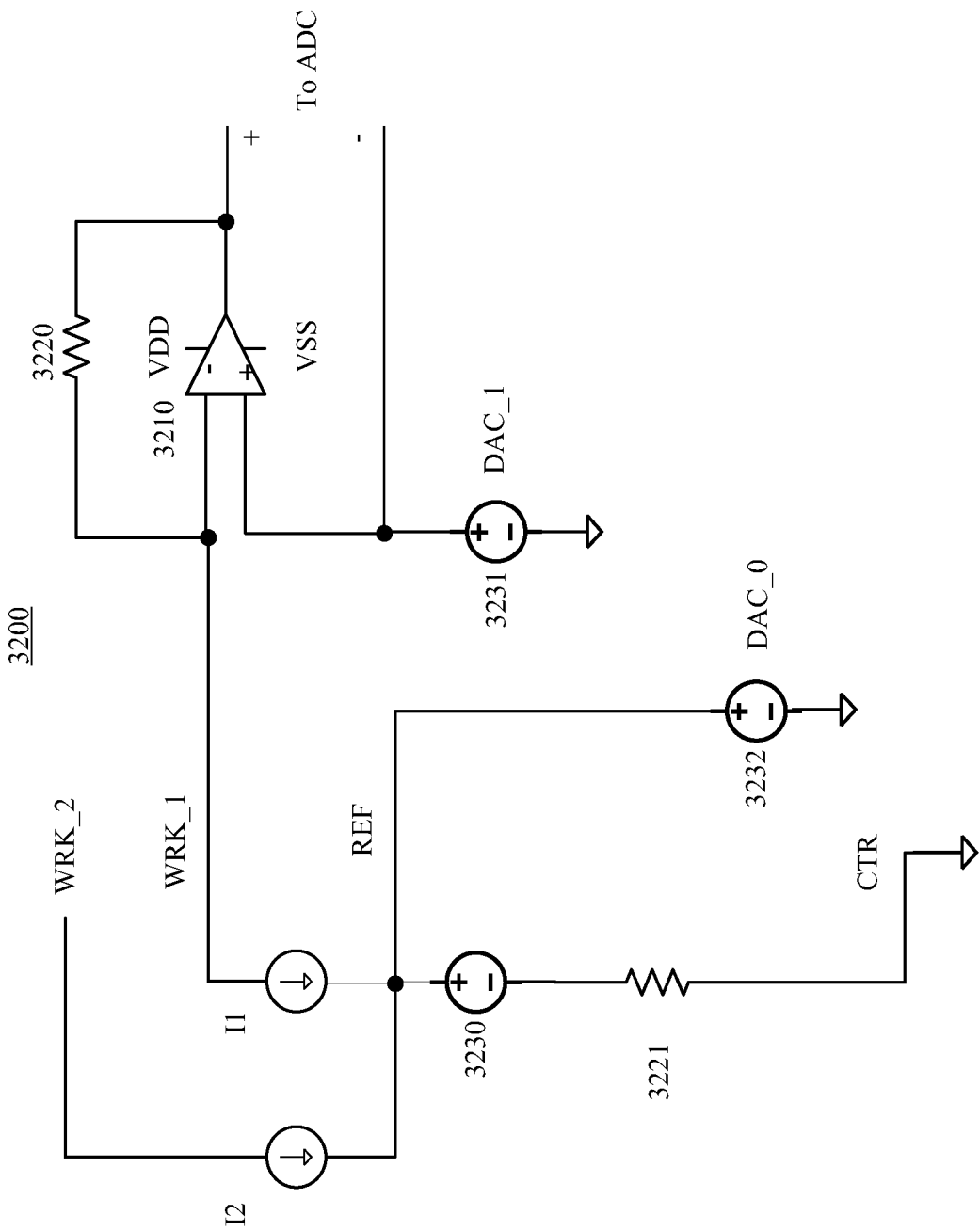
FIG. 32 is a diagram of an example circuit for a variable floating poise voltage generator.

The circuit 3200 illustrated in FIG. 32 includes one op-amp 3210, two resistors 3220 and 3221, DAC sources 3230, 3231, and 3232. One DAC source 3232 biases the REF terminal. DAC source 3231 biases the WRK terminal. This DAC source 3231 can be varied above or below the REF voltage to achieve positive and negative poise voltages using the techniques described herein. This configuration has a smaller component count that some of the other configurations, but in this configuration the WRK terminal voltage cannot track variation at the REF terminal which can impact sensor accuracy.

Figure 33:
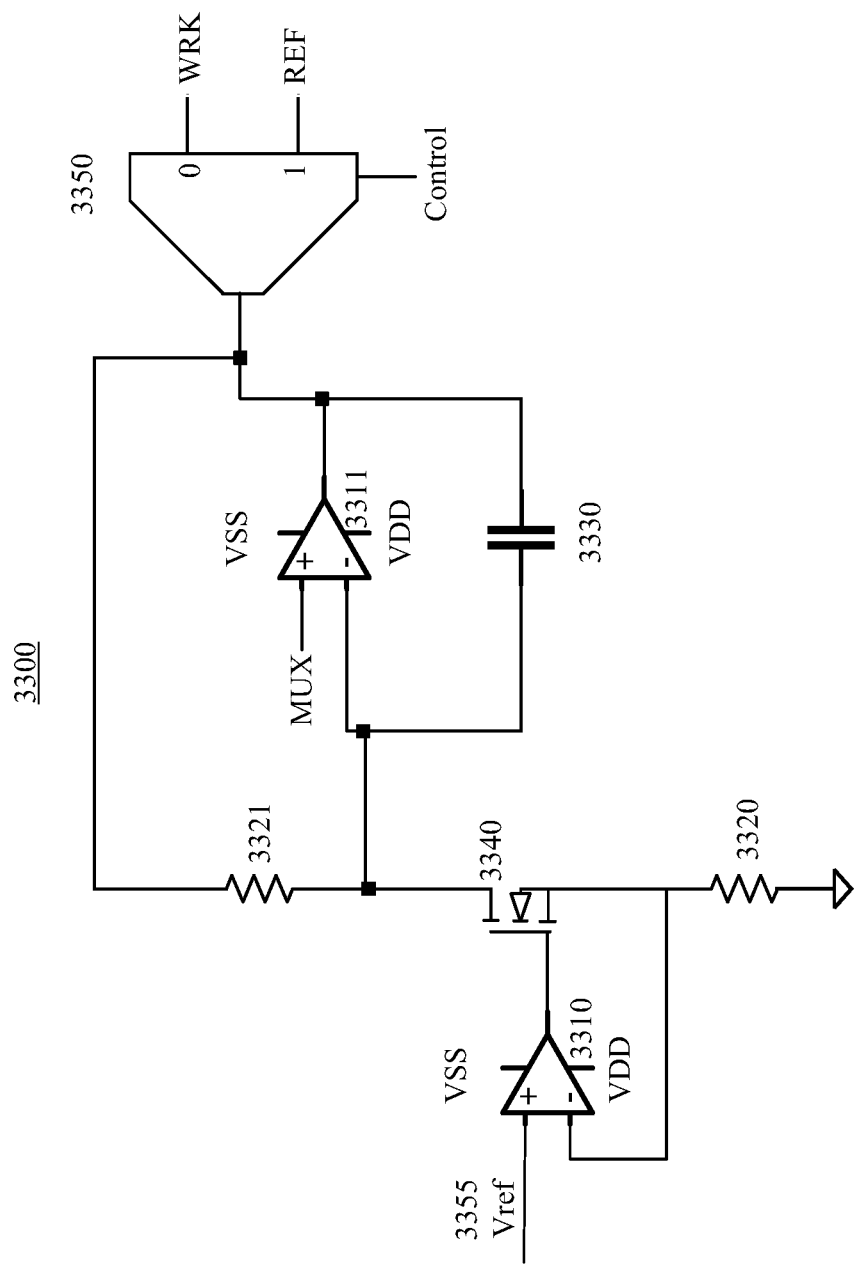
FIG. 33 is a diagram of an example circuit for a variable floating poise voltage generator.

The circuit 3300 illustrated in FIG. 33 includes two op-amps 3310 and 3311, two resistors 3320 and 3321, a capacitor 3330, a transistor 3340, and a multiplexor/demultiplexor 3350. With the multiplexor/demultiplexor 3350, the WRK and REF terminals can be programmatically swapped to generate poise voltage with dual polarities. Vref 3355 can refer to either a DAC output or a voltage reference (e.g., with an external resistor to vary the poise voltage). This configuration includes more components and can increase power consumption and increase risk of leakage.

Figure 34:
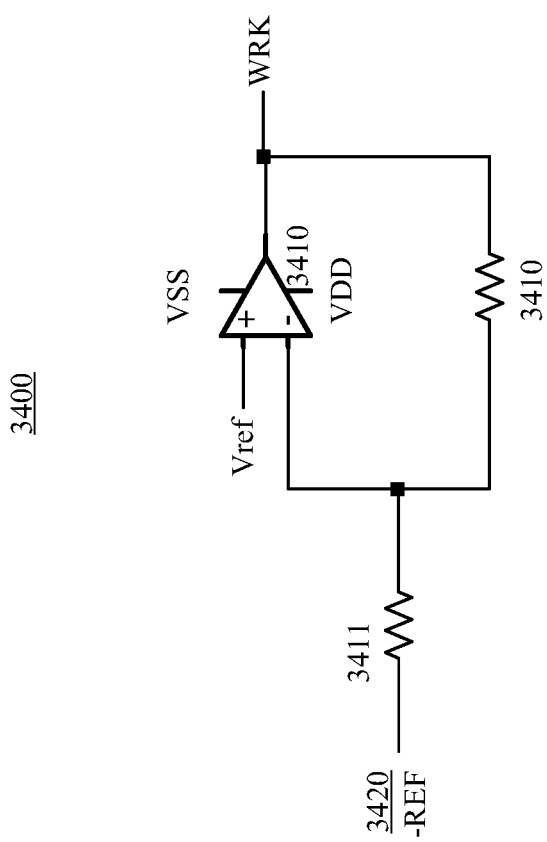
FIG. 34 is a diagram of an example circuit for a variable floating poise voltage generator.

The circuit 3400 illustrated in FIG. 34 includes an op-amp 3410, resistors 3410 and 3411 and features the REF terminal 3420 with a negative gain. In this case the current at the WRK terminal is equivalent to the current at the REF terminal plus double the Vref. Note that this configuration, while simple, has low impedance at the REF terminal. Therefore current flow can result in inaccurate measurements.

An outlier filter can be integrated into a digital signals processing module of the ASIC 130 and can be used to monitor a pending measurement before the results are processed. The outlier filter can compare a current result to results in the recent past (e.g., an immediately previous result) by comparing the pending result to the result to be reported from the last cycle. If the current result is identified as an outlier (e.g., for deviating from the previous result) the result is removed. As an example, the result to be reported from a cycle with an outlier can be replaced with the previous result, written over by a new measurement, or replaced with a default value that indicates that there was an outlier error. The number of outliers recorded for each measurement cycle can be stored and retrieved during measurement processing. Outliers can be reported for each sample, where a measurement includes a combination of multiple samples. The digital signals processing module of the ASIC 130 can also include an averaging filter that calculates the average of all samples from a single measurement sequence.

Figure 16A:
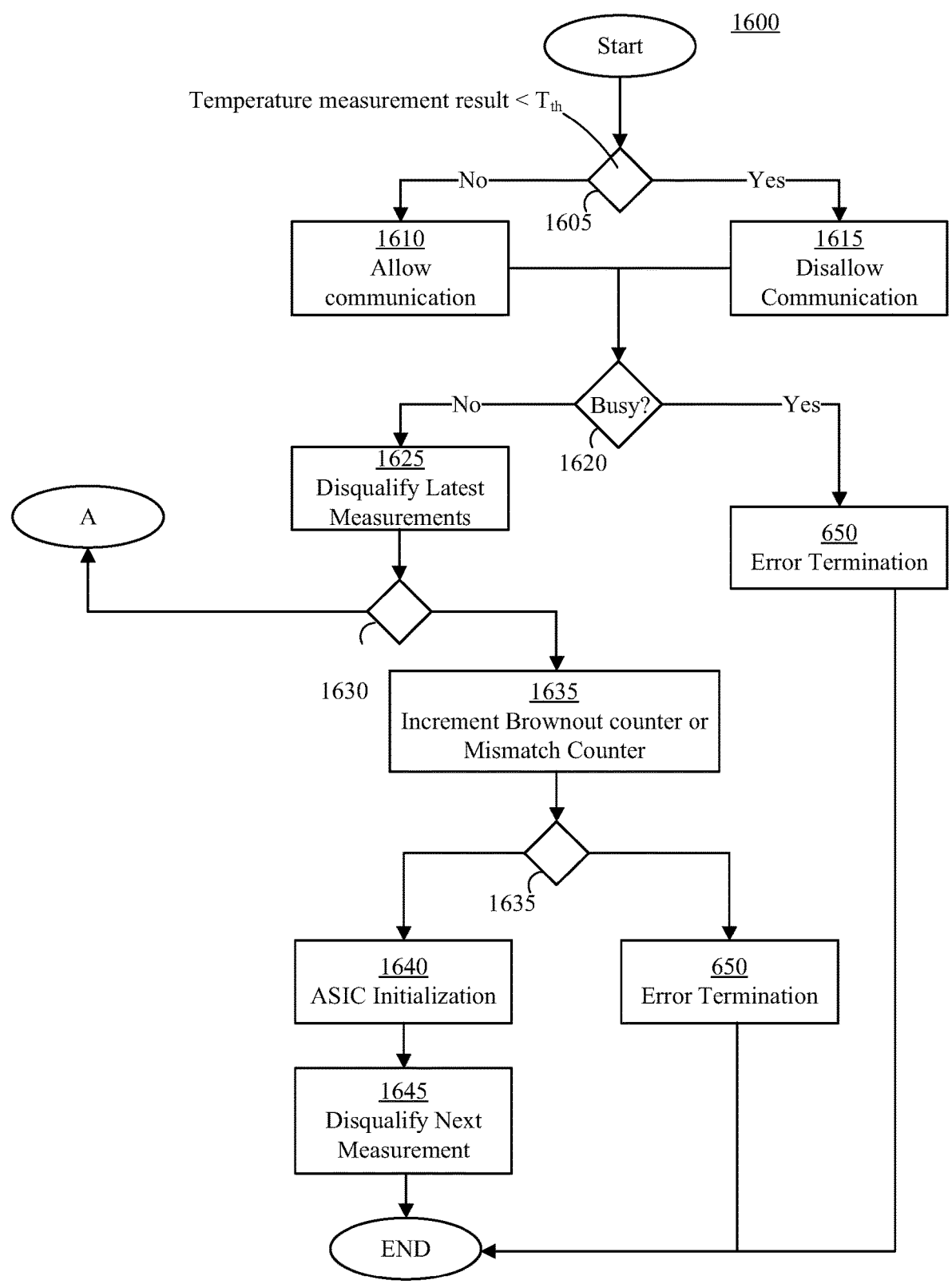
FIGS. 16A-16B is a diagram illustrating example operations of the sensor in an error condition according to exemplary embodiments of the disclosed subject matter.
Figure 16B:
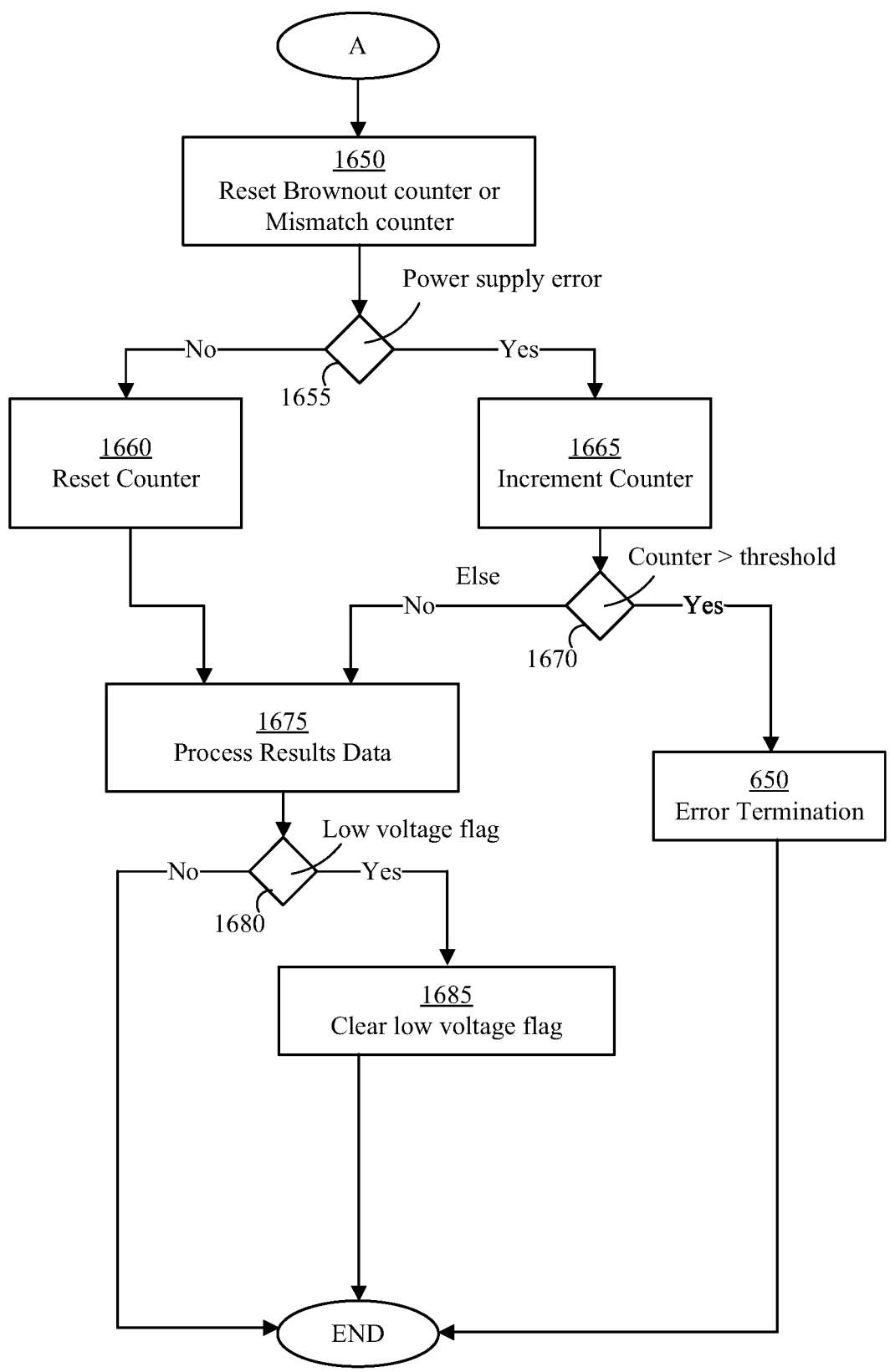

For purpose of illustration and not limitation, reference is made to the exemplary embodiment of a flowchart 1600 for measurement error handling for use with the disclosed subject matter as shown in FIGS. 16A-B. At 1605, the sensor 110 determines whether a temperature measurement result is below a predetermined threshold $T_{th}$ (e.g., 19 degrees Celsius). As embodied herein, the sensor 110 is configured to operate in a certain temperature range. For example, to preserve the battery of the sensor 110 or the medical hardware 155 of the sensor 110, the sensor 110 can selectively disable certain components. If the temperature measurement result is below the threshold amount, the sensor 110 proceeds to 1615, where the sensor disables communication using the communication module 140. If the temperature measurement result is at or above the threshold amount, the sensor 110 advances to 1610, where communication is enabled. From 1610 or 1615, the sensor 110 advances to 1620, where the sensor 110 determines if the ASIC 130 or the communication module 140 are currently busy (e.g., whether there are pending tasks that have priority over processing the current measurements). If so, the sensor 110 transitions to the error termination state 650 and the process subsequently ends.

Otherwise, from 1620 the sensor 110 advances to 1625, where the sensor 110 disqualifies the latest recorded measurements. The sensor 110 begins due to a data quality error being detected, and as such, the measurements can be prevented from being used at least in part due to a hardware fault, for the reasons described herein. From 1625, the sensor 110 advances to 1630, where the sensor 110 determines if the ASIC 130 has encountered a brownout (e.g., detects whether an ASIC 130 brownout flag has been set in an appropriate register of the ASIC memory 131) or if registers of the ASIC memory 131 do not match a predetermined value set during the one-time programming of the ASIC 130 or communication module 140. If neither of these conditions are true, the sensor 110 advances to 1650 described herein with respect to FIG. 16B. If either of the conditions are true, the system advances to 1635.

At 1635, the sensor 110 increments a counter corresponding to the fault determined in 1630. For example, if the ASIC 130 has encountered a brownout, the sensor 110 increments a brownout counter. If the ASIC 130 has a register mismatch, the sensor 110 increments a mismatch counter. At 1635, the sensor 110 compares the current state of the counters to threshold values. If any of the data quality fault counters (e.g., the brownout counter or mismatch counter) meet or exceed a threshold value, the sensor will proceed to the error termination state 650 and measurement error handling 1600 terminates. As an example only, the brownout counter threshold value can be set to a relatively high value (e.g., 100, 128, 150, 200, 255) at least in part because the sensor 110 is relatively robust to ASIC brownouts and a procedure for recovery is defined. In contrast, the mismatch counter threshold value can be relatively low (e.g., 1, 3, 5, 10), at least in part because mismatches will be rare and likely indicate a more serious error has occurred or that attempted tampering has been detected. If none of the thresholds have been met, the sensor 110 advances to 1640, where the sensor 110 causes the ASIC 130 to be re-initialized (e.g., cause the ASIC 130 to enter the activation sequence state 730) which will reset data in the ASIC 130. The sensor 110 also, in 1645, disqualifies the next measurement to ensure that no carryover error is included in the patient's measurements. Measurement error handling 1600 then terminates.

Referring now to FIG. 16B, the sensor 110 determines that there has been no ASIC 130 brownout or register mismatch at 1630, and at 1650, the sensor 110 resets the counters for the brownout or register mismatch errors. The sensor 110 can be programmed to track repetitive errors, as they are indicators of significant faults with the sensor 110. If the sensor 110 has entered the measurement error handling method 1600 and the fault is not due to a brownout event or register mismatch, the sensor 110 can instead continue on to diagnose the issue and response accordingly. At 1655 the sensor 110 determines whether the voltage from the ASIC 130 power supply or inverting charge pump supply is below a threshold value. These can be detected as a power supply monitor 137 of the ASIC 130 regulate the power supply. If the power supply or inverting charge pump supply drops below the set threshold, the power supply monitor 137 can set a flag to be read by the sensor 110. If one of these errors is detected, at 1665, sensor 110 increments a counter designated for power supply errors. If neither of these errors are detected, the sensor 100 instead proceeds to 1660 where the counter is reset. At 1675, sensor 110 processes the results data that have been derived prior to the measurement error being detected.

From 1665, the sensor advances to 1670, where the sensor 110 compares the current state of the power supply counter to threshold values. If the power supply counter meets or exceeds a threshold value, the sensor 110 will proceed to the error termination state 650 and the method will terminate. As an example only, the power supply counter threshold value can be set to a value attempting to estimate the occurrences of these types of power supply errors during normal operation such that if the power supply counter threshold is above a threshold value an error has likely occurred. If the threshold has not been met, the sensor 110 advances to 1675 where it processes the results data that have been derived prior to the measurement error being detected.

From 1675, the sensor 110 advances to 1680, where it determines whether a low voltage flag set by the power supply monitor 137 of the ASIC 130 is still set. As embodied herein, the low voltage flag can encompass a register value set by the power supply monitor 137 in response to determining that the voltage has failed to satisfy a preset threshold for a predetermined duration of time. As such, the flag may not necessarily be set in all situations. If the flag is set, the sensor 110 advances to 1685 where it resets or clears that low voltage flag before the method terminates. If the low voltage flag is not set, then the method simply terminates.

Additionally or alternatively, as embodied herein, an interrupt request can be encountered during sensor 110 initialization. Generally, the conditions that trigger the interrupt request can be ignored, and the corresponding IRQ status flag can be cleared. For example, if a low voltage or voltage high again flag get triggered before the battery switch is closed (e.g., before sensor 110 initialization is complete), the flag reflects the state of the ASIC power supply that is harvesting energy from the nearby NFC field, not from the battery. Such interrupts can be ignored during initialization by clearing their registers. If an NFC command is detected in this situation, the corresponding register can be cleared, for example to allow the application or receiver 120 to resend the NFC command. Where the communication module 140 detects a brownout event during initialization, the corresponding register can be cleared at least because the ASIC 130 can trigger the same interrupt again. If a brownout is detected again, the communication module is fully awake and thus can handle it through the normal brownout sequence.

Figure 17:
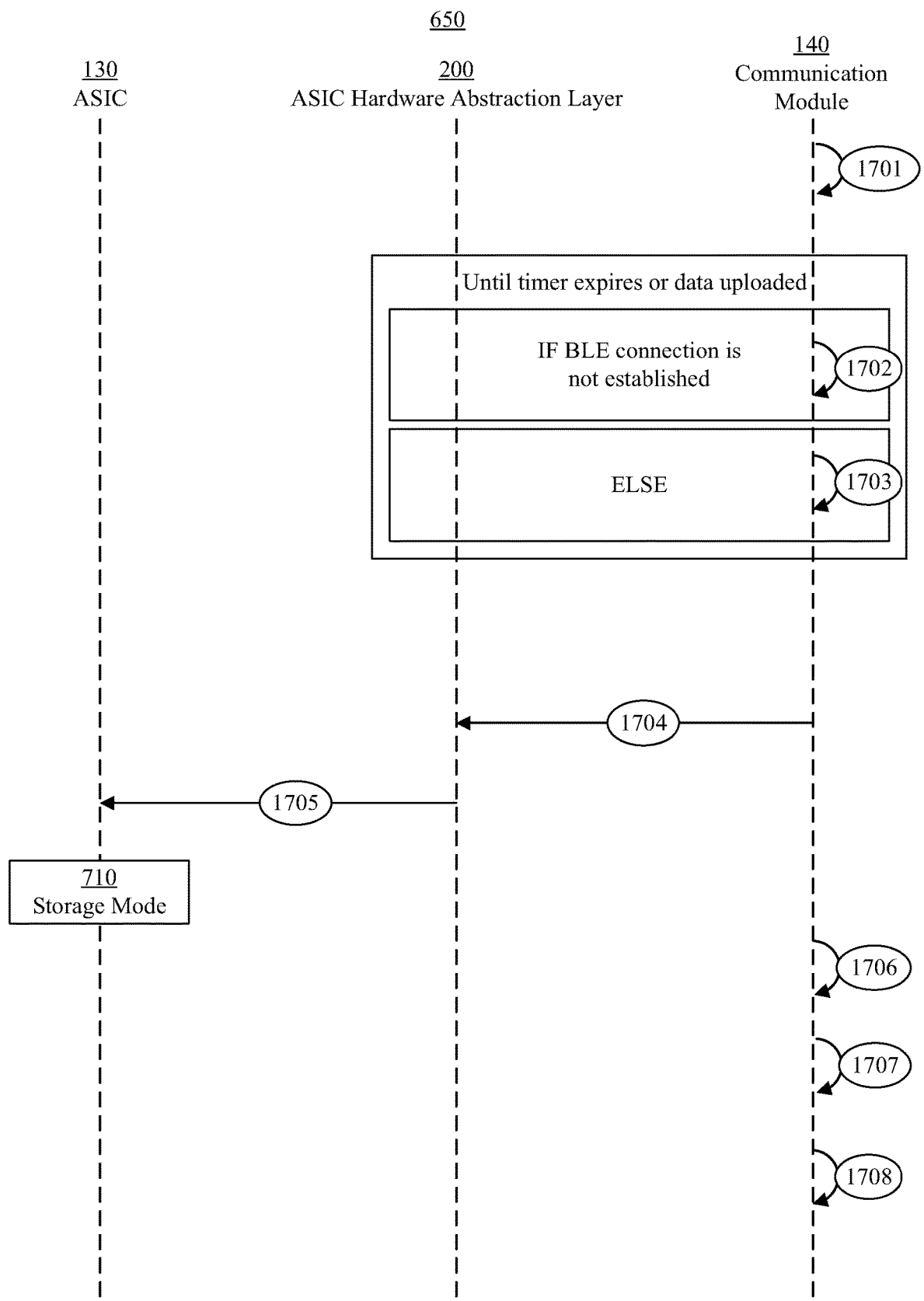
FIG. 17 is a diagram illustrating example functionality of the sensor and messages between components of the sensor during an exemplary error termination operation.

For purpose of illustration and not limitation, reference is made to the exemplary embodiment of a procedure for the sensor 110 in the error termination state 650 for use with the disclosed subject matter as shown in FIG. 17. The sensor 110 can enter the Error Termination state 650 when an unrecoverable error occurs. When the error is detected in insertion failed state 540, active paired state 555, or active expired state 565 the sensor 110 can remain in the Error Termination state 650 for a fixed period of time with the communication module 140 interface enabled prior to shutting down so that remaining data from the sensor 110 can be sent to a receiver 120. If a communication session or communication connection with an authenticated receiver 120 had not been previously established, the sensor 130 can advertise on a repeating basis until a connection is successful. For example, the sensor 110 can advertise every minute until the connection is made without significantly impacting battery capacity. In the error termination state 650, the sensor 110 can wait for a short period of time (e.g., 10 minutes) before disabling the system by disabling activity on general purpose input-output pins, for example to allow communication with the communication module 140 for debugging purposes before the sensor 110 terminates itself. In contrast, the normal termination state 580 can be configured without such a wait time.

As described herein, the sensor 110 enters the error termination state 650 upon encountering an unrecoverable error. At 1701, the communication module 140 records the error and related events in an appropriate log. The communication module 140 also activates a timer to record the amount of time while the sensor 110 is attempting to offload all data. The communication module increments the timer while repeatedly evaluating if a connection using the communication module 140 has been established with an authenticated receiver 120. At 1702, if a no connection is established the communication module attempts to establish the connection on a repeating basis (e.g., by advertising every minute). At 1703, if a connection has been established, the communication module 140 and ASIC hardware abstract layer attempt to upload measurement data from the sensor 110 to the receiver 120. The communication module 140 can repeat 1702 and 1703 until the timer expires or all pending data has been uploaded. Once the timer expires or all pending data has been uploaded, at 1704, the communication module 140 sends a "go to storage mode" command to the ASIC 130 through the ASIC hardware abstraction layer 200 which reformats and forwards the command at 1705 to the ASIC 130 by writing the command to appropriate registers. The ASIC 130 then enters storage mode 515. At 1706, the communication module 140 enters a final error termination state. At 1707, the communication module 1707 waits for a predetermined period of time. At 1708, the communication module 140 terminates the sensor 110 by closing the general purpose input-output pins of the sensor 110.

Figure 18:
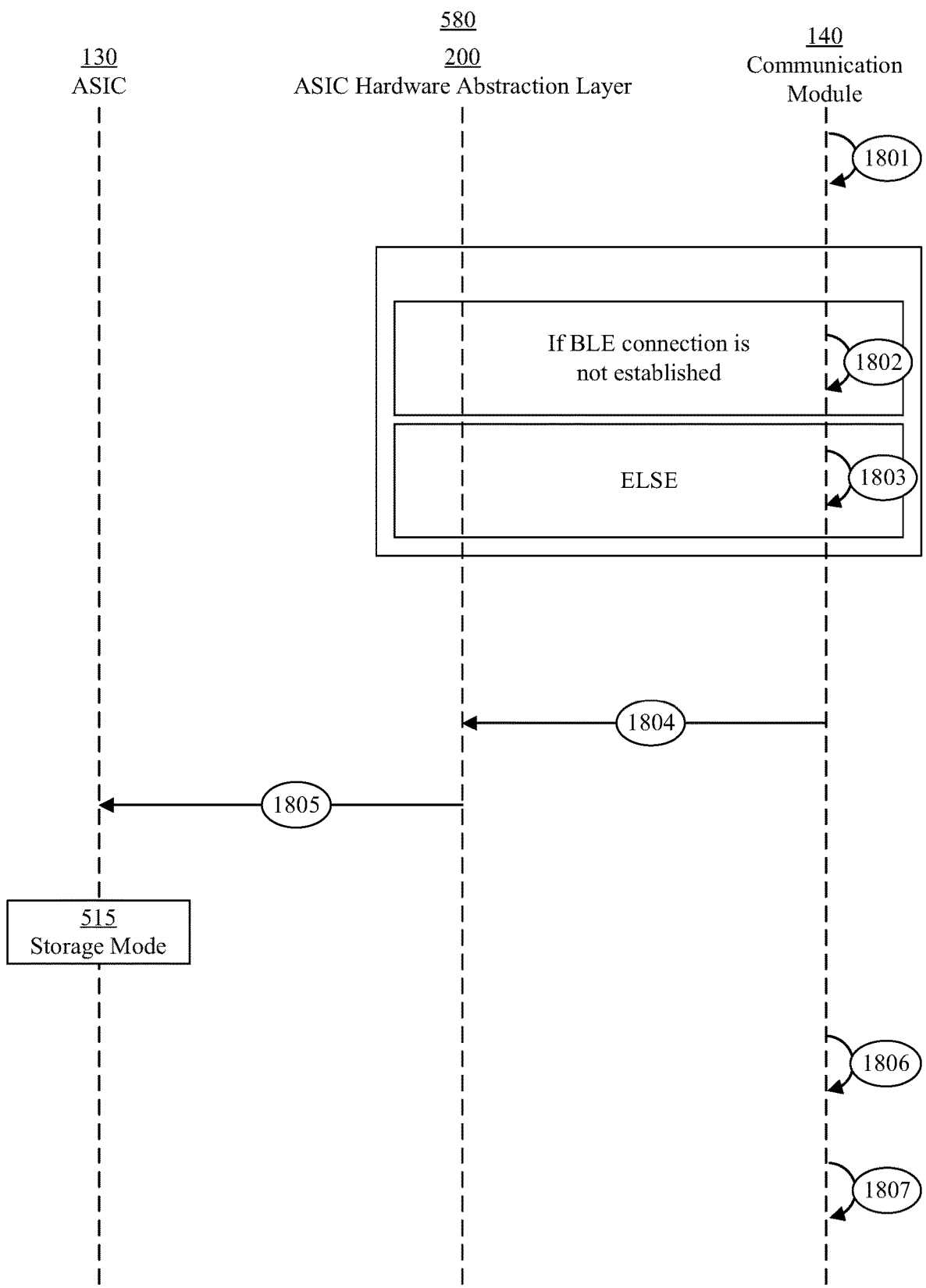
FIG. 18 is a diagram illustrating example functionality of the sensor and messages between components of the sensor during an exemplary normal termination operation.

For purpose of illustration and not limitation, reference is made to the exemplary embodiment of a procedure for the sensor 110 in the normal termination state 580 for use with the disclosed subject matter as shown in FIG. 18. The sensor 110 enters the normal termination state 580 when the sensor 110 has reached its expected end of operation, for example when the time of operation has reached its threshold or when an affirmative shutdown command is received. At 1801, the communication module 140 logs any preceding events in an appropriate log. The communication module 140 also activates a timer to record the amount of time while the sensor 110 is attempting to offload all data. The communication module 1140 increments the timer while repeatedly evaluating if a connection using the communication module 140 has been established with an authenticated receiver 120. If a communication session or communication connection with an authenticated receiver 120 had not been previously established, the sensor 130 will advertise on a repeating basis until it is successful. At 1802, if no connection is established the communication module 140 attempts to establish the connection on a repeating basis (e.g., by advertising every minute). At 1803, if a connection has been established, the communication module 140 and ASIC hardware abstraction layer 200 attempts to upload lingering measurement data from the sensor 110 to the receiver 120. The communication module 140 can repeat 1802 and 1803 until the timer expires or all pending data has been uploaded. Once the timer expires or all pending data has been uploaded, at 1804, the communication module 140 sends a "go to storage mode" command to the ASIC 130 through the ASIC hardware abstraction layer 200 which reformats and forwards the command at 1805 to the ASIC 130 by writing the command to appropriate registers. The ASIC 130 then enters storage mode 710. At 1806, the communication module 140 enters a final normal termination state. At 1807, the communication module 140 terminates the sensor 110 by closing the general purpose input-output pins of the sensor 110.

In certain embodiments, the temperature detected by the ASIC 130 or by a temperature sensor associated with the communication module 140 can be used to regulate the transmitter power of the communication module. In addition to affecting the ability of signals from the communication module 140 being detectable by a receiver 120, the receiver 120 can interpret transmitter power to determine a distance between the sensor 110 and the receiver 120. For example, the receiver 120 can compare a perceived transmission power of a received signal to a specified or expected transmitter power to determine a level of drop-off or difference and infer the distance between the sensor 110 and receiver. The receiver can provide this information to a user to assist the user in locating the sensor 110 or the patient to whom the sensor 110 is attached. The receiver 120 can further warn the user that the sensor 110 is out of range or nearly out of range.

The communication module 140 can be configured to disable transmission upon the temperature failing to satisfy a threshold temperature. The communication module 140 can further be configured to increase or decrease the transmitter power upon the temperature crossing certain interim thresholds. For example, the sensor 110 can have defined a threshold (e.g., 23 degrees Celsius) for full power transmission by the communication module (e.g., +4.6 dBm). The sensor 110 can also have defined a threshold (e.g., 19 degrees Celsius) for turning off transmitter functionality. Between the two thresholds, an interim transmitter power can be use (e.g., +0.4 dBm). Furthermore, the communication module 140 can integrate benchmark values to offset potential hysteresis effects where the change in the transmitter power causes the change in temperature, thus mitigating potential race conditions. For example, a hysteresis value of 0.2 degrees Celsius can be used as a benchmark.

Figure 19:
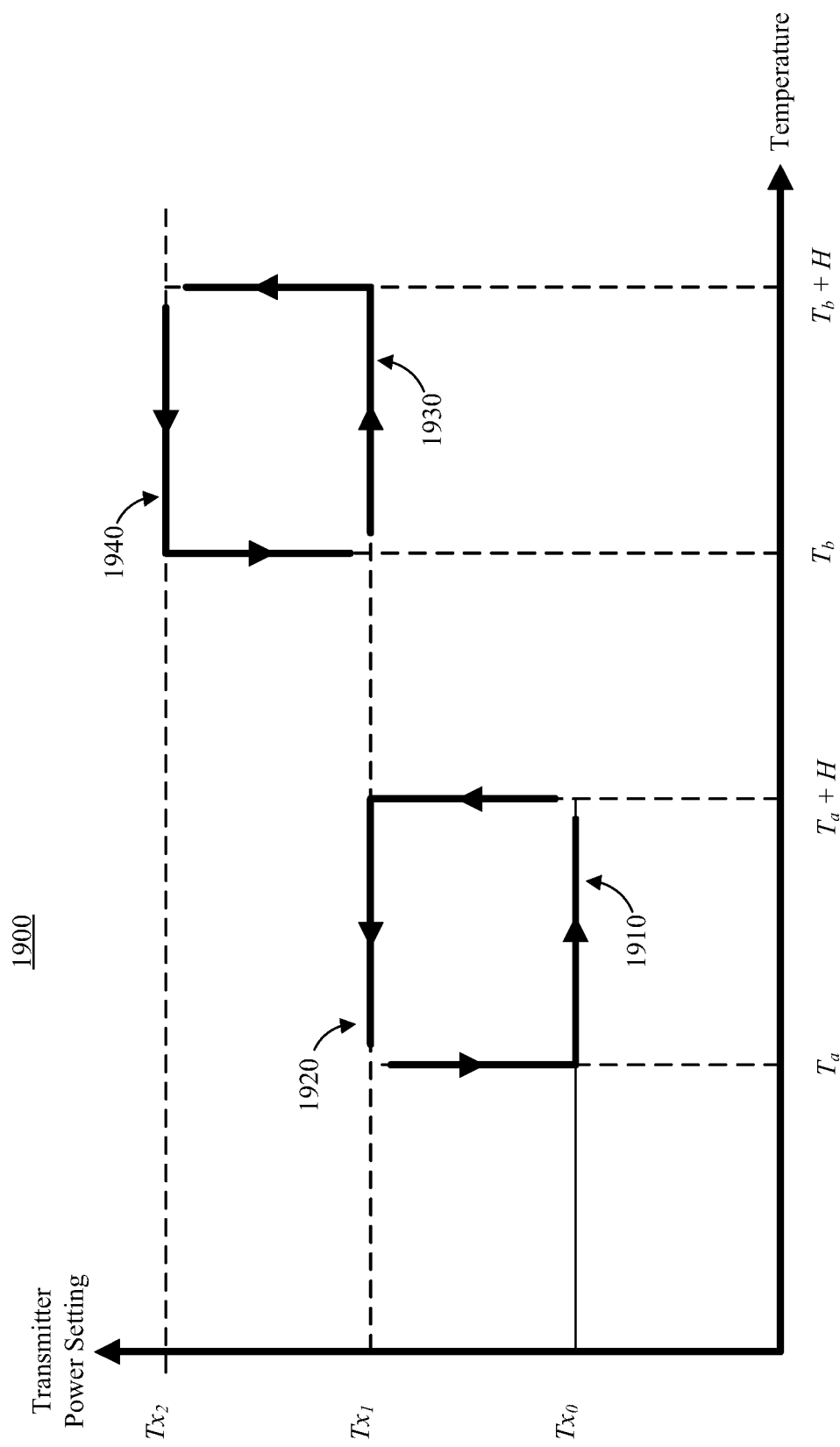
FIG. 19 is a chart illustrating temperature detection and responses according to exemplary embodiments of the disclosed subject matter.

FIG. 19 illustrates a graph 1900 depicting potential relationship between the transmitter power set for the communication module 140 and the recorded temperature. The graph in FIG. 19 includes two axes: a horizontal axis corresponding to temperature and a vertical axis corresponding to the transmitter power setting. The horizontal axis includes four marked positions. These four positions include two temperature thresholds $T_a$ and $T_b$ and the two temperature threshold augmented by the hysteresis value H, $T_a+H$ and $T_b+H$. The vertical axis includes three marked positions. These three positions include three power levels: $Tx_0$, $Tx_1$, and $Tx_2$. In certain embodiments, $Tx_0$ corresponds to turning the transmitter power off, $Tx_2$ corresponds to a maximum permitted transmitter power, and $Tx_1$ corresponds to an interim transmitter power. The graph includes four lines, 1910, 1920, 1930, and 1940 each illustrating exemplary changes in transmitter power level correlated to the temperature. Line 1910 illustrates that for temperatures between temperature $T_a$ and $T_a+H$, the transmitter power remains at $Tx_0$. But, when the temperature reaches $T_a+H$ (e.g., passes the hysteresis value), the transmitter power can shift to $Tx_1$. For temperatures between $T_a+H$ and $T_b+H$, as illustrated by line 1930, the transmitter power stays at $Tx_1$. When the temperature reaches $T_b+H$ (e.g., the temperature exceeds the second threshold value and hysteresis value), the transmitter power increases to $Tx_2$. The process is similar in the reverse. As illustrated by line 1940, as the temperature decreases from $T_b+H$ to $T_b$, the transmitter power remains at $Tx_2$. Once the temperature reaches $T_b$, the transmitter power is decreased to $Tx_1$. Between temperature $T_b$ and $T_a$, the transmitter power remains at $Tx_1$. However, once the temperature reaches $T_a$, the transmitter power is reduced to $Tx_0$.

In addition to the specific embodiments claimed below, the disclosed subject matter is also directed to other embodiments having any other possible combination of the dependent features claimed below and those disclosed above and in the attached figures. As such, the particular features disclosed herein can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

Embodiments disclosed herein include:

A. A medical sensor comprising an application-specific integrated circuit (ASIC), medical hardware, and a communication module; wherein: the ASIC is communicatively coupled to the medical hardware and communication module; the ASIC is configured to receive measurement signals from the medical hardware and provide the measurement signals to the communication module; and the communication module is configured to process the measurement signal into measurement results.

B. A method comprising, by an application-specific integrated circuit (ASIC) of a medical sensor: detecting that a voltage supplied to the ASIC has fallen below a threshold level; determining an amount of time that the voltage has been below the threshold level; and responding to the voltage supplied to the ASIC being below a threshold level based on the determined amount of time.

C. A medical sensor arranged to provide communication, the medical sensor comprising: an application-specific integrated circuit (ASIC); means for detecting that a voltage supplied to the ASIC has fallen below a threshold level; means for determining an amount of time that the voltage has been below the threshold level; means for responding to the voltage supplied to the ASIC being below a threshold level based on the determined amount of time.

D. A computer program, computer program product or computer readable medium comprising instructions which, when executed by a computing device or a medical sensor, cause the computing device or the medical sensor to carry out the steps of the method of embodiment B.

Each of embodiments A, B, C, and D may have one or more of the following additional elements in any combination: Element 1: wherein the communication module operates an application layer and a link layer. Element 2: wherein the communication module is physically separated module from the ASIC. Element 3: wherein the communication module is further configured to provide the measurement results to a receiving device for display via wireless communication. Element 4: wherein the communication module is further configured to: detect a change in temperature of the medical sensor; and adjust a transmission power associated with the wireless communication in response to the change in temperature. Element 5: wherein the medical hardware is configured to be partially inserted into a body of a patient. Element 6: wherein the ASIC is configured to detect an activation request from a computing device via a first communication channel and communicate the activation request to the communication module; and wherein the communication module is configured to send an authentication request to the computing device via a second communication channel. Element 7: wherein the ASIC is further configured when detecting the activation request from the computing device to receive wireless power and use the wireless power to cause activation of the communication module. Element 8: wherein the communication module is further configured to send communication parameters for facilitating communication between the medical sensor and the computing device via the second communication channel to the computing device. Element 9: wherein the first communication channel is compliant with a near-field communication protocol and the second communication channel is compliant with a Bluetooth Low-Energy protocol. Element 10: wherein the communication module comprises a memory storing device-specific data uniquely associated with the ASIC; and wherein the communication module is further configured to, upon activation of the medical sensor: read device-specific data from a memory of the ASIC; compare the device-specific data read from the memory of the ASIC to the device-specific data stored in the memory of the communication module to verify the integrity of the device-specific information. Element 11: wherein the ASIC or communication module is configured to detect a communication request from a computing device, the communication request comprise a manufacturer code corresponding to the computing device; and the ASIC is configured to, in response to the communication request, compare the manufacturer code to a set of manufacturer codes stored in a memory of the ASIC, wherein a response to the communication request is based on the result of the comparison. Element 12: wherein the ASIC or communication module is configured to detect a communication request from a computing device, the communication request comprise a manufacturer code corresponding to the computing device; and the communication module is configured to, in response to the communication request, compare the manufacturer code to a set of manufacturer codes stored in a memory of the communication module, wherein a response to the communication request is based on the result of the comparison. Element 13: wherein the medical hardware is configured to detect body temperature, heart rate, blood glucose levels, or motion readings.

Element 14: further comprising determining that the voltage supplied to the ASIC satisfies a second threshold level, wherein: the determined amount of time is below a threshold amount of time; and responding to the voltage being below a threshold level comprises causing the ASIC to reset. Element 15: further comprising determining that the voltage supplied to the ASIC satisfies a second threshold level, wherein: the determined amount of time is above a threshold amount of time; and responding to the voltage being below a threshold level comprises causing the ASIC to enter a storage or shutdown mode. Element 16: wherein the medical sensor gathered medical data prior to detecting that the voltage supplied to the ASIC has fallen below the threshold level; and wherein responding to the voltage being below the threshold level comprises erasing the gathered medical data. Element 17: wherein responding to the voltage being below the threshold level further comprises disqualifying one or more future measurements gathered by the medical sensor. Element 18: wherein the medical data comprises body temperature, heart rate, blood glucose levels, or motion readings.

Element 19: further comprising means for implementing the method according to any of elements 14-18.

By way of non-limiting example, example additions or combinations applicable to embodiment A include: Element 1 with any of Elements 2-13; Element 2 with any of Elements 1 and 3-13; Element 3 with any of Elements 1-2 and 4-13; Element 4 with any of Elements 1-3 and 5-13; Element 5 with any of Elements 1-4 and 6-13; Element 6 with any of Elements 1-5 and 7-13; Element 7 with any of Elements 1-6 and 8-13; Element 8 with any of Elements 1-7 and 9-13; Element 9 with any of Elements 1-8 and 10-13; Element 10 with any of Elements 1-9 and 13; Element 11 with any of Elements 1-10 and 12-13; Element 12 with any of Elements 1-11 and 13. Element 13 with any of Elements 1-12.

By way of non-limiting example, example additions or combinations applicable to embodiment B include: Element 13 with any of Elements 14-18; Element 14 with any of Elements 13 and 15-18; Element 15 with any of Elements 13-14 and 16-18; Element 16 with any of Elements 13-15 and 17-18; Element 17 with any of Elements 13-16 and 18; Element 18 with any of Elements 13-17.

By way of non-limiting example, example additions or combinations applicable to embodiment C include Element 19.

Additionally or alternatively, any of the elements and combinations applicable to embodiments A, B, C, and D are also applicable to any of the other elements and combinations applicable to embodiments A, B, C and D.

What is claimed is:

1. A medical sensor comprising an application-specific integrated circuit (ASIC), medical hardware, and a communication module; wherein:
    the ASIC is communicatively coupled to the medical hardware and communication module;
    the ASIC comprises an analog front end that receives measurement signals from the medical hardware and further comprises a serial-peripheral interface that provides the measurement signals to the communication module;
    the communication module is configured to process the measurement signal into measurement results;
    the ASIC is further configured to detect an activation request received by the communication module from a computing device via a first communication channel, wherein the ASIC, in response to detecting the activation request received via the first communication channel, causes the communication module to enable a radio that is associated with a second communication channel;
    the communication module further is configured to send an authentication request to the computing device via the second communication channel;
    one of the first communication channel or the second communication channel corresponds to a Bluetooth Low-Energy protocol that is compliant with an application layer encryption; and
    the ASIC is further configured to determine that the medical sensor is operating outside a predetermined temperature range and disable the communication module from transmitting data.

2. The medical sensor of claim 1, wherein the communication module operates an application layer and a link layer.

3. The medical sensor of claim 1, wherein the communication module is physically separated from the ASIC.

4. The medical sensor of claim 1, wherein the communication module is further configured to provide the measurement results to a receiving device for display via wireless communication.

5. The medical sensor of claim 4, wherein the communication module is further configured to:
    detect a change in temperature of the medical sensor; and
    adjust a transmission power associated with the wireless communication in response to the change in temperature.

6. The medical sensor of claim 1, wherein the medical hardware is configured to be partially inserted into a body of a patient.

7. The medical sensor of claim 1, wherein the Bluetooth Low-Energy protocol is a non-standard variation of the Bluetooth Low-Energy protocol.

8. The medical sensor of claim 1, wherein the ASIC is further configured, when detecting the activation request from the computing device, to receive wireless power and use the wireless power to cause activation of the communication module.

9. The medical sensor of claim 1, wherein the communication module is further configured to send communication parameters for facilitating communication between the medical sensor and the computing device via the second communication channel to the computing device.

10. The medical sensor of claim 1, wherein the first communication channel is compliant with a near-field communication protocol and the second communication channel is compliant with the Bluetooth Low-Energy protocol.

11. The medical sensor of claim 1, wherein the communication module comprises a memory storing device-specific data uniquely associated with the ASIC; and wherein the communication module is further configured to, upon activation of the medical sensor:

read device-specific data from a memory of the ASIC;

compare the device-specific data read from the memory of the ASIC to the device-specific data stored in the memory of the communication module to verify an integrity of the device-specific data.

12. The medical sensor of claim 1, wherein the ASIC or communication module is configured to detect a communication request from a computing device, the communication request comprising a manufacturer code corresponding to the computing device; and wherein the ASIC is configured to, in response to the communication request, compare the manufacturer code to a set of manufacturer codes stored in a memory of the ASIC, wherein a response to the communication request is based on the result of the comparison.

13. The medical sensor of claim 1, wherein the ASIC or communication module is configured to detect a communication request from a computing device, the communication request comprising a manufacturer code corresponding to the computing device; and wherein the communication module is configured to, in response to the communication request, compare the manufacturer code to a set of manufacturer codes stored in a memory of the communication module, wherein a response to the communication request is based on the result of the comparison.

14. The medical sensor of claim 1, wherein the medical hardware is configured to detect body temperature, heart rate, blood glucose levels, or motion readings.

15. The medical sensor of claim 1, wherein the medical hardware is configured for continuous glucose monitoring.

16. The medical sensor of claim 1, wherein the medical hardware is configured to be partially inserted into a body of a patient.

* * * * *